US006522221B1

(12) United States Patent
Hayashi

(10) Patent No.: US 6,522,221 B1
(45) Date of Patent: Feb. 18, 2003

(54) PHASE SHIFTER, ATTENUATOR, AND NONLINEAR SIGNAL GENERATOR

(75) Inventor: Hitoshi Hayashi, Kanagawa (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/541,796

(22) Filed: Mar. 31, 2000

(30) Foreign Application Priority Data

Jan. 4, 1999 (JP) ........................................ 11-094541
Nov. 16, 1999 (JP) ........................................ 11-326129

(51) Int. Cl.[7] ............................ H04B 1/52; H01P 1/18
(52) U.S. Cl. ..................................... 333/156; 333/118
(58) Field of Search ............................... 333/156, 118, 333/25, 112, 110, 117, 124

(56) References Cited

U.S. PATENT DOCUMENTS

| | | | | |
|---|---|---|---|---|
| 5,153,548 A | * 10/1992 | Hourtane et al. | ........... | 336/144 |
| 5,600,298 A | * 2/1997 | Masuda | ...................... | 338/162 |
| 5,886,591 A | * 3/1999 | Jean et al. | .................. | 333/118 |

FOREIGN PATENT DOCUMENTS

| | | |
|---|---|---|
| JP | 61-139110 | 6/1986 |
| JP | 63-189004 | 8/1988 |

OTHER PUBLICATIONS

I.D.Robertson, "MMIC Design", pp261–265, London, IEE, 1995.
J.Helszajn, "Passive and active microwave circuits", pp193–195, New York, John Wiley&Sons, 1978.
I.D.Robertson, "MMIC Design", pp332–333, London, IEE, 1995.
"A Low–Loss Ku–Band Monolithic Analog Phase Shifter", pp315–320, IEEE Transactions on Microwave Theory and Techniques, vol.MTT–35, No. 3, Mar. 1987.
"Broadband Switched–Bit Phase Shifter Using All–Pass Networks", pp265–268, IEEE MTT–S Digest, 1991.
"A Precise Analog Phase Sifter for SHF SATCOM Phased Arrays", pp29–32, GaAs IC Symposium, IEEE, 1992.

* cited by examiner

*Primary Examiner*—Robert Pascal
*Assistant Examiner*—Kimberly E Glenn
(74) *Attorney, Agent, or Firm*—Blakely Sokoloff Taylor & Zafman

(57) ABSTRACT

A phase shifter includes first and second high-frequency impedance elements and first and second high-frequency phase shifting elements. The first high-frequency impedance element is connected between an input port and an output port and has an impedance substantially constituted by a reactance. The first high-frequency phase shifting element has one terminal connected to the input port and a phase change amount of 90° at a frequency $f_0$. The second high-frequency phase shifting element is connected between the output port and the other terminal of the first high-frequency phase shifting element and has a phase change amount of 90° at the frequency $f_0$. The first and second high-frequency phase shifting elements have an impedance converting function. The second high-frequency impedance element has one terminal connected to a common connection point between the first and second high-frequency phase shifting elements, the other terminal grounded, and an impedance substantially constituted by a reactance. The impedance of the first high-frequency impedance element and the impedance of the second high-frequency impedance element are set such that input and output reflection coefficients at the frequency $f_0$ are approximately zero.

34 Claims, 50 Drawing Sheets

PHASE SHIFTER, ATTENUATOR, AND NONLINEAR SIGNAL GENERATOR

BACKGROUND OF THE INVENTION

The present invention relates to a small phase shifter, attenuator, and nonlinear signal generator having matched input and output impedances.

With the recent rapid progress of wireless multimedia communication, demands for smaller and more economical wireless devices are increasing. A monolithic microwave integrated circuit (MMIC) has attracted attention as a basic technology for advancing the miniaturization and economization of wireless devices for the following reasons. That is, not only the MMIC itself is small, but also the mass-productivity increases because highly uniform chips can be fabricated with no adjustment by a semiconductor process. Furthermore, high-degree integration and high-accuracy reproduction can reduce the packaging cost and improve the reliability.

Known examples of high-frequency functional circuits expected to be miniaturized by the MMIC are an amplifier for amplifying a high-frequency signal, an oscillator for generating a local oscillation signal, and a frequency converter for performing frequency conversion. Additionally, for the purpose of applying to an antenna directivity control circuit or a distortion compensation circuit of a power amplifier, it is also being expected to miniaturize, by the MMIC, a phase shifter for controlling the phase of a high-frequency signal, an attenuator for attenuating the amplitude of a high-frequency signal, and a nonlinear signal generator for generating a nonlinear signal.

A conventional phase shifter and attenuator will be described below.

FIG. 62 shows the conventional phase shifter and attenuator. These phase shifter and attenuator are a reflection-type phase shifter and attenuator using a 90° branch line hybrid. The basic operating principle of this phase shifter is described in, e.g., [7.2 Analogue implementations, pp. 261–265, I. D. Robertson, "MMIC Design," London, IEE, 1995] and [11.6 Varactor Analogue Phase Shifter, pp. 193–195, J. Helszajn, "Passive and active microwave circuits," New York, John Wiley & Sons, 1978]. Also, the basic operating principle of this attenuator is described in [8.5.1 Analogue reflection-type attenuator, pp. 332–333, I. D. Robertson, "MMIQ Design," London, IEE, 1995].

As shown in FIG. 62, the 90° branch line hybrid is composed of four high-frequency transmission lines 3*a*, 3*b*, 3*c*, and 3*d* whose electrical length at frequency $f_0$ is 90°. The connecting nodes of these high-frequency transmission lines 3*a* to 3*d* are I/O terminals 4*a*, 4*b*, 4*c*, and 4*d* of the 90° branch line hybrid. An input port 1 is connected to the I/O terminal 4*a* of the 90° branch line hybrid. An output port 2 is connected to the I/O terminal 4*b* of the 90° branch line hybrid. Also, variable impedance elements 5*a* and 5*b* are connected to the I/O terminals 4*c* and 4*d*, respectively, of the 90° branch line hybrid.

Let $Z_0$ be the input and output impedances of the input and output ports 1 and 2, $Z_0$ be the characteristic impedance of the high-frequency transmission lines 3*a* and 3*b*, $Z_0/\sqrt{2}$ be the characteristic impedance of the high-frequency transmission lines 3*c* and 3*d*, and $Z_1$ be the impedance of the variable impedance elements 5*a* and 5*b*.

The operation of the conventional arrangement shown in FIG. 62 will be described below. An input signal from the input port 1 is distributed by the 90° branch line hybrid constituted by the high-frequency transmission lines 3*a* to 3*d* and output from the I/O terminals 4*c* and 4*d* of this 90° branch line hybrid. These I/O terminals 4*c* and 4*d* are terminated by the variable impedance elements 5*a* and 5*b*, respectively. Therefore, a portion of the signal power is absorbed by a resistance component $R_1$ of the impedance $Z_1$, and the rest of the signal is given a phase change by a reactance component $X_1$ of the impedance $Z_1$ and reflected to the input port 1 and the output port 2.

Since the variable impedance elements 5*a* and 5*b* have the same impedance $Z_1$, the signals reflected from the variable impedance elements 5*a* and 5*b* to the input port 1 have equal amplitudes and opposite phases and thereby cancel each other out. The signals reflected from the variable impedance elements 5*a* and 5*b* to the output port 2 are synthesized with equal amplitudes and the same phase. Accordingly, by changing the impedance $Z_1$ of the variable impedance elements 5*a* and 5*b*, it is possible to allow the configuration shown in FIG. 62 to operate as a phase shifter or an attenuator while keeping the I/O impedance matching at the frequency $f_0$.

To allow the configuration shown in FIG. 62 to operate as a phase shifter, it is only necessary to set the variable impedance elements 5*a* and 5*b* such that the impedance $Z_1$ is substantially constituted by the reactance component $X_1$, and continuously change this reactance component $X_1$. A phase change amount θ of the phase shifter when the reactance component is changed from $X_1$ to $(X_1+\Delta X_1)$ is given by $$\theta = -2\tan^{-1}\left(\frac{X_1 + \Delta X_1}{Z_0}\right) + 2\tan^{-1}\left(\frac{X_1}{Z_0}\right)[\mathrm{rad}] \tag{1}$$

To permit the configuration shown in FIG. 62 to operate as an attenuator, it is only necessary to set the variable impedance elements 5*a* and 5*b* such that the impedance $Z_1$ is substantially constituted by the resistance component $R_1$, and continuously change this resistance component $R_1$. An attenuation amount L of this attenuator is given by $$L = 20\log_{10}\left|\frac{Z_0 + R_1}{Z_0 - R_1}\right|[\mathrm{dB}] \tag{2}$$

FIG. 63 shows a practical example of the conventional phase shifter shown in FIG. 62. The same reference numerals as in FIG. 62 denote the same parts in FIG. 63, and a detailed description thereof will be omitted. This phase shifter shown in FIG. 63 uses variable capacitors 11*a* and 11*b* as the variable impedance elements 5*a* and 5*b*, respectively. Assume that the high-frequency transmission lines 3*a* to 3*d* are lossless, the I/O impedance $Z_0$=50Ω, and the frequency $f_0$=5 GHz.

FIG. 64 shows the simulation results of the amplitude characteristics (a forward transfer factor $S_{21}$ and an input reflection coefficient $S_{11}$). The abscissa indicates the frequency [GHz], the left ordinate indicates the forward transfer factor $S_{21}$ [dB], and the right ordinate indicates the input reflection coefficient $S_{11}$ [dB]. FIG. 65 shows the simulation results of the phase characteristic (forward transfer factor $S_{21}$). The abscissa indicates the frequency [GHz], and the ordinate indicates the forward transfer factor $S_{21}$ [deg.] Referring to FIGS. 64 and 65, a capacitance $C_1$ of the variable capacitors 11*a* and 11*b* is changed to 0.05, 0.1, 0.3, 0.5, and 0.7 pF. As shown in FIGS. 64 and 65, at frequency f=4.5 GHz to 5.4 GHz, an amplitude fluctuation is 0.5 dB or less, an input reflection amount is −10 dB or less (FIG. 64), and a phase change amount is 60° or more (FIG. 65).

FIG. 66 shows a practical example of the conventional attenuator shown in FIG. 62. The same reference numerals as in FIG. 62 denote the same parts in FIG. 66, and a detailed description thereof will be omitted. The attenuator shown in FIG. 66 uses variable resistors 21*a* and 21*b* as the variable impedance elements 5*a* and 5*b,* respectively. Assuming that the high-frequency transmission lines are lossless, the I/O impedance $Z_0$=50Ω, and the frequency $f_0$=5 GHz.

FIG. 67 shows the simulation results of the amplitude characteristic (forward transfer factor $S_{21}$). The abscissa indicates the frequency [GHz], and the ordinate indicates the forward transfer factor $S_{21}$ [dB]. FIG. 68 shows the simulation results of the amplitude characteristic (input reflection coefficient $S_{11}$). The abscissa indicates the frequency [GHz], and the ordinate indicates the input reflection coefficient $S_{11}$ [deg.] Referring to FIGS. 67 and 68, the resistance $R_1$ of the variable resistors 21*a* and 21*b* is changed to 0, 10, 20, 30, and 50Ω. As shown in FIGS. 67 and 68, at frequency f=4.5 GHz to 5.5 GHz, an attenuation amount is 14 dB or more (FIG. 67), and an input reflection amount is −14 dB or less (FIG. 68).

Next, a conventional nonlinear signal generator will be described below. FIG. 69 shows this conventional nonlinear signal generator. This nonlinear signal generator uses a 90° branch line hybrid. For example, the basic operating principle of this nonlinear signal generator is described in Japanese Patent Laid-Open No. 63-189004. The same reference numerals as in FIG. 62 denote the same parts in FIG. 69, and a detailed description thereof will be omitted.

Similar to FIG. 62, the nonlinear signal generator shown in FIG. 69 has a 90° branch line hybrid constituted by four high-frequency transmission lines 3*a* to 3*d* whose electrical length at a frequency $f_0$ is 90°.

An I/O terminal 4*c* of this 90° branch line hybrid is connected to a nonlinear element composed of diodes 31*a* and 31*b,* a terminating resistor 33*a,* DC blocking capacitors 34*a* and 35*a,* and a bias terminal 36. More specifically, the I/O terminal 4*c* of the 90° branch line hybrid is connected to the anode of the diode 31*a,* the cathode of the diode 32*a,* and one terminal of the terminating resistor 33*a.* The anode of the diode 32*a* and the other terminal of the terminating resistor 33*a* are grounded in a high-frequency manner by the DC blocking capacitors 35*a* and 34*a,* respectively. The cathode of the diode 31*a* is directly grounded. The bias terminal 36 is connected to the connecting portion between the diode 32*a* and the capacitor 35*a.* This allows a bias current from this bias terminal 36 to flow through the diodes 31*a* and 32*a.*

Analogously, an I/O terminal 4*d* of the 90° branch line hybrid is connected to a nonlinear element composed of diodes 31*b* and 32*b,* a terminating resistor 33*b,* DC blocking capacitors 34*b* and 35*b,* and the bias terminal 36. More specifically, the I/O terminal 4*d* of the 90° branch line hybrid is connected to the anode of the diode 31*b,* the cathode of the diode 32*b,* and one terminal of the terminating resistor 33b. The anode of the diode 32*b* and the other terminal of the terminating resistor 33*b* are grounded in a high-frequency manner by the DC blocking capacitors 35*b* and 34*b,* respectively. The cathode of the diode 31*b* is directly grounded. The bias terminal 36 is connected to the connecting portion between the diode 32*b* and the capacitor 35*b.* This permits a bias current from this bias terminal 36 to flow through the diodes 31*b* and 32*b.*

The operation of this conventional arrangement shown in FIG. 69 will be described below. An input signal from an input port 1 is distributed by the 90° branch line hybrid constituted by the high-frequency transmission lines 3*a* to 3*d* and output from the I/O terminals 4*c* and 4*d* of this 90° branch line hybrid. The output signal from the I/O terminal 4*c* is input to the diodes 31*a* and 32*a* and the terminating resistor 33*a.* The output signal from the I/O terminal 4*d* is input to the diodes 31*b* and 32*b* and the terminating resistor 33*b.*

Assume that the bias current from the bias terminal 36 is appropriately set such that the value of the synthetic impedance of the diodes 31*a* and 32*a* and the terminating resistor 33*a* is equal to the characteristic impedance $Z_0$, and that the value of the synthetic impedance of the diodes 31*b* and 32*b* and the terminating resistor 33*b* is equal to the characteristic impedance $Z_0$. In this case, a linear signal component of the input signal is suppressed by the above synthetic impedance, so only a nonlinear signal generated in accordance with the input signal power by the diodes 31*a* and 32*a* and the diodes 31*b* and 32*b* is output from an output port 2.

In the above conventional phase shifter, attenuator, and nonlinear signal generator using a 90° branch line hybrid as described above, however, four high-frequency transmission lines 3*a* to 3*d* whose electrical length at the frequency $f_0$ is 90° are necessary to form the 90° branch line hybrid, and this increases the device size. Accordingly, when any of these conventional phase shifter, attenuator, and nonlinear signal generator is applied to, e.g., an array antenna required to mount a large number of elements in a small space or to a nonlinear distortion compensation circuit of a power amplifier required to be small in size and light in weight, the entire device size undesirably increases.

SUMMARY OF THE INVENTION

It is, therefore, a principal object of the present invention to decrease the size of a phase shifter having matched input and output impedances.

It is another object of the present invention to decrease the size of an attenuator having matched input and output impedances.

It is still another object of the present invention to decrease the size of a nonlinear signal generator having matched input and output impedances.

To achieve the above objects, according to an aspect of the present invention, there is provided a phase shifter comprising a first high-frequency impedance element connected between an input port and an output port and having an impedance substantially constituted by a reactance, a first high-frequency phase shifting element having one terminal connected to the input port and a phase change amount of 90° at a frequency $f_0$, the first high-frequency phase shifting element having an impedance converting function, a second high-frequency phase shifting element connected between the output port and the other terminal of the first high-frequency phase shifting element and having a phase change amount of 90° at the frequency $f_0$, the second high-frequency phase shifting element having an impedance converting function, and a second high-frequency impedance element having one terminal connected to a common connection point between the first and second high-frequency phase shifting elements, the other terminal grounded, and an impedance substantially constituted by a reactance wherein the impedance of the first high-frequency impedance element and the impedance of the second high-frequency impedance element are set such that input and output reflection coefficients at the frequency $f_0$ are approximately zero.

DESCRIPTION OF THE PREFERRED EMBODIMENTS

The most principal characteristic feature of the present invention is to realize a high-frequency circuit having matched input and output impedances by using two high-frequency phase shifting elements whose phase change amount at a frequency $f_0$ is 90° and having an impedance converting function. For example, when high-frequency transmission lines whose electrical length at the frequency $f_0$ is 90° are used as these high-frequency phase shifting elements, the number of necessary high-frequency transmission lines is half that when a high-frequency circuit is constituted by using a conventional 90° branch line hybrid requiring four such high-frequency transmission lines. Therefore, the present invention can miniaturize a phase shifter, an attenuator, and a nonlinear signal generator. Embodiments of the present invention will be described in detail below with reference to the accompanying drawings.

First Embodiment: Phase Shifter

Figure 1:
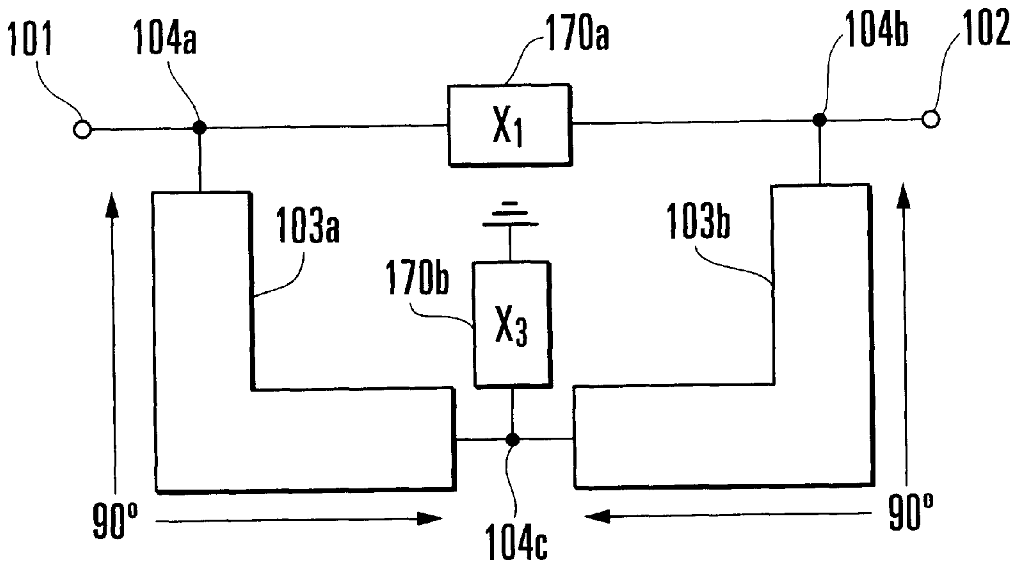
FIG. 1 is a circuit diagram showing the arrangement of a phase shifter according to the present invention.

I. Configuration Using Variable Reactance Elements as High-frequency Impedance Elements FIG. 1 shows the arrangement of a phase shifter according to the present invention.

A variable reactance element (first high-frequency impedance element) 170*a* is connected between an input port 101 and an output port 102. The impedance of this variable reactance element 170*a* is substantially constituted by a reactance. Let $X_1$ denote this reactance. This reactance $X_1$ is variable. Also, let $Z_0$ be the input impedance of the input port 101 and the output impedance of the output port 102.

The input port 101 is connected to one terminal (I/O terminal 104*a*) of a first high-frequency phase shifting element 103*a*. The output port 102 is connected to one terminal (I/O terminal 104*b*) of a second high-frequency phase shifting element 103*b*. The other terminal of the high-frequency phase shifting element 103*a* is connected to that of the high-frequency phase shifting element 103*b* (I/O terminal 104*c*). Both the high-frequency phase shifting elements 103*a* and 103*b* have a phase change amount of 90° at a frequency f and have an impedance converting function. Let $Z_2$ be an equivalent characteristic impedance when the high-frequency phase shifting elements 103*a* and 103*b* are replaced by high-frequency transmission lines.

The I/O terminal 104*c* of the high-frequency phase shifting elements is connected to one terminal of a variable reactance element (second high-frequency impedance element) 170*b*. The other terminal of this variable reactance element 170*b* is grounded. The impedance of this reactance element 170*b* is substantially constituted by a reactance. Let $X_3$ be this reactance. This reactance $X_3$ is variable.

The impedance converting function of the high-frequency phase shifting elements 103*a* and 103*b* is to convert the impedance of the variable reactance element 170*b* and combine this converted impedance of the variable reactance element 170*b* with the impedance of the variable reactance element 170*a* such that the input and output reflection coefficients viewed from the I/O terminals 104*a* and 104*b* of the high-frequency phase shifting elements are approximately zero, i.e., such that the input and output impedances are matched.

The operation of the phase shifter shown in FIG. 1 will be described below.

An input signal from the input port 101 is distributed to a first path passing through the variable reactance element 170*a* and a second path passing through the high-frequency phase shifting element 103*a*, the variable reactance element 170*b*, and the high-frequency phase shifting element 103*b*. A signal passing though the first path is given a predetermined phase change by the reactance $X_1$ of the variable reactance element 170*a*. If its frequency is $f_0$, a signal passing through the second path is given 90° phase changes by the high-frequency phase shifting elements 103*a* and 103*b* and given a predetermined phase change by the reactance $X_3$ of the variable reactance element 170*b*.

The reactances $X_1$ and $X_3$ of the variable reactance elements 170*a* and 170*b* are so set that the signals passing through these paths are synthesized by the I/O terminal 104*b* of the high-frequency phase shifting element and output from the output port 102 while equal amplitudes are held. By simultaneously and continuously changing the reactances $X_1$ and $X_3$ of the variable reactance elements 170*a* and 170*b* thus set, a phase change amount of the phase shifter shown in FIG. 1 can be continuously changed.

An input reflection coefficient $S_{11}$ and an output reflection coefficient $S_{22}$ of the phase shifter shown in FIG. 1 can be expressed by $$S_{11} = S_{22} = \frac{\frac{Z_2^2}{4Z_0^2}X_1 - X_3}{\frac{Z_2^2}{4Z_0^2}X_1 + X_3 + \frac{X_1X_3 + Z_2^2}{2Z_0}} \tag{3}$$

Therefore, when the reactance $X_3$ is set by a relation $$X_3 = \frac{Z_2^2}{4Z_0^2}X_1 \tag{4}$$

the input and output reflection coefficients $S_{11}$ and $S_{22}$ at the frequency $f_0$ become zero, so the input and output impedances at the frequency $f_0$ can be matched. Note that when a phase shifter is actually formed, the input and output reflection coefficients $S_{11}$ and $S_{22}$ at the frequency $f_0$ need not be strictly zero; a satisfactory effect can be obtained if these reflection coefficients are approximately zero.

In this case, a forward transfer factor $S_{21}$ and a reverse transfer factor $S_{12}$ of the phase shifter shown in FIG. 1 can be expressed by $$S_{21} = S_{12} = \frac{2Z_0 - X_1}{2Z_0 + X_1} \tag{5}$$

A phase change amount θ of the phase shifter when the reactances $X_1$ and $X_3$ of the variable reactance elements 170*a* and 170*b* are changed from $X_1$ to $(X_1+\Delta X_1)$ while the relationship of equation (4) is held is given by $$\theta = -2\tan^{-1}\left(\frac{X_1 + \Delta X_1}{2Z_0}\right) + 2\tan^{-1}\left(\frac{X_1}{2Z_0}\right)[\text{rad}] \tag{6}$$

The high-frequency phase shifting elements 103*a* and 103*b* whose phase change amount at the frequency $f_0$ is 90° and having an impedance converting function are constructed by using, e.g., ① high-frequency transmission lines whose electrical length at the frequency $f_0$ is 90° (FIG. 2), ② π circuits each composed of a high-frequency transmission line whose electrical length at the frequency $f_0$ is smaller than 90° and two capacitors each having one terminal connected to a corresponding one of the two terminals of the high-frequency transmission line and the other terminal grounded (FIG. 3), and ③ a lumped constant circuit constituted by inductors and capacitors (FIGS. 4 to 7). When these configurations are employed, the phase shifter can be miniaturized in the order of ①>②>③. Configurations of the phase shifter using various high-frequency phase shifting elements 103*a* and 103*b* will be described below.

[First Configuration]

Figure 2:
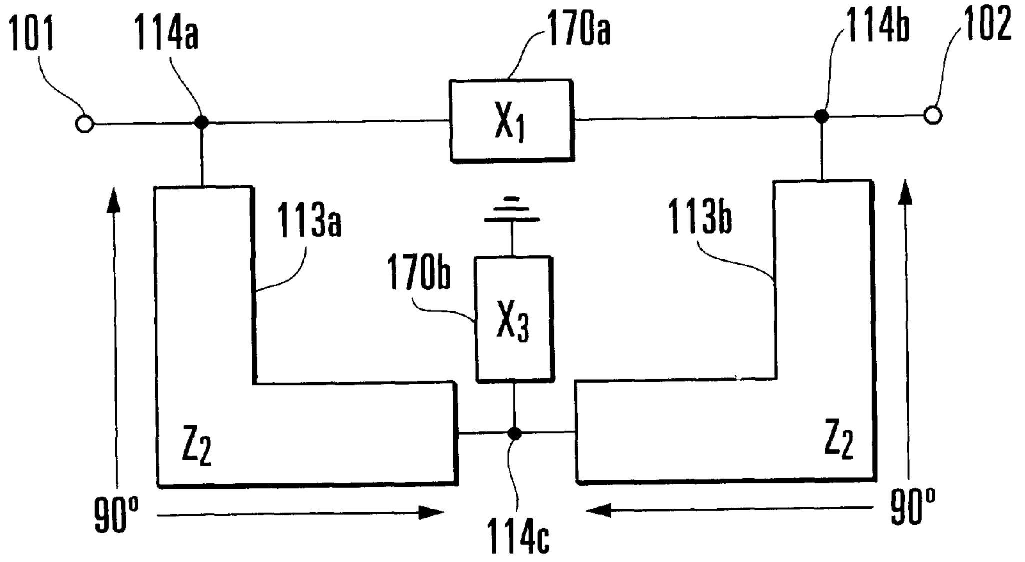
FIG. 2 is a circuit diagram showing the first configuration of the phase shifter shown in FIG. 1.

FIG. 2 shows the first configuration of the phase shifter shown in FIG. 1. The same reference numerals as in FIG. 1 denote the same parts in FIG. 2, and a detailed description thereof will be omitted. This first configuration uses high-frequency transmission lines 113*a* and 113*b* whose electrical length at the frequency $f_0$ is 90° as the high-frequency phase shifting elements 103*a* and 103*b*, respectively, having the impedance converting function. I/O terminals 114*a*, 114*b*, and 114*c* of these high-frequency transmission lines correspond to the I/O terminals 104*a*, 104*b*, and 104*c*, respectively, of the high-frequency phase shifting elements.

Letting $Z_2$ be the characteristic impedance of the high-frequency transmission lines 113*a* and 113*b*, an input reflection coefficient $S_{11}$ and an output reflection coefficient $S_{22}$ of this phase shifter can be expressed in the same way as equation (3). Therefore, when the reactances $X_1$ and $X_3$ of the variable reactance elements 170*a* and 170*b* are set to have the relationship as indicated by equation (4), the input and output reflection coefficients at the frequency $f_0$ become zero, so the input and output impedances at the frequency $f_0$ can be matched. In this case, a forward transfer factor $S_{21}$ and a reverse transfer factor $S_{12}$ of this phase shifter can be expressed in the same manner as in equation (5).

[Second Configuration]

Figure 3:
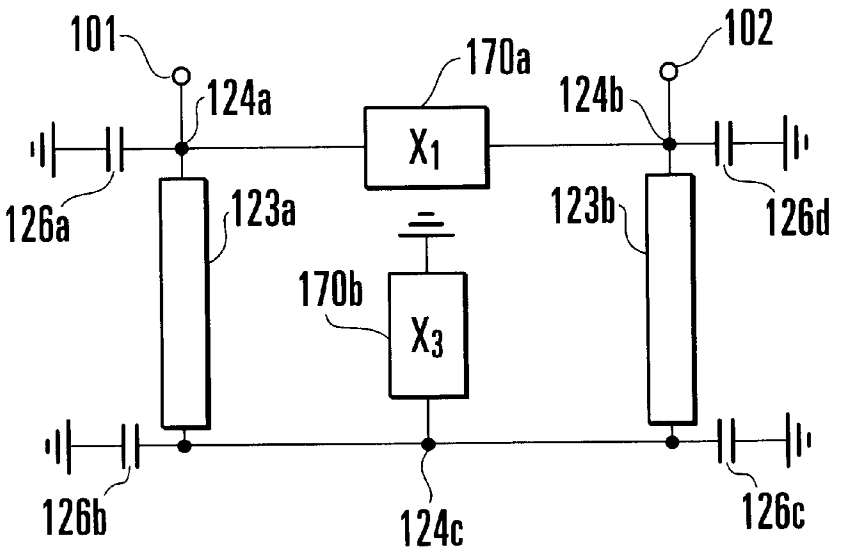
FIG. 3 is a circuit diagram showing the second configuration of the phase shifter shown in FIG. 1.

FIG. 3 shows the second configuration of the phase shifter shown in FIG. 1. The same reference numerals as in FIG. 1 denote the same parts in FIG. 3, and a detailed description thereof will be omitted. In this second configuration, π circuits in each of which the two terminals of a high-frequency transmission line are grounded via capacitors are used as the high-frequency phase shifting elements 103*a* and 103*b* having the impedance converting function.

High-frequency transmission lines 123*a* and 123*b* have an electrical length θ smaller than 90° at the frequency $f_0$. One terminal of a capacitor 126*a* is connected to one terminal of the high-frequency transmission line 123*a*, and one terminal of a capacitor 126*b* is connected to the other terminal of the high-frequency transmission line 123*a*. Likewise, one terminal of a capacitor 126*d* is connected to one terminal of the high-frequency transmission line 123*b*, and one terminal of a capacitor 126*c* is connected to the other terminal of the high-frequency transmission line 123*b*. The other terminal of each of these capacitors 126*a* to 126*d* is grounded. The high-frequency transmission line 123*a* and the capacitors 126*a* and 126*b* constitute one π circuit, and the high-frequency transmission line 123*b* and the capacitors 126*c* and 126*d* constitute the other π circuit. I/O terminals 124*a*, 124*b*, and 124*c* of these π circuits correspond to the I/O terminals 104*a*, 104*b*, and 104*c*, respectively, of the high-frequency phase shifting elements.

Let Z be the characteristic impedance of the high-frequency transmission lines 123*a* and 123*b*, and C be the capacitance of the capacitors 126*a* to 126*d*. When this capacitance C is set as $$C = \frac{1}{2\pi f_0 Z \tan\theta} \tag{7}$$

an input reflection coefficient $S_{11}$ and an output reflection coefficient $S_{22}$ of this phase shifter can be expressed by $$S_{11} = S_{22} = \frac{\dfrac{(Z\sin\theta)^2}{4Z_0^2}X_1 - X_3}{\dfrac{(Z\sin\theta)^2}{4Z_0^2}X_1 + X_3 + \dfrac{X_1X_3 + (Z\sin\theta)^2}{2Z_0}} \tag{8}$$

Therefore, when the reactance $X_3$ of the variable reactance element 170*b* is set by a relation $$X_3 = \frac{(Z\sin\theta)^2}{4Z_0^2}X_1 \tag{9}$$

the input and output reflection coefficients at the frequency $f_0$ become zero, so the input and output impedances at the frequency $f_0$ can be matched. In this case, a forward transfer factor $S_{21}$ and a reverse transfer factor $S_{12}$ of this phase shifter can be expressed in the same manner as in equation (5).

Note that this second configuration includes the discrete capacitors 126*b* and 126*c*. However, these capacitors 126*b* and 126*c* are connected together to the I/O terminal 124*c*, so they can also be replaced by a single capacitor whose capacitance is 2 C.

[Third Configuration]

Figure 4:
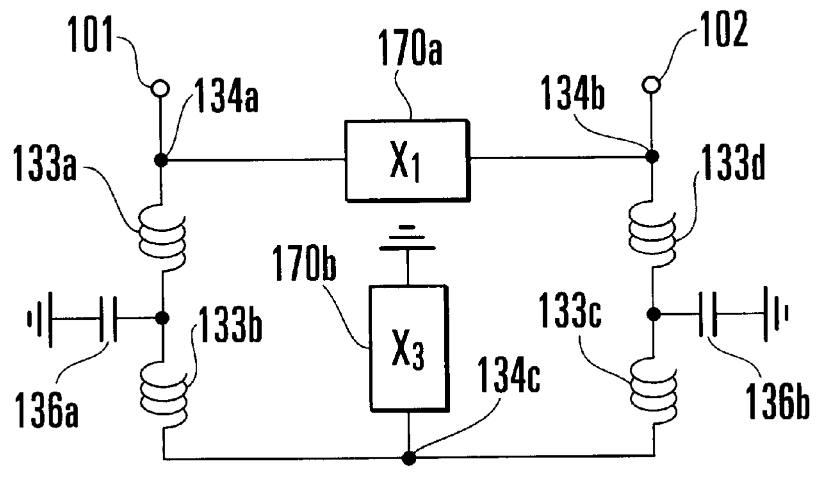
FIG. 4 is a circuit diagram showing the third configuration of the phase shifter shown in FIG. 1.

FIG. 4 shows the third configuration of the phase shifter shown in FIG. 1. The same reference numerals as in FIG. 1 denote the same parts in FIG. 4, and a detailed description thereof will be omitted. In this third configuration, T circuits in each of which the connection point between two inductors is grounded via a capacitor are used as the high-frequency phase shifting elements 103*a* and 103*b* having the impedance converting function.

One terminal of a capacitor 136*a* is grounded, and its other terminal is connected to the connection point between inductors 133a and 133b. One terminal of a capacitor 136b is grounded, and its other terminal is connected to the connection point between inductors 133c and 133d. The capacitor 136a and the inductors 133a and 133b constitute one T circuit, and the capacitor 136b and the inductors 133c and 133d constitute the other T circuit. I/O terminals 134a, 134b, and 134c of these T circuits correspond to the I/O terminals 104a, 104b, and 104c, respectively, of the high-frequency phase shifting elements.

Let L be the inductance of the inductors 133a to 133d, and C be the capacitance of the capacitors 136a and 136b. When this capacitance C is set as $$C = \frac{1}{(2\pi f_0)^2 L} \qquad (10)$$

an input reflection coefficient $S_{11}$ and an output reflection coefficient $S_{22}$ of this phase shifter can be expressed by $$S_{11} = S_{22} = \frac{\frac{(2\pi f_0 L)^2}{4Z_0^2} X_1 - X_3}{\frac{(2\pi f_0 L)^2}{4Z_0^2} X_1 + X_3 + \frac{X_1 X_3 + (2\pi f_0 L)^2}{2Z_0}} \qquad (11)$$

Therefore, when the reactance $X_3$ of the variable reactance element 170b is set by a relation $$X_3 = \frac{(2\pi f_0 L)^2}{4Z_0^2} X_1 \qquad (12)$$

the input and output reflection coefficients at the frequency $f_0$ become zero, so the input and output impedances at the frequency $f_0$ can be matched. In this case, a forward transfer factor $S_{21}$ and a reverse transfer factor $S_{12}$ of this phase shifter can be expressed in the same manner as in equation (5).

[Fourth Configuration]

Figure 5:
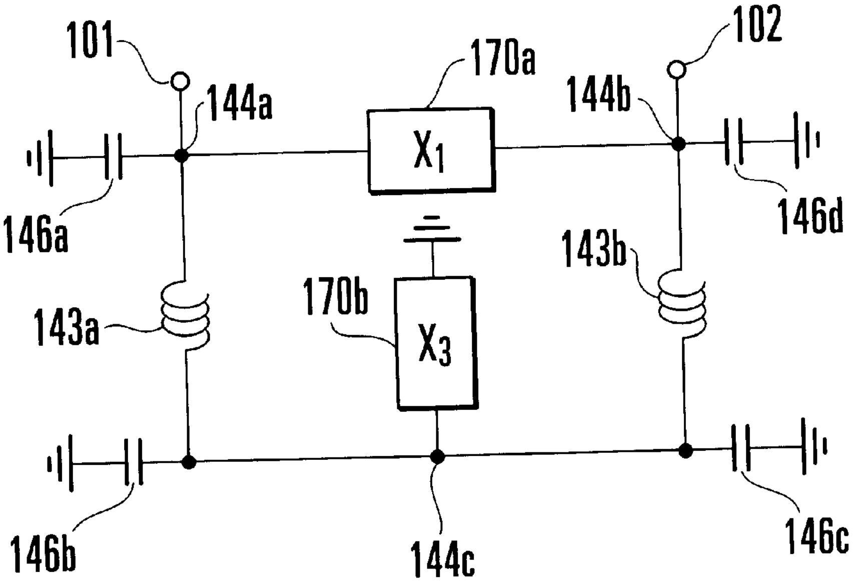
FIG. 5 is a circuit diagram showing the fourth configuration of the phase shifter shown in FIG. 1.

FIG. 5 shows the fourth configuration of the phase shifter shown in FIG. 1. The same reference numerals as in FIG. 1 denote the same parts in FIG. 5, and a detailed description thereof will be omitted. In this fourth configuration, π circuits in each of which the two terminals of an inductor are grounded via capacitors are used as the high-frequency phase shifting elements 103a and 103b having the impedance converting function.

One terminal of a capacitor 146a is connected to one terminal of an inductor 143a, and one terminal of a capacitor 146b is connected to the other terminal of the inductor 143a. Likewise, one terminal of a capacitor 146d is connected to one terminal of an inductor 143b, and one terminal of a capacitor 146c is connected to the other terminal of the inductor 143b. The other terminal of each of these capacitors 146a to 146d is grounded. The inductor 143a and the capacitors 146a and 146b constitute one π circuit, and the inductor 143b and the capacitors 146c and 146d constitute the other π circuit. I/O terminals 144a, 144b, and 144c of these π circuits correspond to the I/O terminals 104a, 104b, and 104c, respectively, of the high-frequency phase shifting elements.

Let L be the inductance of the inductors 143a and 143b, and C be the capacitance of the capacitors 146a to 146d. When this capacitance C is set as equation (10), an input reflection coefficient $S_{11}$ and an output reflection coefficient $S_{22}$ of this phase shifter can be expressed in the same way as in equation (11). Therefore, when the reactances $X_1$ and $X_3$ of the variable reactance elements 170a and 170b are set to have the relationship indicated by equation (12), the input and output reflection coefficients at the frequency fo become zero, so the input and output impedances at the frequency $f_0$ can be matched. In this case, a forward transfer factor $S_{21}$ and a reverse transfer factor $S_{12}$ of this phase shifter can be expressed in the same manner as in equation (5).

Note that this fourth configuration includes the discrete capacitors 146b and 146c. However, these capacitors 146b and 146c are connected together to the I/O terminal 144c, so they can also be replaced by a single capacitor whose capacitance is 2 C.

[Fifth Configuration]

Figure 6:
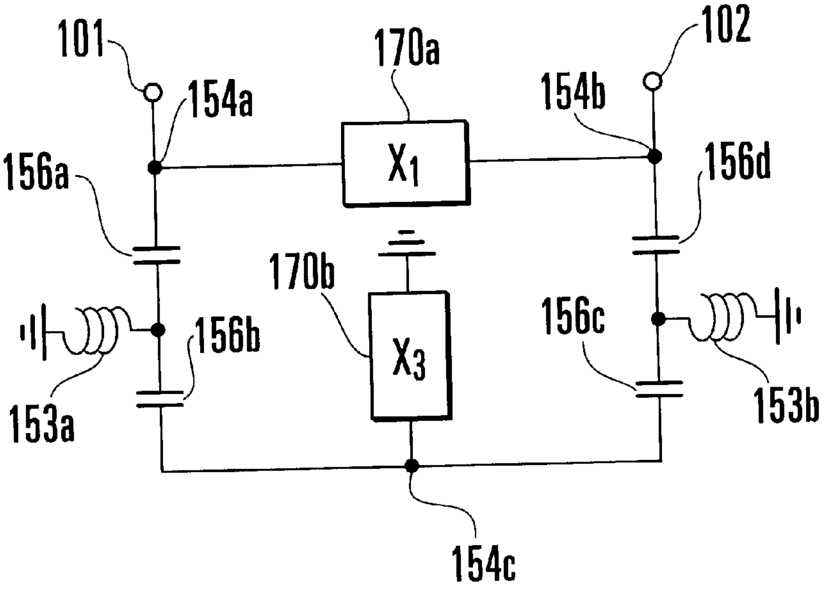
FIG. 6 is a circuit diagram showing the fifth configuration of the phase shifter shown in FIG. 1.

FIG. 6 shows the fifth configuration of the phase shifter shown in FIG. 1. The same reference numerals as in FIG. 1 denote the same parts in FIG. 6, and a detailed description thereof will be omitted. In this fifth configuration, T circuits in each of which the connection point between two capacitors is grounded via an inductor are used as the high-frequency phase shifting elements 103a and 103b having the impedance converting function.

One terminal of an inductor 153a is grounded, and its other terminal is connected to the connection point between capacitors 156a and 156b. One terminal of an inductor 153b is grounded, and its other terminal is connected to the connection point between capacitors 156c and 156d. The inductor 153a and the capacitors 156a and 156b constitute one T circuit, and the inductor 153b and the capacitors 156c and 156d constitute the other T circuit. I/O terminals 154a, 154b, and 154c of these T circuits correspond to the I/O terminals 104a, 104b, and 104c, respectively, of the high-frequency phase shifting elements.

Let L be the inductance of the inductors 153a and 153b, and C be the capacitance of the capacitors 156a to 156d. When this capacitance C is set as equation (10), an input reflection coefficient $S_{11}$ and an output reflection coefficient $S_{22}$ of this phase shifter can be expressed in the same way as in equation (11). Therefore, when the reactances $X_1$ and $X_3$ of the variable reactance elements 170a and 170b are set to have the relationship indicated by equation (12), the input and output reflection coefficients at the frequency $f_0$ become zero, so the input and output impedances at the frequency $f_0$ can be matched. In this case, a forward transfer factor $S_{21}$ and a reverse transfer factor $S_{12}$ of this phase shifter can be expressed in the same manner as in equation (5).

[Sixth Configuration]

Figure 7:
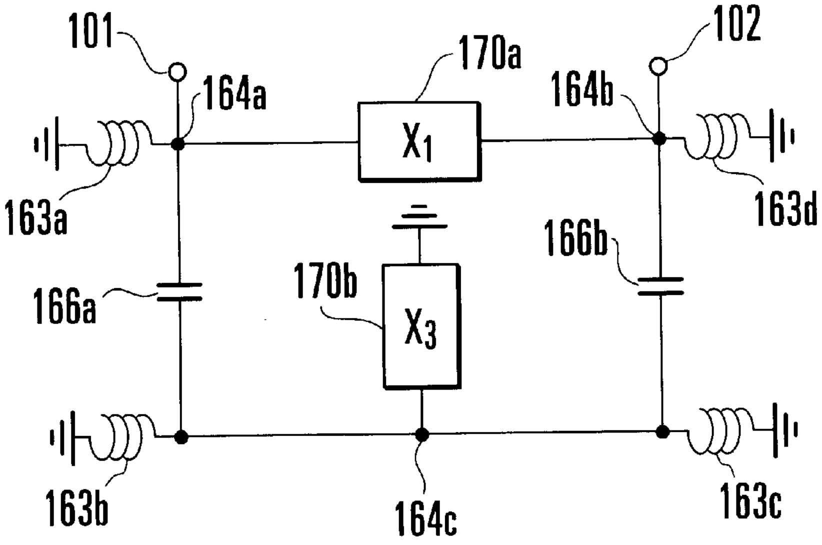
FIG. 7 is a circuit diagram showing the sixth configuration of the phase shifter shown in FIG. 1.

FIG. 7 shows the sixth configuration of the phase shifter shown in FIG. 1. The same reference numerals as in FIG. 1 denote the same parts in FIG. 7, and a detailed description thereof will be omitted. In this sixth configuration, π circuits in each of which the two terminals of a capacitor are grounded via inductors are used as the high-frequency phase shifting elements 103a and 103b having the impedance converting function.

One terminal of an inductor 163a is connected to one terminal of a capacitor 166a, and one terminal of an inductor 163b is connected to the other terminal of the capacitor 166a. Likewise, one terminal of an inductor 163d is connected to one terminal of a capacitor 166b, and one terminal of an inductor 163c is connected to the other terminal of the capacitor 166b. The other terminal of each of these inductors 163a to 163d is grounded. The inductors 163a and 163b and the capacitor 166a constitute one π circuit, and the inductors 163c and 163d and the capacitor 166b constitute the other π circuit. I/O terminals 164a, 164b, and 164c of these π circuits correspond to the I/O terminals 104a, 104b, and 104c, respectively, of the high-frequency phase shifting elements.

Let L be the inductance of the inductors 163*a* to 163*d,* and C be the capacitance of the capacitors 166*a* and 166*b*. When this capacitance C is set as equation (10), an input reflection coefficient $S_{11}$ and an output reflection coefficient $S_{22}$ of this phase shifter can be expressed in the same way as in equation (11). Therefore, when the reactances $X_1$ and $X_3$ of the variable reactance elements 170*a* and 170*b* are set to have the relationship indicated by equation (12), the input and output reflection coefficients at the frequency $f_0$ become zero, so the input and output impedances at the frequency $f_0$ can be matched. In this case, a forward transfer factor $S_{21}$ and a reverse transfer factor $S_{12}$ of this phase shifter can be expressed in the same manner as in equation (5).

Note that this sixth configuration includes the discrete inductors 163*b* and 163*c*. However, these inductors 163*b* and 163*c* are connected together to the I/O terminal 164*c,* so they can also be replaced by a single inductor whose inductance is L/2.

[Practical Examples of Phase Shifter and Their Characteristics]

Practical examples of the phase shifter shown in FIG. 1 and the simulation results of the amplitude characteristics and phase characteristics of these practical examples will be described below.

Figure 8:
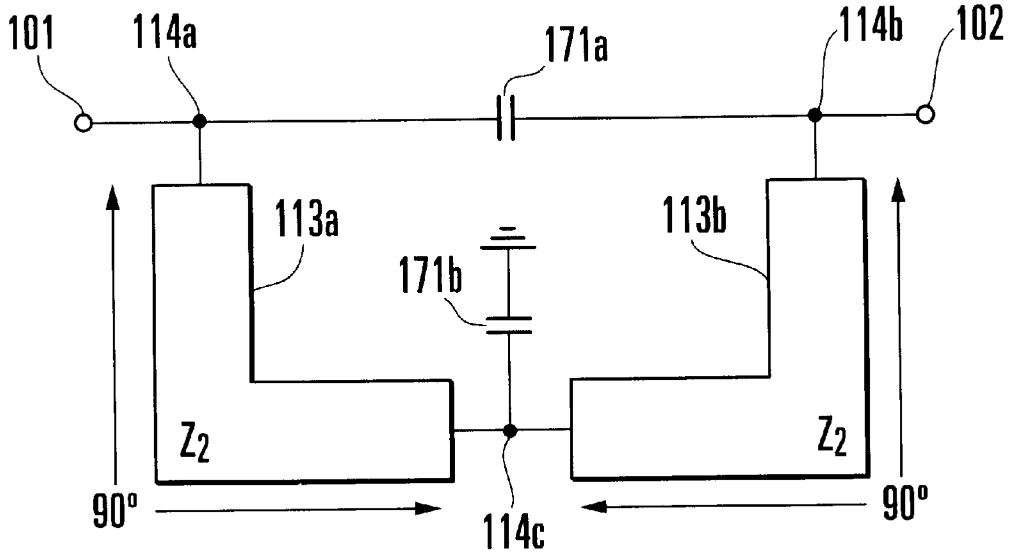
FIG. 8 is a view showing an actual circuit to which the first configuration of the phase shifter shown in FIG. 2 is applied.

FIG. 8 shows an actual circuit to which the first configuration of the phase shifter shown in FIG. 2 is applied. The same reference numerals as in FIGS. 1 and 2 denote the same parts in FIG. 8, and a detailed description thereof will be omitted.

In this phase shifter shown in FIG. 8, variable capacitors 171*a* and 171*b* are used as the variable reactance elements 170*a* and 170*b,* respectively. Assume that the electrical length of the high-frequency transmission lines 113*a* and 113*b* at the frequency $f_0$=5 GHz is 90°. Assume also that these high-frequency transmission lines 113*a* and 113*b* are lossless and the I/O impedance $Z_0$=50Ω.

Figure 9:
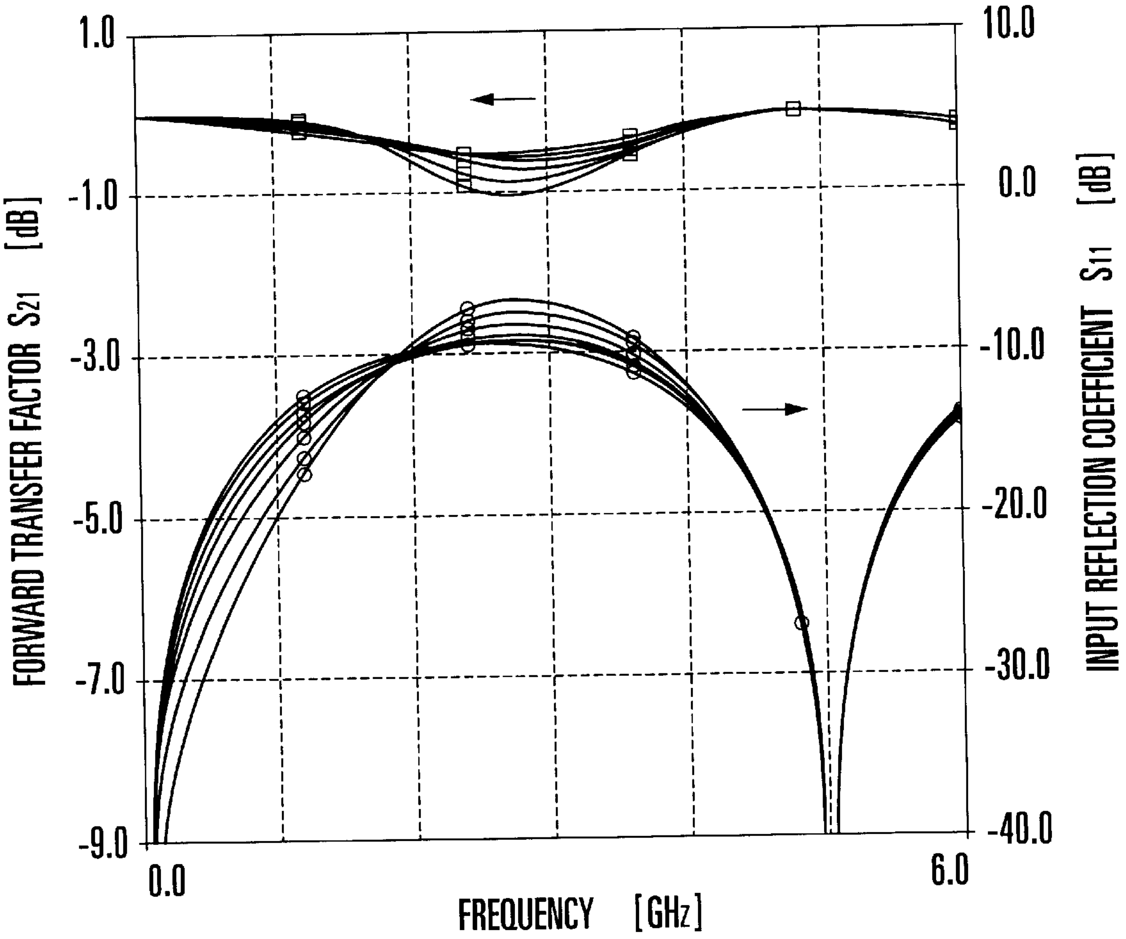
FIG. 9 is a graph showing an example of the amplitude characteristics of the phase shifter shown in FIG. 8.

FIG. 9 shows the simulation results of the amplitude characteristics (forward transfer factor $S_{21}$ and input reflection coefficient $S_{11}$) when the characteristic impedance $Z_2$ of the high-frequency transmission lines 113*a* and 113*b* is $Z_2$=70.7Ω. The abscissa indicates the frequency [GHz], the left ordinate indicates the forward transfer factor $S_{21}$ [dB], and the right ordinate indicates the input reflection coefficient $S_{11}$ [dB]. Note that FIGS. 11, 14, 17, 20, 23, 26, 30, 32, 35, 37, 40, 42, 45, and 47 to be presented later are also amplitude graphs, and their abscissas and ordinates are the same as in FIG. 9.

Figure 10:
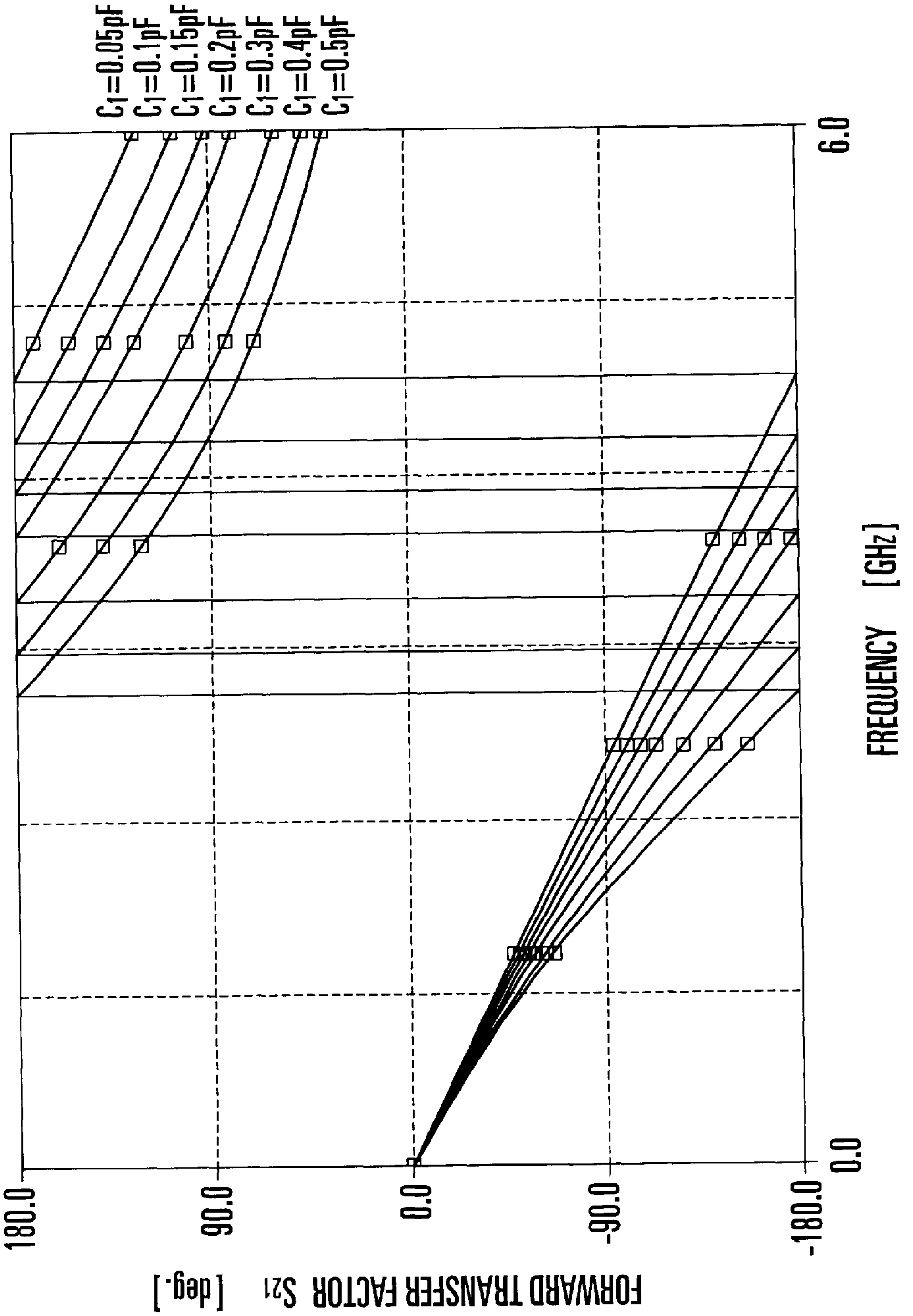
FIG. 10 is a graph showing an example of the phase characteristics of the phase shifter shown in FIG. 8.

FIG. 10 shows the simulation results of the phase characteristics (forward transfer factor $S_{21}$) when the characteristic impedance $Z_2$ of the high-frequency transmission lines 113*a* and 113*b* is $Z_2$=70.7Ω. The abscissa indicates the frequency [GHz], and the ordinate indicates the forward transfer factor $S_{21}$ [deg.] Note that FIGS. 12, 15, 18, 21, 24, 27, 31, 33, 36, 38, 41, 43, 46, and 48 to be presented later are also phase graphs, and their abscissas and ordinates are the same as in FIG. 10.

Referring to FIGS. 9 and 10, a capacitance $C_3$ of the variable capacitor 171*b* is set to be twice a capacitance $C_1$ of the variable capacitor 171*a,* and this capacitance $C_1$ of the variable capacitor 171*a* is changed to 0.05, 0.1, 0.15, 0.2, 0.3, 0.4, and 0.5 pF. As shown in FIGS. 9 and 10, at a frequency f=4.0 to 6.0 GHz, an amplitude fluctuation is 0.5 dB or less, an input reflection amount is −12 dB or less (FIG. 9), and a phase change amount is 80° or more (FIG. 10).

Figure 11:
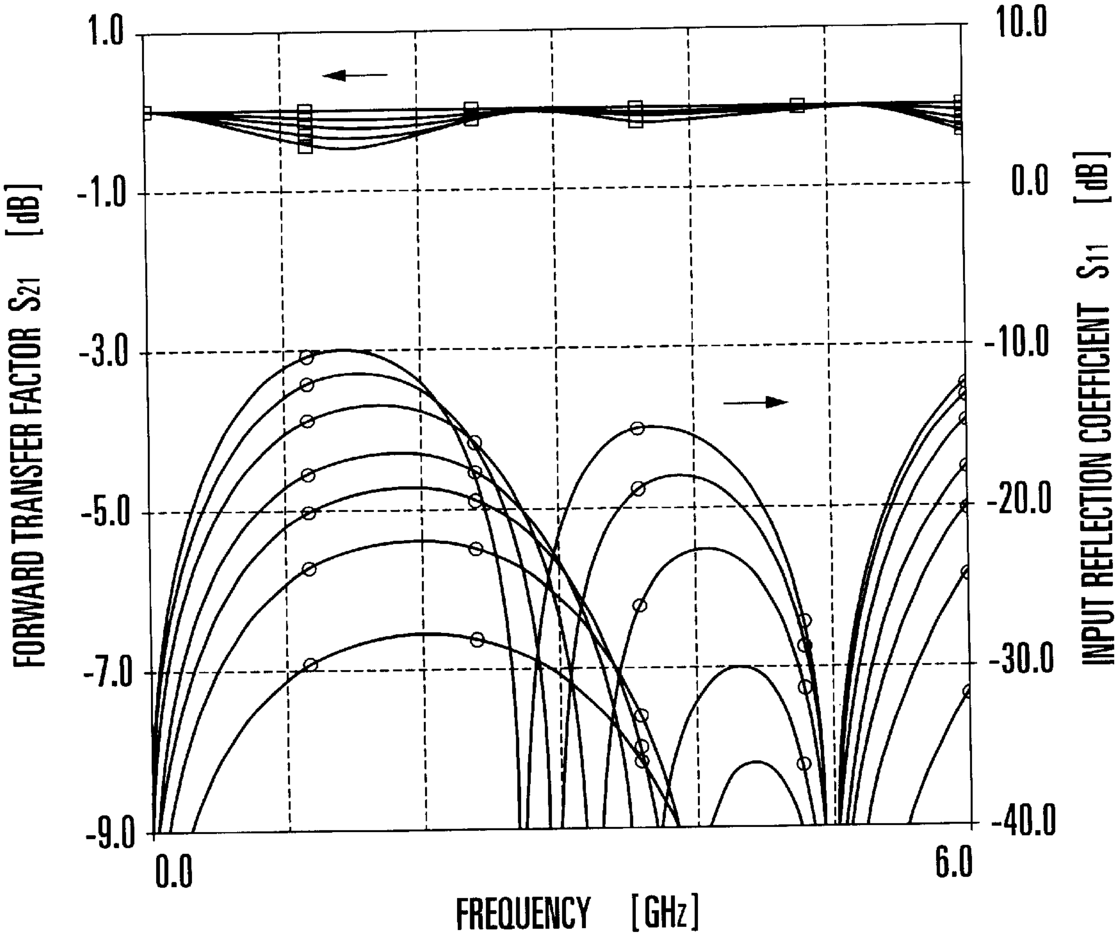
FIG. 11 is a graph showing another example of the amplitude characteristics of the phase shifter shown in FIG. 8.
Figure 12:
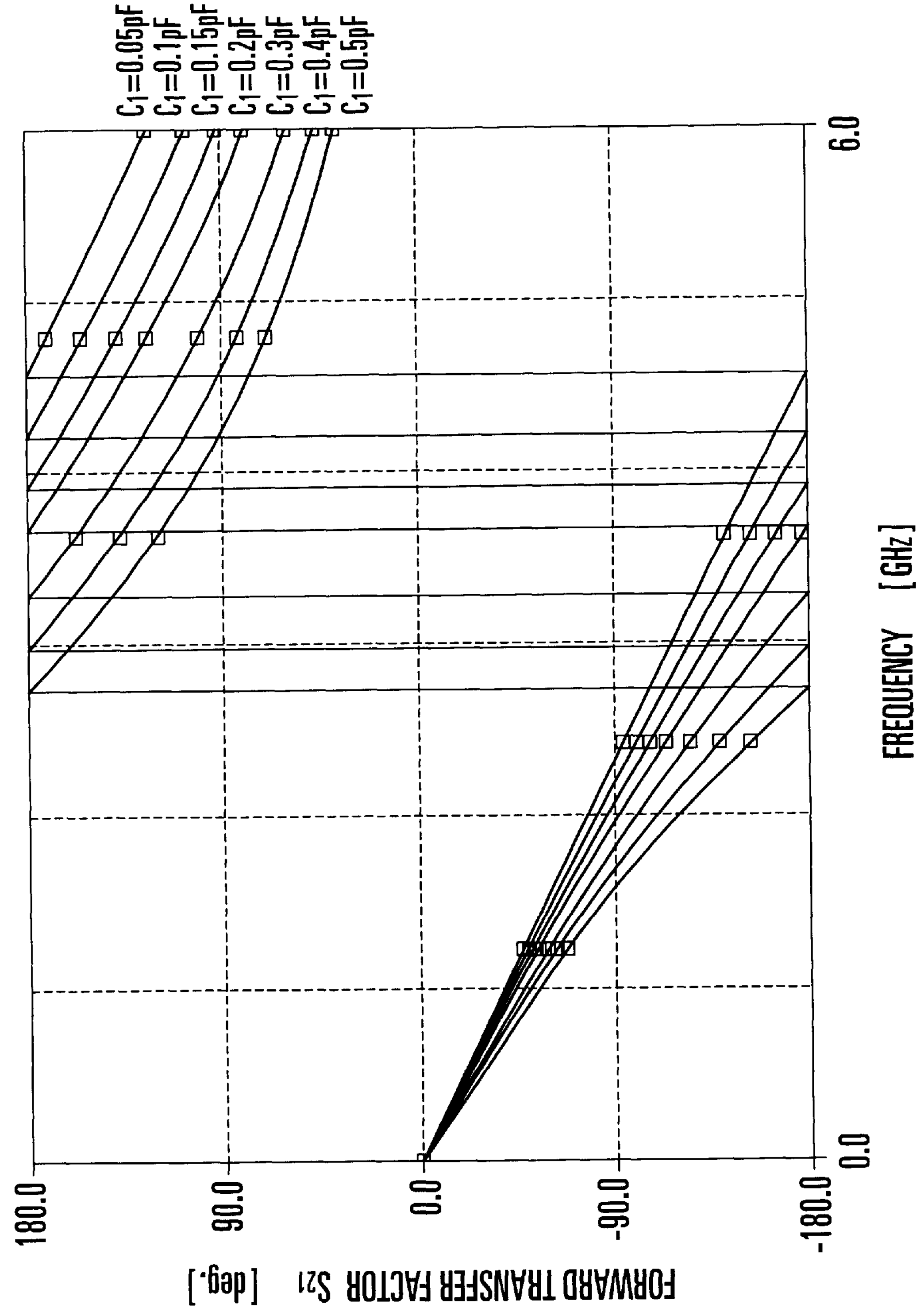
FIG. 12 is a graph showing another example of the phase characteristics of the phase shifter shown in FIG. 8.

Similarly, FIGS. 11 and 12 show the simulation results of the amplitude characteristics (forward transfer factor $S_{21}$ and input reflection coefficient $S_{11}$) and the phase characteristics (forward transfer factor $S_{21}$) when the characteristic impedance $Z_2$ of the high-frequency transmission lines 113*a* and 113*b* is $Z_2$=50Ω. Referring to FIGS. 11 and 12, the capacitance $C_3$ of the variable capacitor 171*b* is set to be four times the capacitance $C_1$ of the variable capacitor 171*a,* and this capacitance $C_1$ of the variable capacitor 171*a* is changed to 0.05, 0.1, 0.15, 0.2, 0.3, 0.4, and 0.5 pF. As shown in FIGS. 11 and 12, at a frequency f=2.4 to 5.7 GHz, an amplitude fluctuation is 0.5 dB or less, an input reflection amount is −15 dB or less (FIG. 11), and a phase change amount is 60° or more (FIG. 12).

Figure 13:
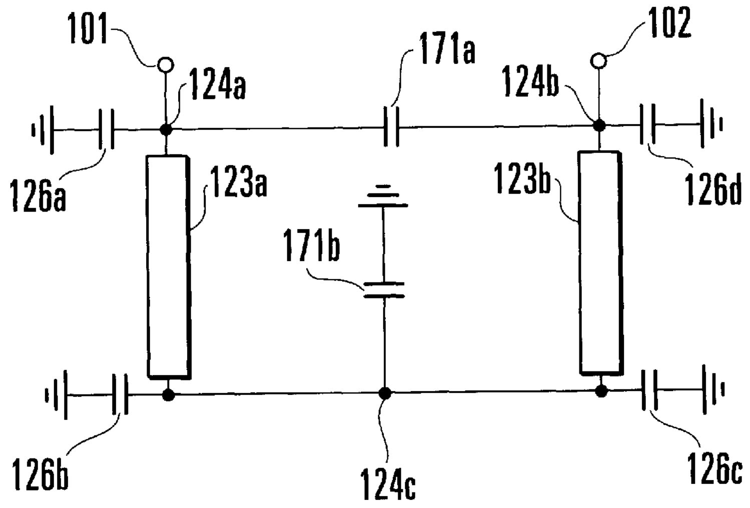
FIG. 13 is a view showing an actual circuit to which the second configuration of the phase shifter shown in FIG. 3 is applied.

FIG. 13 shows an actual circuit to which the second configuration of the phase shifter shown in FIG. 3 is applied. The same reference numerals as in FIGS. 1 and 3 denote the same parts in FIG. 13, and a detailed description thereof will be omitted.

This phase shifter shown in FIG. 13 uses variable capacitors 171*a* and 171*b* as the variable reactance elements 170*a* and 170*b,* respectively. Assume that the high-frequency transmission lines 123*a* and 123*b* have an electrical length θ of 45° at the frequency $f_0$=5 GHz and a characteristic impedance Z=70.7Ω. Assume also that these high-frequency transmission lines 123*a* and 123*b* are lossless. From equation (7), the capacitance C of the capacitors 126*a* to 126*d* is set to 0.45 pF. Assume that the equivalent characteristic impedance $Z_2$ of π circuits constituted by the high-frequency transmission lines 123*a* and 123*b* and the capacitors 126*a* to 126*d* is $Z_2$=50Ω. Also, assume the I/O impedance $Z_0$=50Ω.

Figure 14:
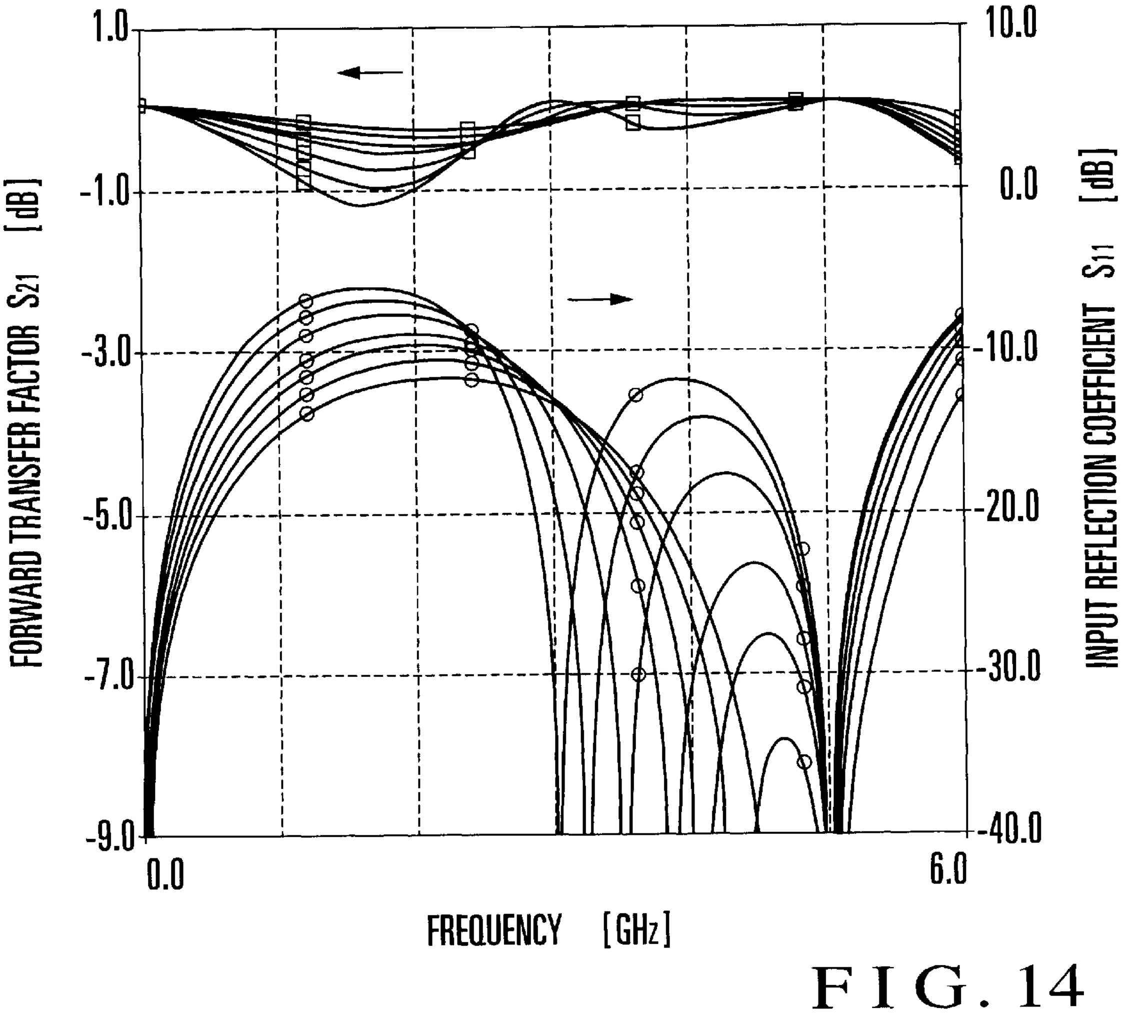
FIG. 14 is a graph showing the amplitude characteristics of the phase shifter shown in FIG. 13.
Figure 15:
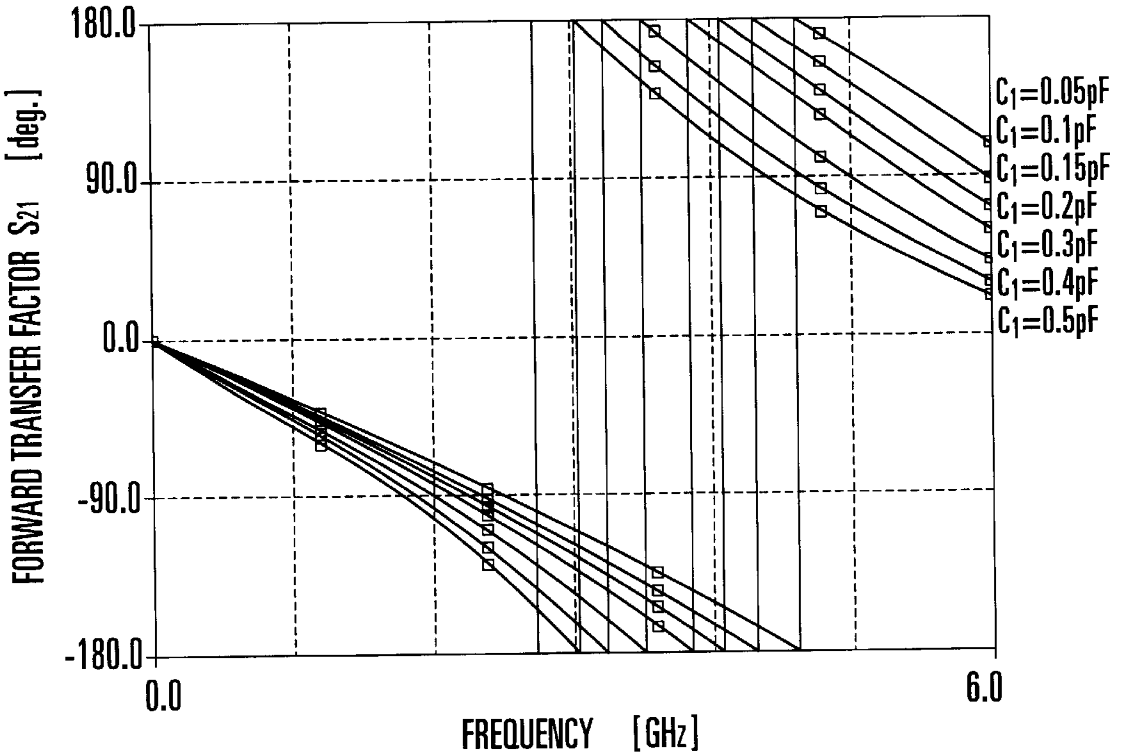
FIG. 15 is a graph showing the phase characteristics of the phase shifter shown in FIG. 13.

FIG. 14 shows the simulation results of the amplitude characteristics (forward transfer factor $S_{21}$ and input reflection coefficient $S_{11}$) when the characteristic impedance $Z_2$ of the π circuits shown in FIG. 13 is $Z_2$=50Ω. FIG. 15 shows the simulation results of the phase characteristics (forward transfer factor $S_{21}$) when the characteristic impedance $Z_2$ of the π circuits is $Z_2$=50Ω. Referring to FIGS. 14 and 15, a capacitance C of the variable capacitor 171*b* is set to be four times a capacitance $C_1$ of the variable capacitor 171*a,* and this capacitance $C_1$ of the variable capacitor 171*a* is changed to 0.05, 0.1, 0.15, 0.2, 0.3, 0.4, and 0.5 pF. As shown in FIGS. 14 and 15, at a frequency f=2.9 to 5.6 GHz, an amplitude fluctuation is 0.5 dB or less, an input reflection amount is −11 dB or less (FIG. 14), and a phase change amount is 60° or more (FIG. 15).

Note that this phase shifter shown in FIG. 13 includes the discrete capacitors 126*b* and 126*c*. However, these capacitors 126*b* and 126*c* are connected together to the I/O terminal 124*c,* so they can also be replaced by a single capacitor whose capacitance is 2 C.

Figure 16:
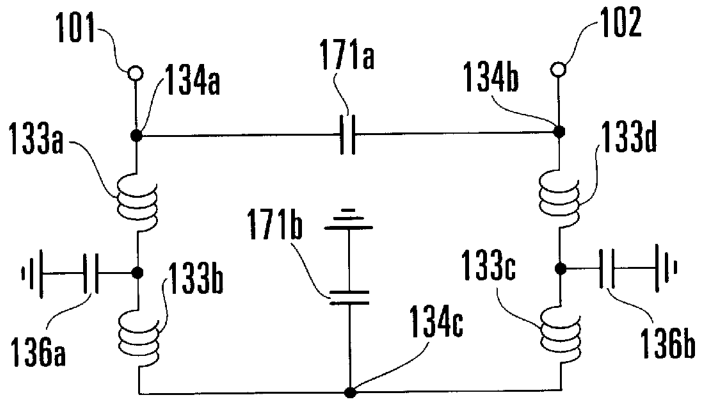
FIG. 16 is a view showing an actual circuit to which the third configuration of the phase shifter shown in FIG. 4 is applied.

FIG. 16 shows an actual circuit to which the third configuration of the phase shifter shown in FIG. 4 is applied. The same reference numerals as in FIGS. 1 and 4 denote the same parts in FIG. 16, and a detailed description thereof will be omitted.

This phase shifter shown in FIG. 16 uses variable capacitors 171*a* and 171*b* as the variable reactance elements 170*a* and 170*b,* respectively. Assume that the inductance L of the inductors 133*a* to 133*d* is L=1.6 nH. Assume also that the equivalent characteristic impedance $Z_2$ of the T circuits constituted by the inductors 133*a* to 133*d* and the capacitors 136*a* and 136*b* at the frequency $f_0$=5 GHz is $Z_2$=50Ω. From equation (10), the capacitance C of the capacitors 136*a,* and 136*b* is set to 0.64 pF. Also, assume the I/O impedance $Z_0$=50Ω.

Figure 17:
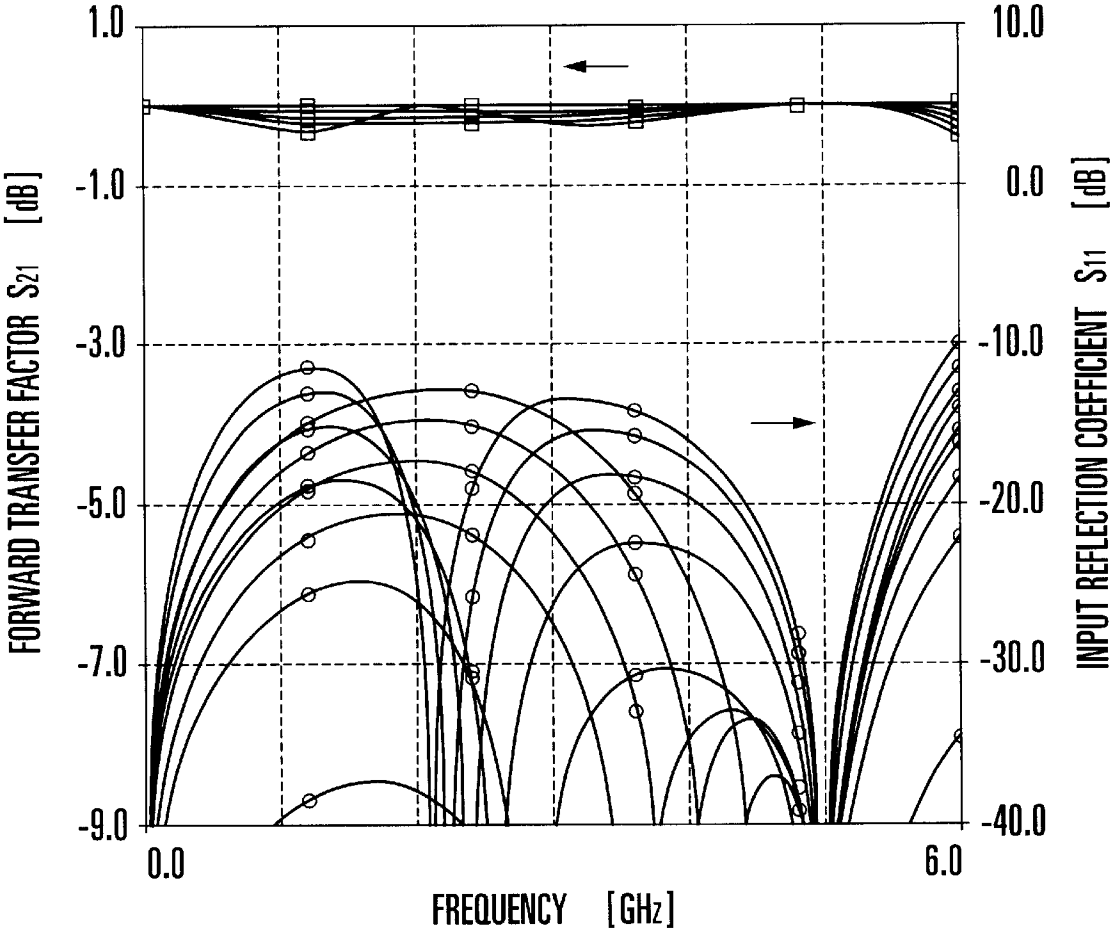
FIG. 17 is a graph showing the amplitude characteristics of the phase shifter shown in FIG. 16.
Figure 18:
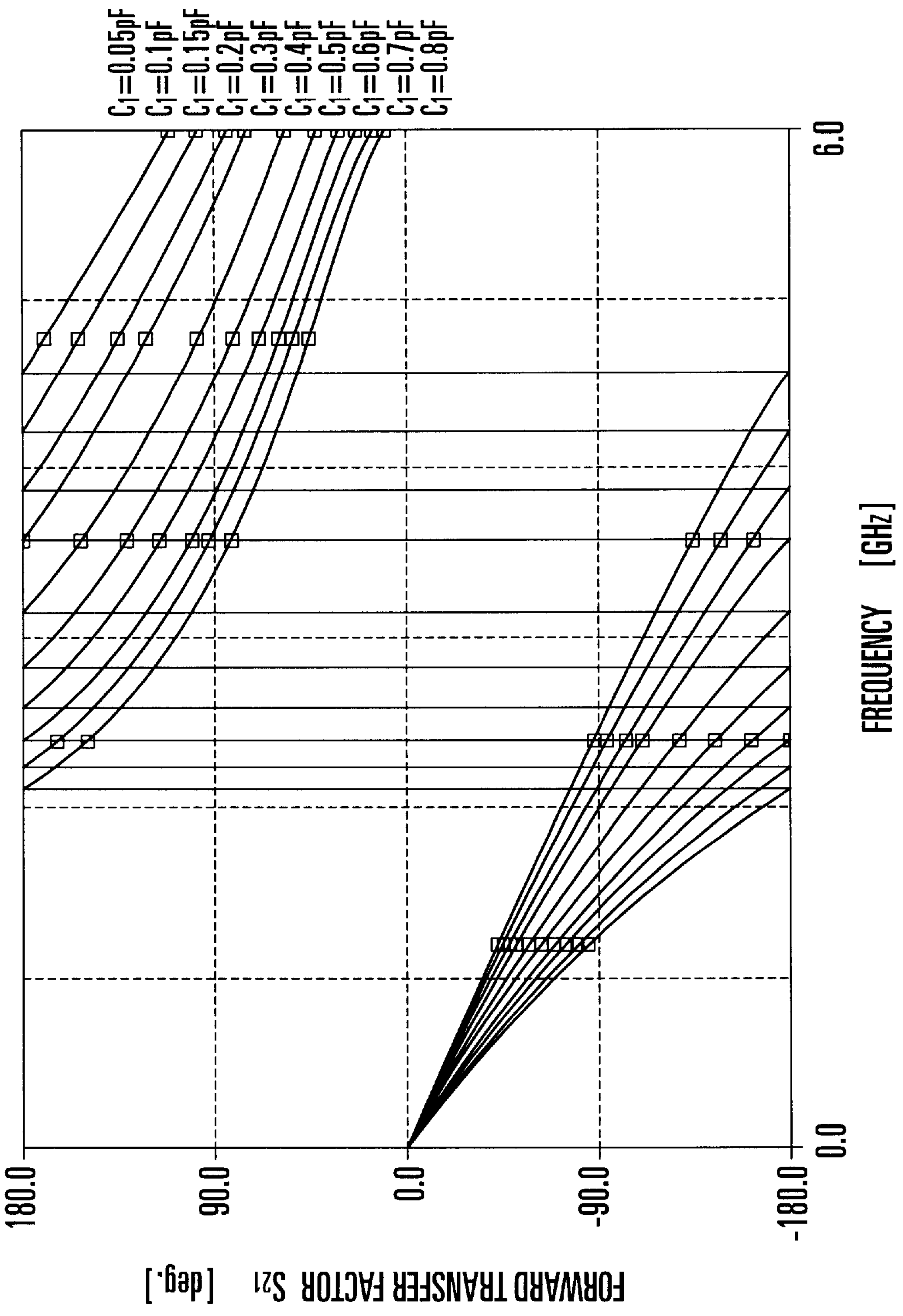
FIG. 18 is a graph showing the phase characteristics of the phase shifter shown in FIG. 16.

FIG. 17 shows the simulation results of the amplitude characteristics (forward transfer factor $S_{21}$ and input reflection coefficient $S_{11}$) when the characteristic impedance $Z_2$ of the π circuits shown in FIG. 16 is $Z_2$=50Ω. FIG. 18 shows the simulation results of the phase characteristics (forward transfer factor $S_{21}$) when the characteristic impedance $Z_2$ of the π circuits is $Z_2$=50Ω. Referring to FIGS. 17 and 18, from equation (4), a capacitance $C_3$ of the variable capacitor 171*b* is set to be four times a capacitance $C_1$ of the variable capacitor 171*a,* and this capacitance $C_1$ of the variable. capacitor 171*a* is changed to 0.05, 0.1, 0.15, 0.2, 0.3, 0.4, 0.5, 0.6, 0.7, and 0.8 pF. As shown in FIGS. 14 and 15, at a frequency f=1.5 to 5.8 GHz, an amplitude fluctuation is 0.5 dB or less, an input reflection amount is −12 dB or less (FIG. 17), and a phase change amount is 60° or more (FIG. 18).

Figure 19:
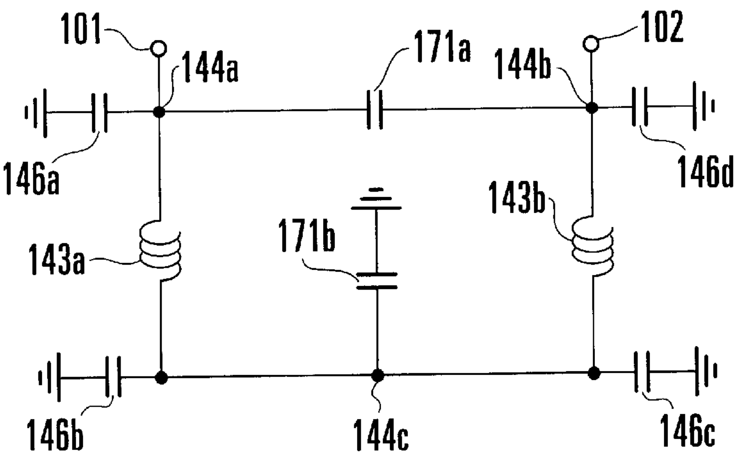
FIG. 19 is a view showing an actual circuit to which the fourth configuration of the phase shifter shown in FIG. 5 is applied.

FIG. 19 shows an actual circuit to which the fourth configuration of the phase shifter shown in FIG. 5 is applied. The same reference numerals as in FIGS. 1 and 5 denote the same parts in FIG. 19, and a detailed description thereof will be omitted.

This phase shifter shown in FIG. 19 uses variable capacitors 171*a* and 171*b* as the variable reactance elements 170*a* and 170*b,* respectively. Assume that the inductance L of the inductors 143*a* and 143*b* is L=1.6 nH. Assume also that the equivalent characteristic impedance $Z_2$ of the π circuits constituted by the inductors 143*a* and 143*b* and the capacitors 146*a* to 146*d* at the frequency $f_0$=5 GHz is $Z_2$=50Ω. From equation (10), the capacitance C of the capacitors 146*a* to 146*d* is set to 0.64 pF. Also, assume the I/O impedance $Z_0$=50Ω.

Figure 20:
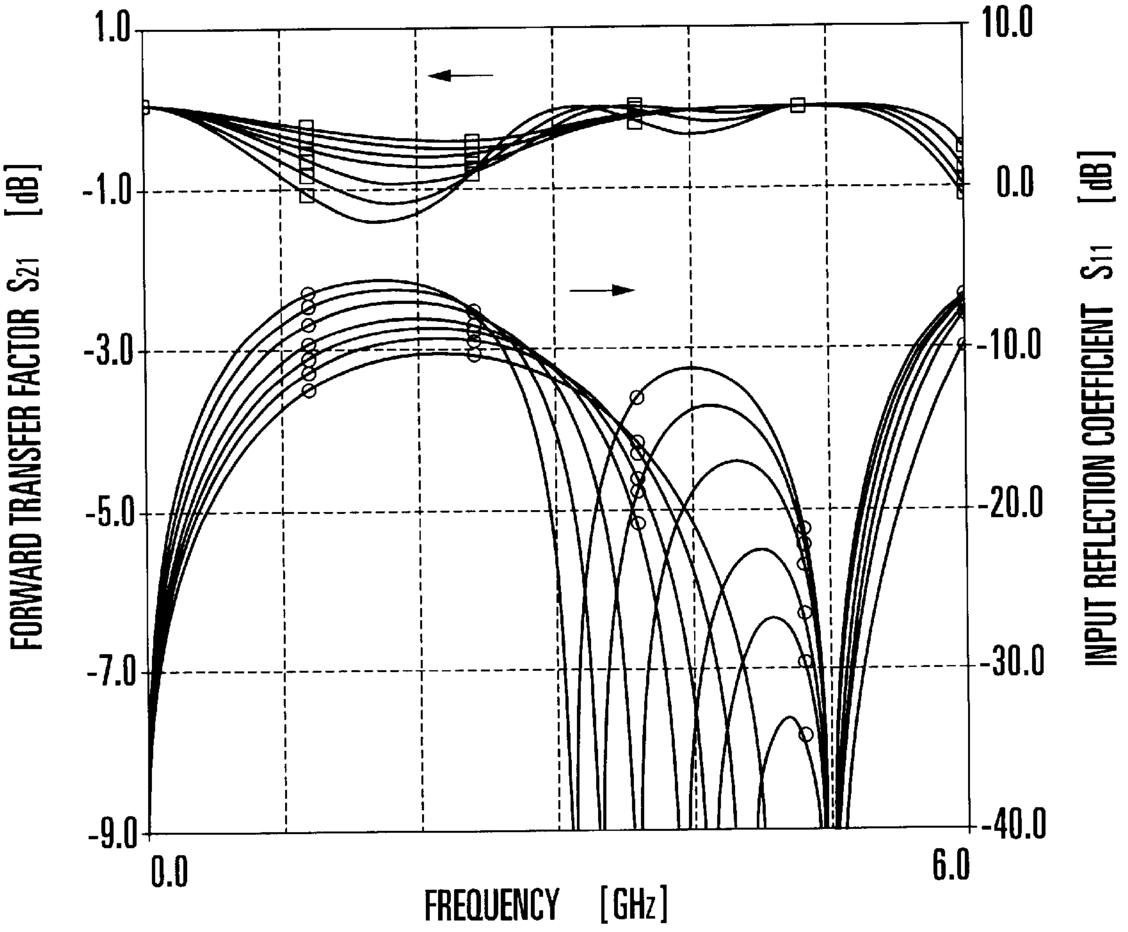
FIG. 20 is a graph showing the amplitude characteristics of the phase shifter shown in FIG. 19.
Figure 21:
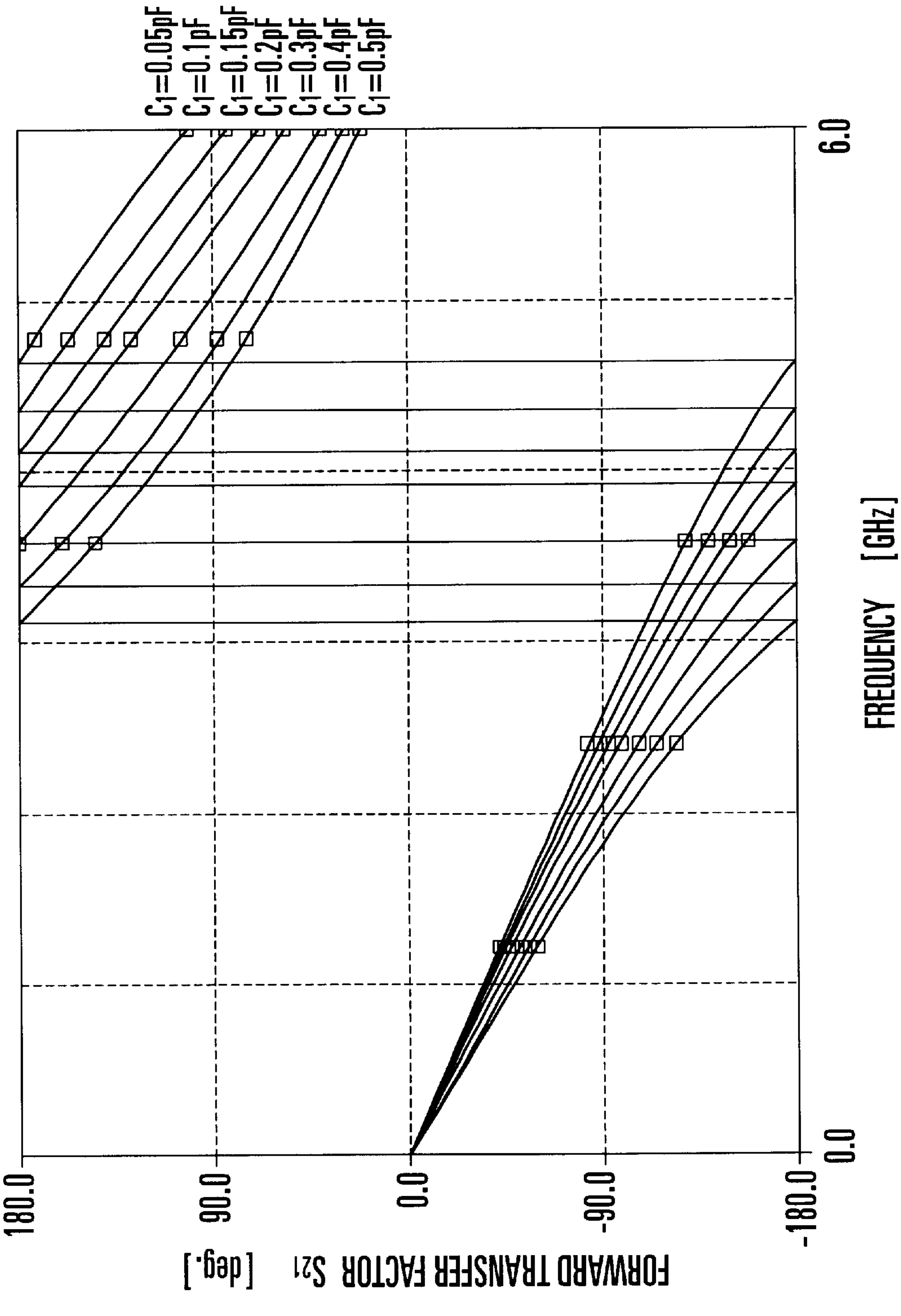
FIG. 21 is a graph showing the phase characteristics of the phase shifter shown in FIG. 19.

FIG. 20 shows the simulation results of the amplitude characteristics (forward transfer factor $S_{21}$ and input reflection coefficient $S_{11}$) when the characteristic impedance $Z_2$ of the π circuits shown in FIG. 19 is $Z_2$=50Ω. FIG. 21 shows the simulation results of the phase characteristics (forward transfer factor $S_{21}$) when the characteristic impedance $Z_2$ of the π circuits is $Z_2$50Ω. Referring to FIGS. 20 and 21, from equation (4), a capacitance $C_3$ of the variable capacitor 171*b* is set to be four times a capacitance $C_1$ of the variable capacitor 171*a,* and this capacitance $C_1$ of the variable capacitor 171*a* is changed to 0.05, 0.1, 0.15, 0.2, 0.3, 0.4, and 0.5 pF. As shown in FIGS. 14 and 15, at a frequency f=3.0 to 5.5 GHz, an amplitude fluctuation is 0.5 dB or less, an input reflection amount is −11 dB or less (FIG. 20), and a phase change amount is 60° or more (FIG. 21).

Note that this phase shifter shown in FIG. 19 includes the discrete capacitors 146*b* and 146*c.* However, these capacitors 146*b* and 146*c* are connected together to the I/O terminal 144*c,* so they can also be replaced by a single capacitor whose capacitance is 2 C.

Figure 22:
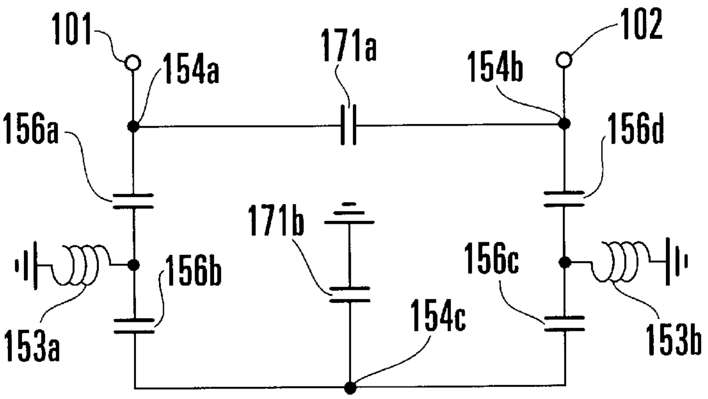
FIG. 22 is a view showing an actual circuit to which the fifth configuration of the phase shifter shown in FIG. 6 is applied.

FIG. 22 shows an actual circuit to which the fifth configuration of the phase shifter shown in FIG. 6 is applied. The same reference numerals as in FIGS. 1 and 6 denote the same parts in FIG. 22, and a detailed description thereof will be omitted.

This phase shifter shown in FIG. 22 uses variable capacitors 171*a* and 171*b* as the variable reactance elements 170*a* and 170*b,* respectively. Assume that the inductance L of the inductors 153*a* and 153*b* is L=1.6 nH. Assume also that the equivalent characteristic impedance $Z_2$ of the T circuits constituted by the inductors 153*a* and 153*b* and the capacitors 156*a* to 156*d* at the frequency $f_0$=5 GHz is $Z_2$=50Ω. From equation (10), the capacitance C of the capacitors 156*a* to 156*d* is set to 0.64 pF. Also, assume the I/O impedance $Z_0$=50Ω.

Figure 23:
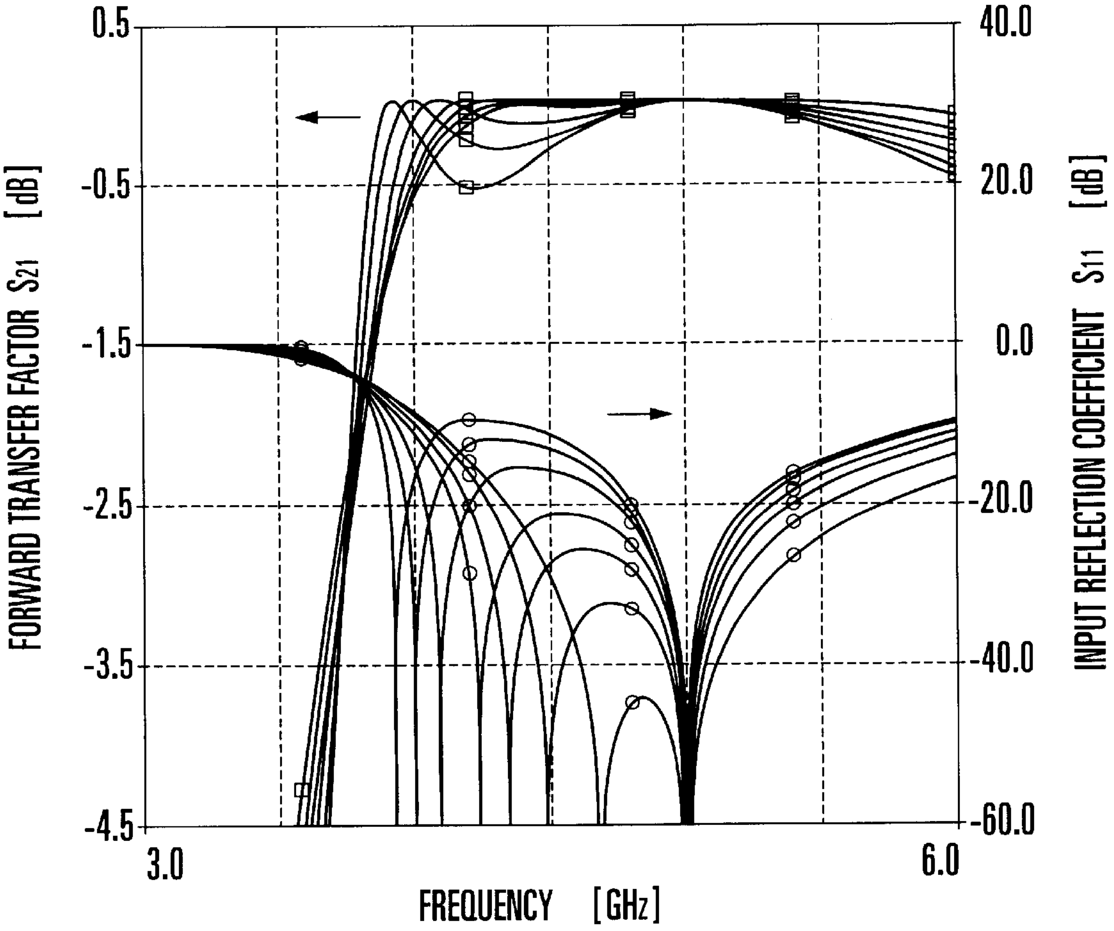
FIG. 23 is a graph showing the amplitude characteristics of the phase shifter shown in FIG. 22.
Figure 24:
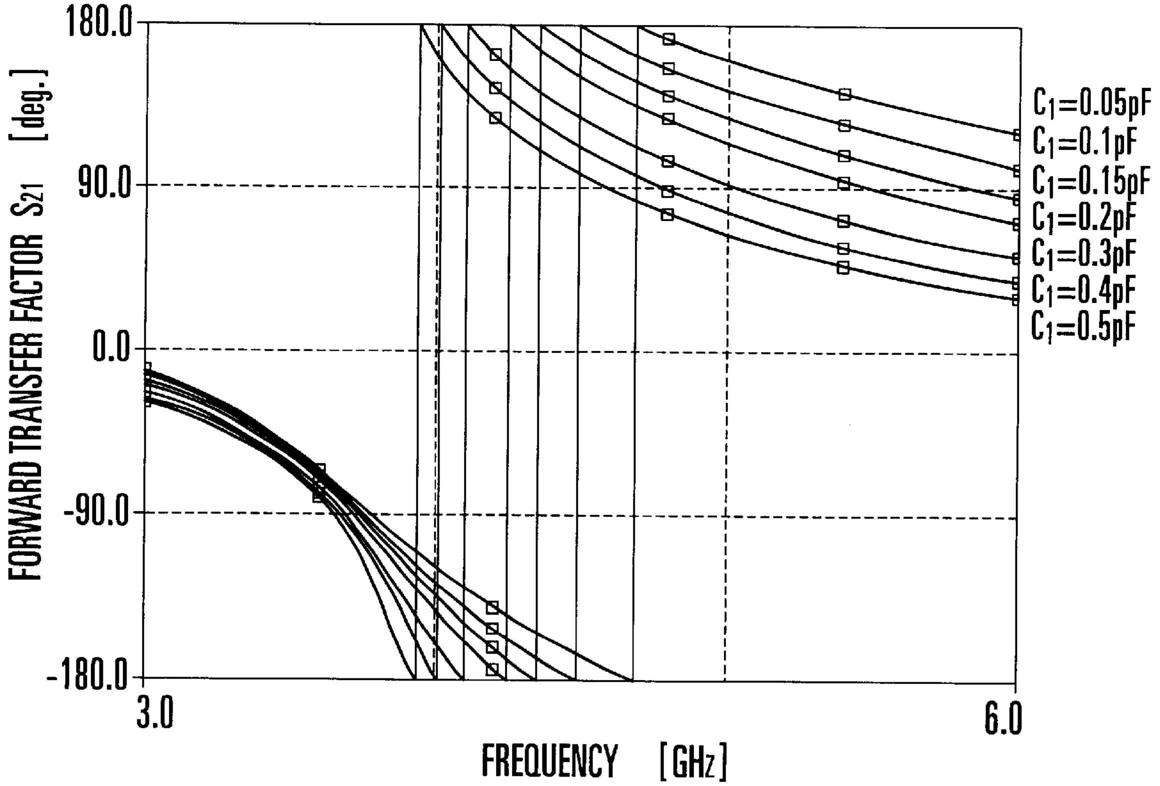
FIG. 24 is a graph showing the phase characteristics of the phase shifter shown in FIG. 22.

FIG. 23 shows the simulation results of the amplitude characteristics (forward transfer factor $S_{21}$ and input reflection coefficient $S_{11}$) when the characteristic impedance $Z_2$ of the T circuits shown in FIG. 22=50Ω. FIG. 24 shows the simulation results of the phase characteristics (forward transfer factor $S_{21}$) when the characteristic impedance $Z_2$ of the T circuits=50Ω. Referring to FIGS. 23 and 24, a capacitance $C_3$ of the variable capacitor 171*b* is set to be four times a capacitance $C_1$ of the variable capacitor 171*a,* and this capacitance $C_1$ of the variable capacitor 171*a* is changed to 0.05, 0.1, 0.15, 0.2, 0.3, 0.4, and 0.5 pF. As shown in FIGS. 14 and 15, at a frequency f=4.8 to 5.2 GHz, an amplitude fluctuation is 0.5 dB or less, an input reflection amount is −20 dB or less (FIG. 23), and a phase change amount is 90° or more (FIG. 24).

Figure 25:
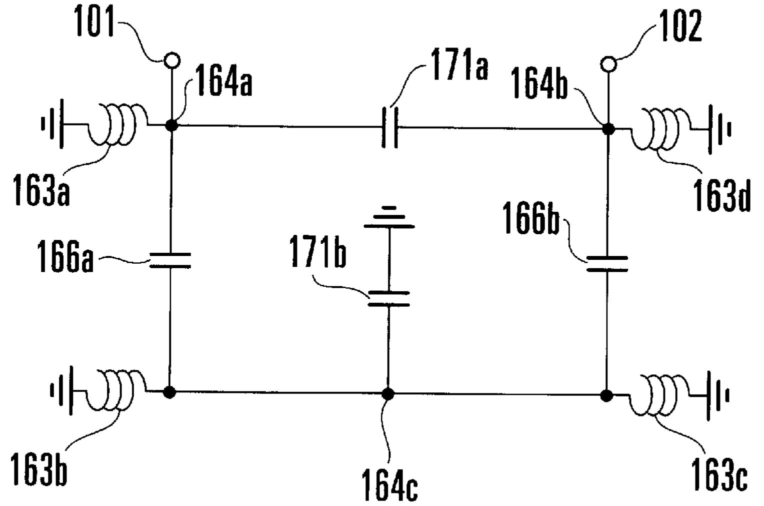
FIG. 25 is a view showing an actual circuit to which the sixth configuration of the phase shifter shown in FIG. 7 is applied.

FIG. 25 shows an actual circuit to which the sixth configuration of the phase shifter shown in FIG. 7 is applied. The same reference numerals as in FIGS. 1 and 7 denote the same parts in FIG. 25, and a detailed description thereof will be omitted.

This phase shifter shown in FIG. 25 uses variable capacitors 171*a* and 171*b* as the variable reactance elements 170*a* and 170*b,* respectively. Assume that the inductance L of the inductors 163*a* to 163*d* is L=1.6 nH. Assume also that the equivalent characteristic impedance $Z_2$ of the π circuits constituted by the inductors 163*a* to 163*d* and the capacitors 166*a* and 166*b* at the frequency $f_0$=5 GHz is $Z_2$=50Ω. From equation (10), the capacitance C of the capacitors 166*a* and 166*b* is set to 0.64 pF. Also, assume the I/O impedance $Z_0$=50Ω.

Figure 26:
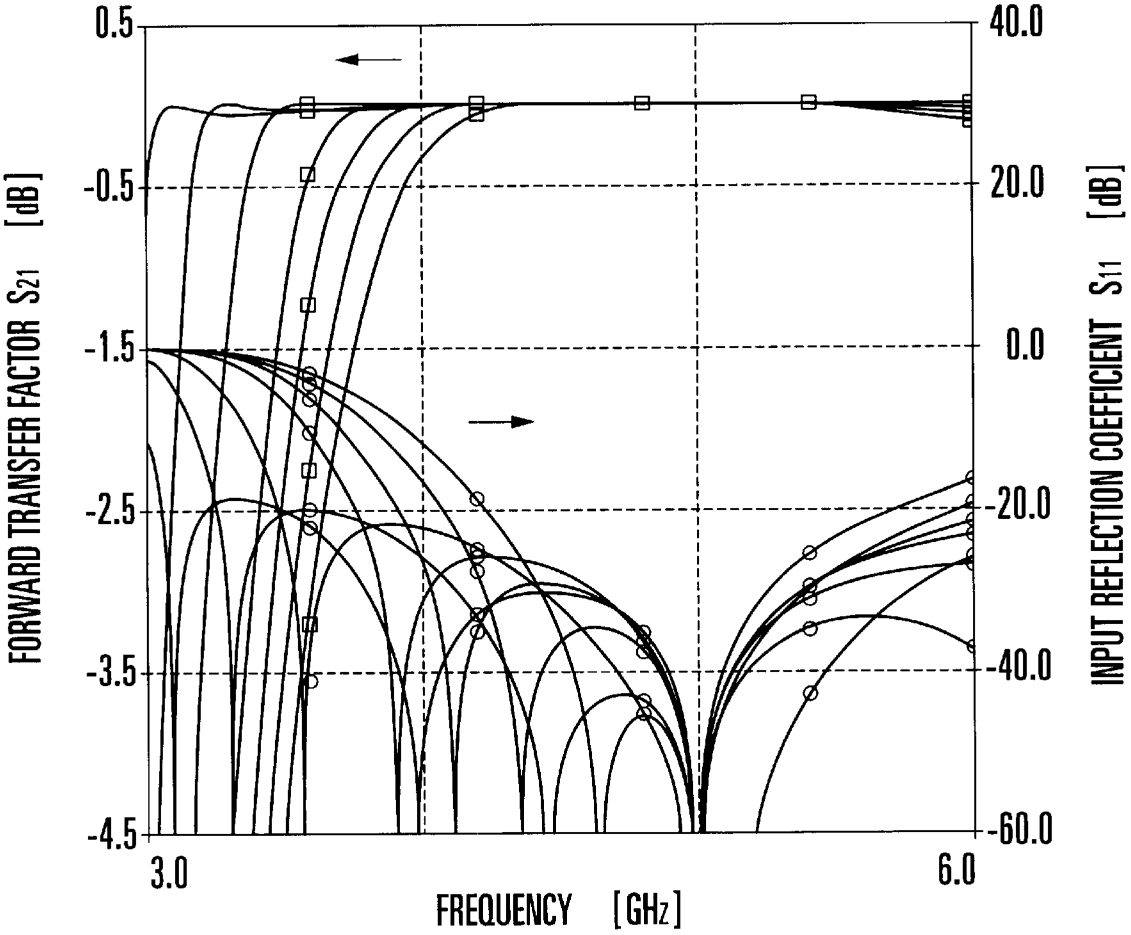
FIG. 26 is a graph showing the amplitude characteristics of the phase shifter shown in FIG. 25.
Figure 27:
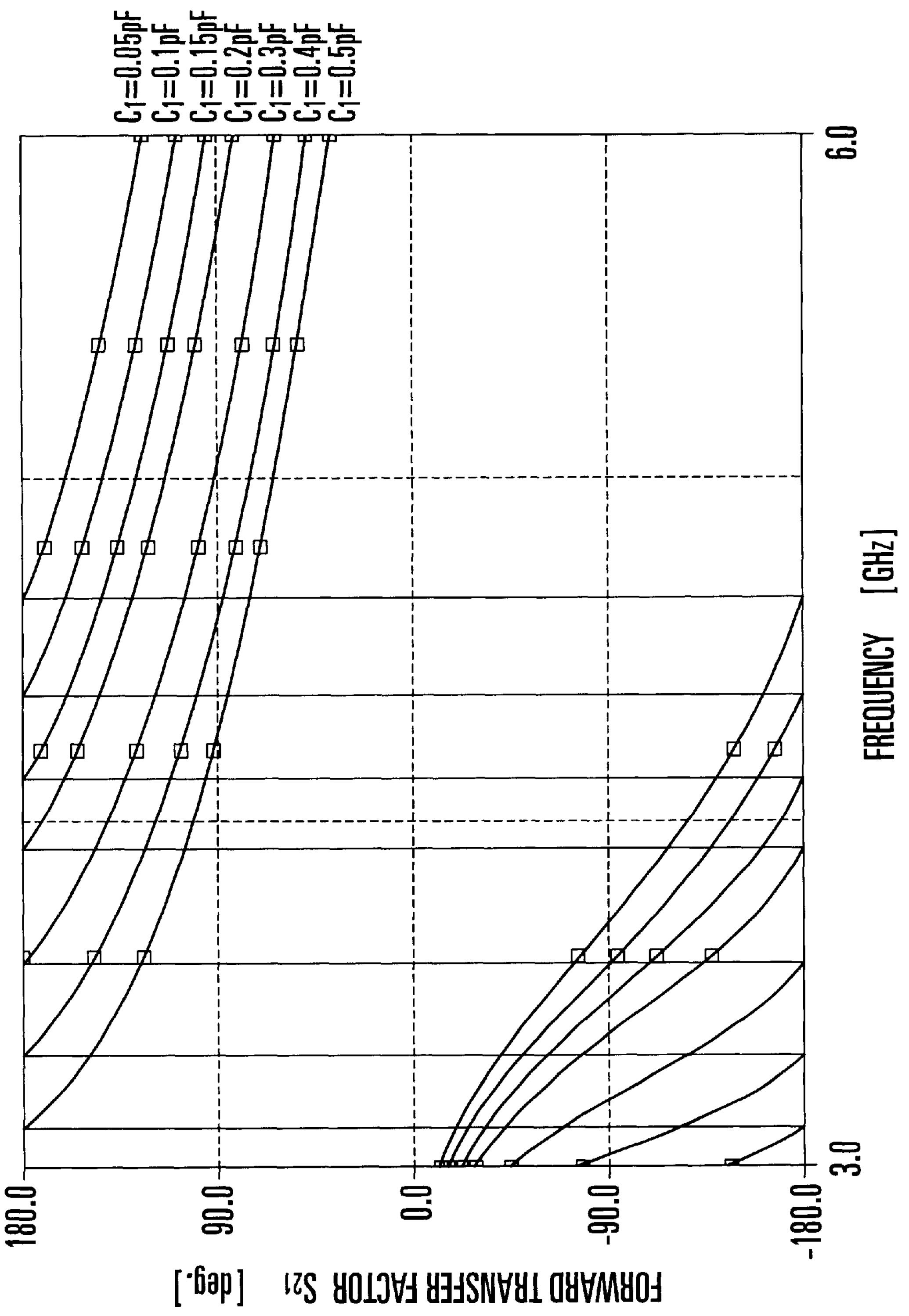
FIG. 27 is a graph showing the phase characteristics of the phase shifter shown in FIG. 25.

FIG. 26 shows the simulation results of the amplitude characteristics (forward transfer factor $S_{21}$ and input reflection coefficient $S_{11}$) when the characteristic impedance $Z_2$ of the π circuits shown in FIG. 25 is $Z_2$=50Ω. FIG. 27 shows the simulation results of the phase characteristics (forward transfer factor $S_{21}$) when the characteristic impedance $Z_2$ of the π circuits is $Z_2$=50Ω. Referring to FIGS. 26 and 27, a capacitance $C_3$ of the variable capacitor 171*b* is set to be four times a capacitance $C_1$ of the variable capacitor 171*a,* and this capacitance $C_1$ of the variable capacitor 171*a* is changed to 0.05, 0.1, 0.15, 0.2, 0.3, 0.4, and 0.5 pF. As shown in FIGS. 26 and 27, at the frequency f=4.3 to 5.7 GHz, an amplitude fluctuation is 0.5 dB or less, an input reflection amount is −20 dB or less (FIG. 26), and a phase change amount is 80° or more (FIG. 27).

Note that this phase shifter shown in FIG. 25 includes the discrete inductors 163*b* and 163*c.* However, these inductors 163*b* and 163*c* are connected together to the I/O terminal 164*c,* so they can also be replaced by a single inductor, whose inductance is L/2.

II. Configuration Using Resonant Circuits as High-frequency Impedance Elements

Figure 28:
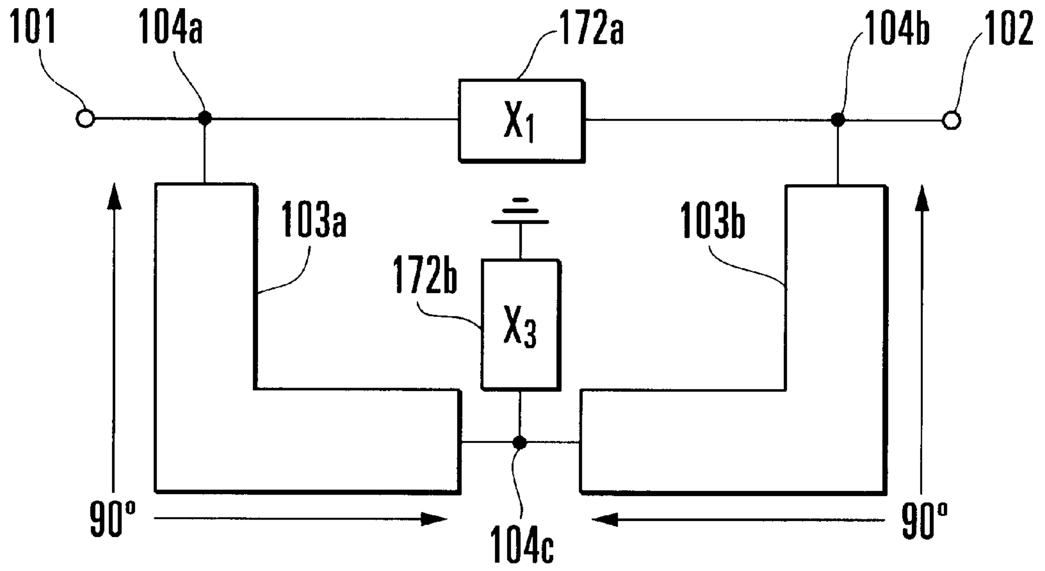
FIG. 28 is a circuit diagram showing another arrangement of the phase shifter according to the present invention.

FIG. 28 shows another arrangement of the phase shifter according to the present invention.

The phase shifter shown in FIG. 1 uses the variable reactance elements 170*a* and 170*b* as first and second high-frequency impedance elements. As shown in FIG. 28, however, a phase shifter can also be constituted by using resonant circuits 172*a* and 172*b* as the first and second high-frequency impedance elements. These resonant circuits 172*a* and 172*b* are formed using an inductor, a capacitor, an inductance component realized by a transmission line, and a capacitance component realized by a transmission line. The impedance of the resonant circuits 172*a* and 172*b* is substantially constituted by a reactance. The only difference of this phase shifter shown in FIG. 28 from the phase shifter shown in FIG. 1 is the configuration of the first and second high-frequency impedance elements. So, the phase shifter shown in FIG. 28 operates in the same fashion as the phase shifter shown in FIG. 1.

Let $Z_0$ be the input impedance of an input port 101 and the output impedance of an output port 102, 90° be a phase change amount at a frequency $f_0$ of high-frequency phase shifting elements 103a and 103b, $Z_2$ be the equivalent characteristic impedance when the high-frequency phase shifting elements 103a and 103b are replaced by high-frequency transmission lines, $X_1$ be the reactance of the resonant circuit 172a, and $X_3$ be the reactance of the resonant circuit 172b.

When this is the case, an input reflection coefficient $S_{11}$ and an output reflection coefficient $S_{22}$ of the phase shifter shown in FIG. 28 can be expressed by $$S_{11} = S_{22} = \frac{\frac{Z_2^2}{4Z_0^2}X_1 - X_3}{\frac{Z_2^2}{4Z_0^2}X_1 + X_3 + \frac{X_1X_3 + Z_2^2}{2Z_0}} \quad (13)$$

Therefore, when the reactance $X_3$ is set by a relation $$X_3 = \frac{Z_2^2}{4Z_0^2}X_1 \quad (14)$$

the input and output reflection coefficients $S_{11}$ and $S_{22}$ at the frequency $f_0$ become zero, so the input and output impedances at the frequency $f_0$ can be matched. Note that when a phase shifter is actually formed, the input and output reflection coefficients $S_{11}$ and $S_{22}$ at the frequency $f_0$ need not be strictly zero; a satisfactory effect can be obtained if these reflection coefficients are approximately zero.

In this case, a forward transfer factor $S_{21}$ and a reverse transfer factor $S_{12}$ of the phase shifter shown in FIG. 28 can be expressed by $$S_{11} = S_{22} = \frac{2Z_0 - X_1}{2Z_0 + X_1} \quad (15)$$

To allow this device to operate as a phase shifter, it is only necessary to simultaneously and continuously change the reactances $X_1$ and $X_3$ of the resonant circuits 172a and 172b. A phase change amount θ of the phase shifter when the reactances are changed from $X_1$ to $(X_1+\Delta X_1)$ is given by $$\theta = -2\tan^{-1}\left(\frac{X_1 + \Delta X_1}{2Z_0}\right) + 2\tan^{-1}\left(\frac{X_1}{2Z_0}\right)[\text{rad}] \quad (16)$$

A phase change amount can be increased by the use of the resonant circuits 172a and 172b as the first and second high-frequency impedance elements.

Similar to the phase shifter shown in FIG. 1, the high-frequency phase shifting elements 103a and 103b are constructed by using, e.g., ① high-frequency transmission lines whose electrical length at the frequency $f_0$ is 90° (FIG. 2), ② π circuits each composed of a high-frequency transmission line whose electrical length at the frequency $f_0$ is smaller than 90° and two capacitors each having one terminal connected to a corresponding one of the two terminals of the high-frequency transmission line and the other terminal grounded (FIG. 3), and ③ a lumped constant circuit constituted by inductors and capacitors (FIGS. 4 to 7). When these configurations are employed, the phase shifter can be miniaturized in the order of ①>②>③.

[Practical Examples of Phase Shifter and Their Characteristics]

Practical examples of the phase shifter shown in FIG. 28 and the simulation results of the amplitude characteristics and phase characteristics of these practical examples will be described below.

Figure 29:
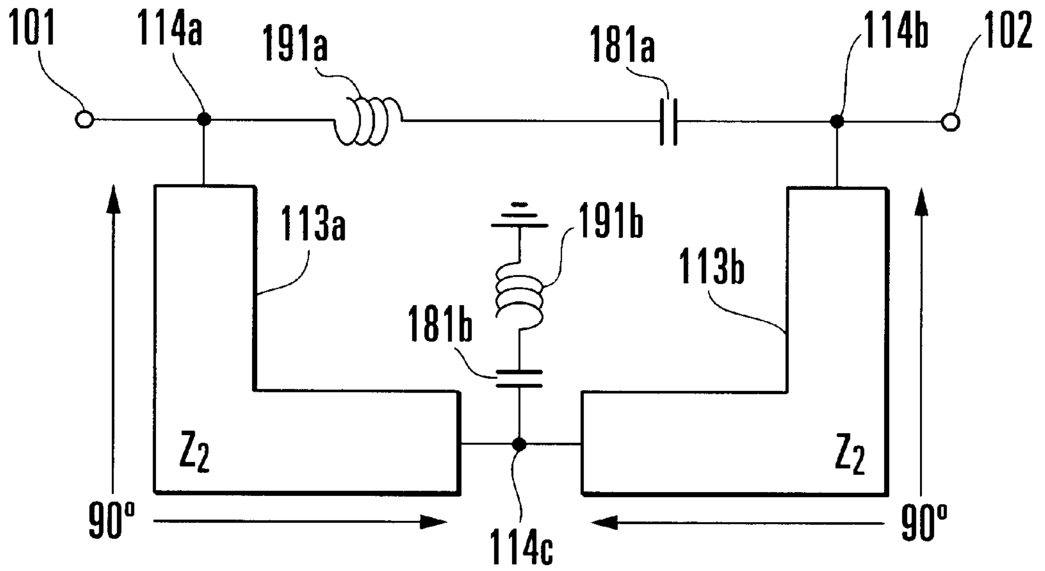
FIG. 29 is a circuit diagram showing one practical example of the phase shifter shown in FIG. 28.

FIG. 29 shows one practical example of the phase shifter shown in FIG. 28. The same reference numerals as in FIGS. 2 and 28 denote the same parts in FIG. 29, and a detailed description thereof will be omitted. In this phase shifter shown in FIG. 29, series resonant circuits in each of which an inductor and a capacitor are connected in series are used as the resonant circuits 172a and 172b shown in FIG. 28. More specifically, the resonant circuit 172a is constituted by a series resonant circuit in which an inductor 191a and a variable capacitor 181a are connected in series. The resonant circuit 172b is constituted by a series resonant circuit in which a inductor 191b and a variable capacitor 181b are connected in series.

In this phase shifter, high-frequency transmission lines 113a and 113b whose electrical length at the frequency $f_0$=5 GHz is 90° are used as the high-frequency phase shifting elements 103a and 103b, respectively, having the impedance converting function. Assuming that these high-frequency transmission lines 113a and 113b are lossless, the I/O impedance $Z_0$=50Ω.

Figure 30:
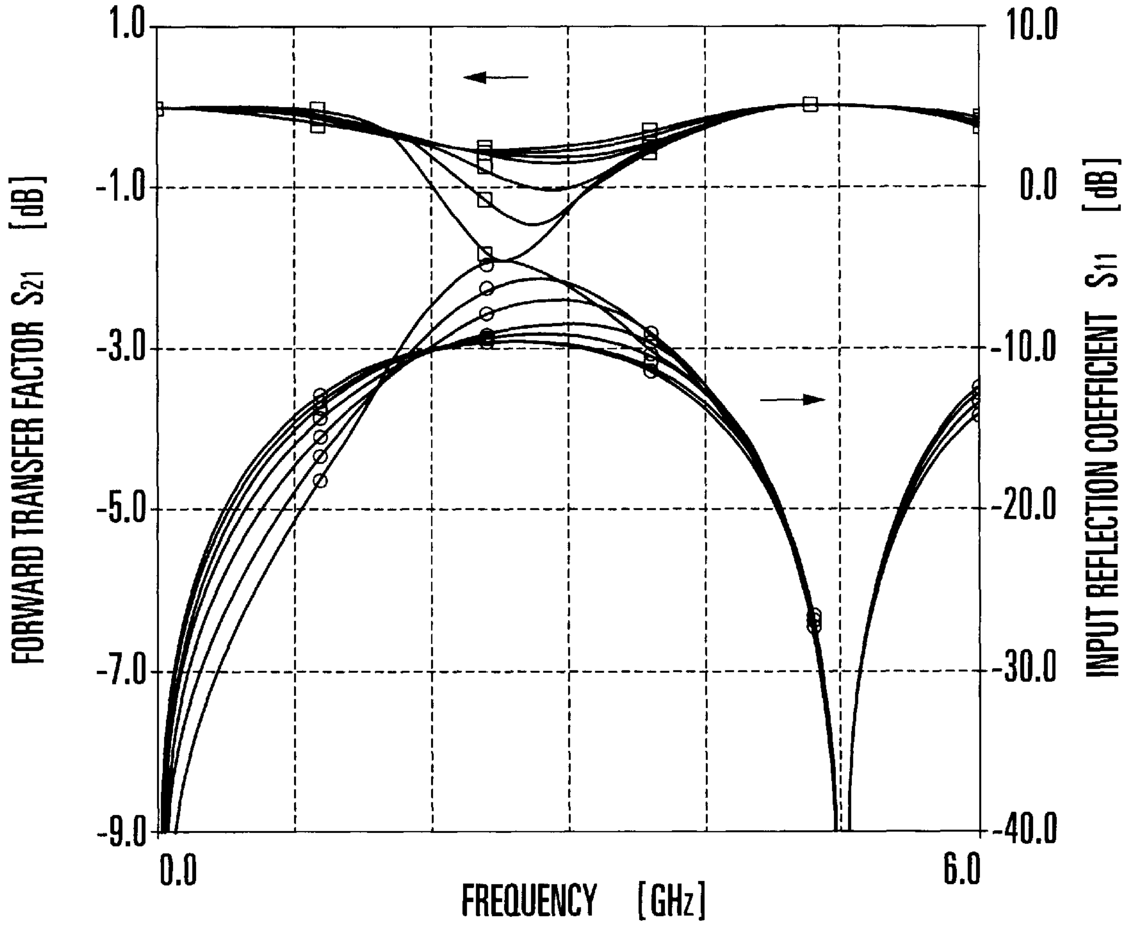
FIG. 30 is a graph showing an example of the amplitude characteristics of the phase shifter shown in FIG. 29.
Figure 31:
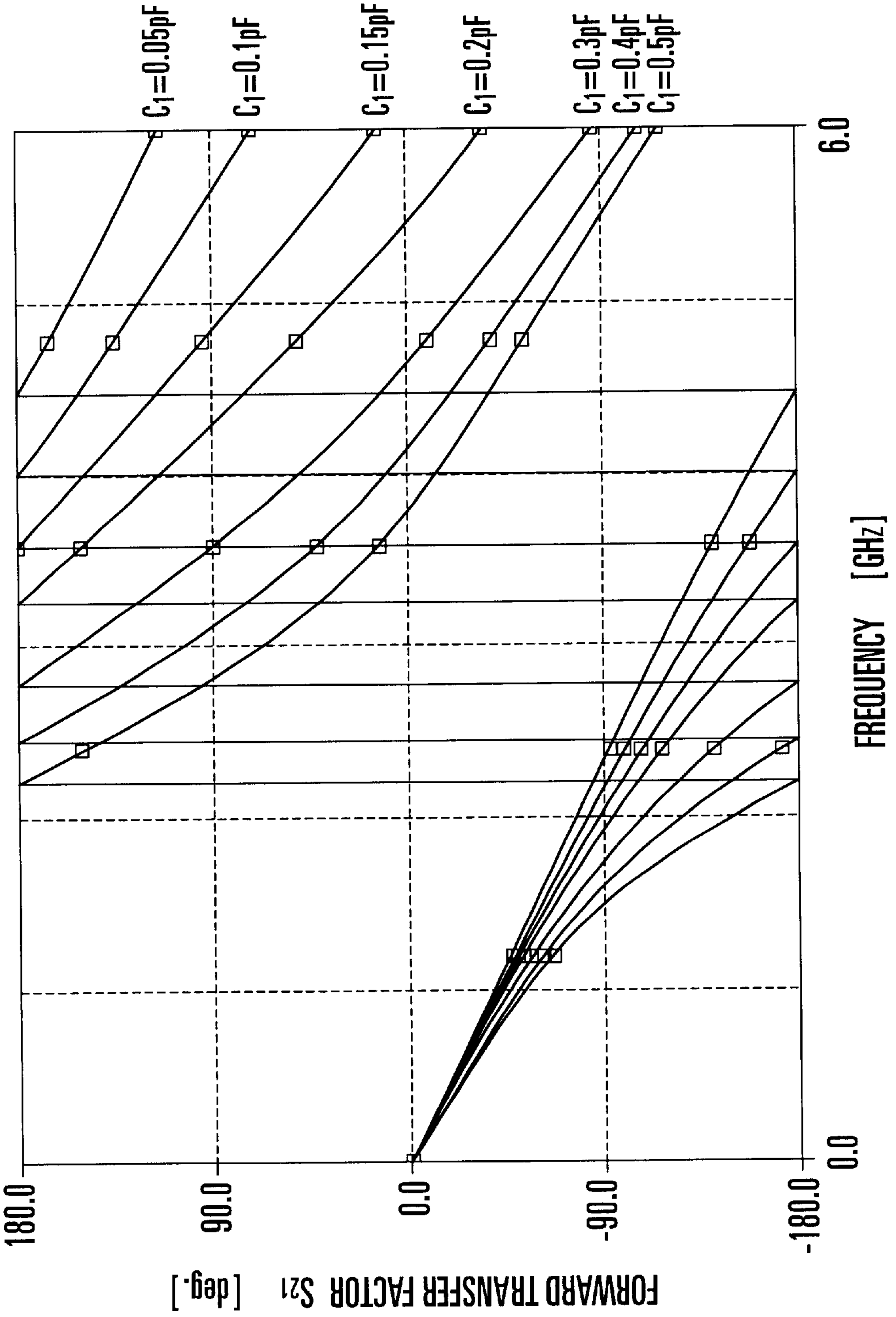
FIG. 31 is a graph showing an example of the phase characteristics of the phase shifter shown in FIG. 29.

FIG. 30 shows the simulation results of the amplitude characteristics (forward transfer factor $S_{21}$ and input reflection coefficient $S_{11}$) when the characteristic impedance $Z_2$ of the high-frequency transmission lines 113a and 113b is $Z_2$=70.7Ω. FIG. 31 shows the simulation results of the phase characteristics (forward transfer factor $S_{21}$) when the characteristic impedance $Z_2$ of the high-frequency transmission lines 113a and 113b is $Z_2$=70.7Ω.

Referring to FIGS. 30 and 31, an inductance $L_1$ of the inductor 191a is $L_1$=4 nH. From equation (14), an inductance $L_3$ of the inductor 191b is set to be ½ the inductance $L_1$ of the inductor 191a. Likewise, from equation (14), a capacitance $C_3$ of the variable capacitor 181b is set to be twice a capacitance $C_1$ of the variable capacitor 181a, and this capacitance $C_1$ of the variable capacitor 181a is changed to 0.05, 0.1, 0.15, 0.2, 0.3, 0.4, and 0.5 pF. As shown in FIGS. 30 and 31, at a frequency f=4.0 to 6.0 GHz, an amplitude fluctuation is 0.5 dB or less, an input reflection amount is −12 dB or less (FIG. 30), and a phase change amount is 210° or more (FIG. 31).

Figure 32:
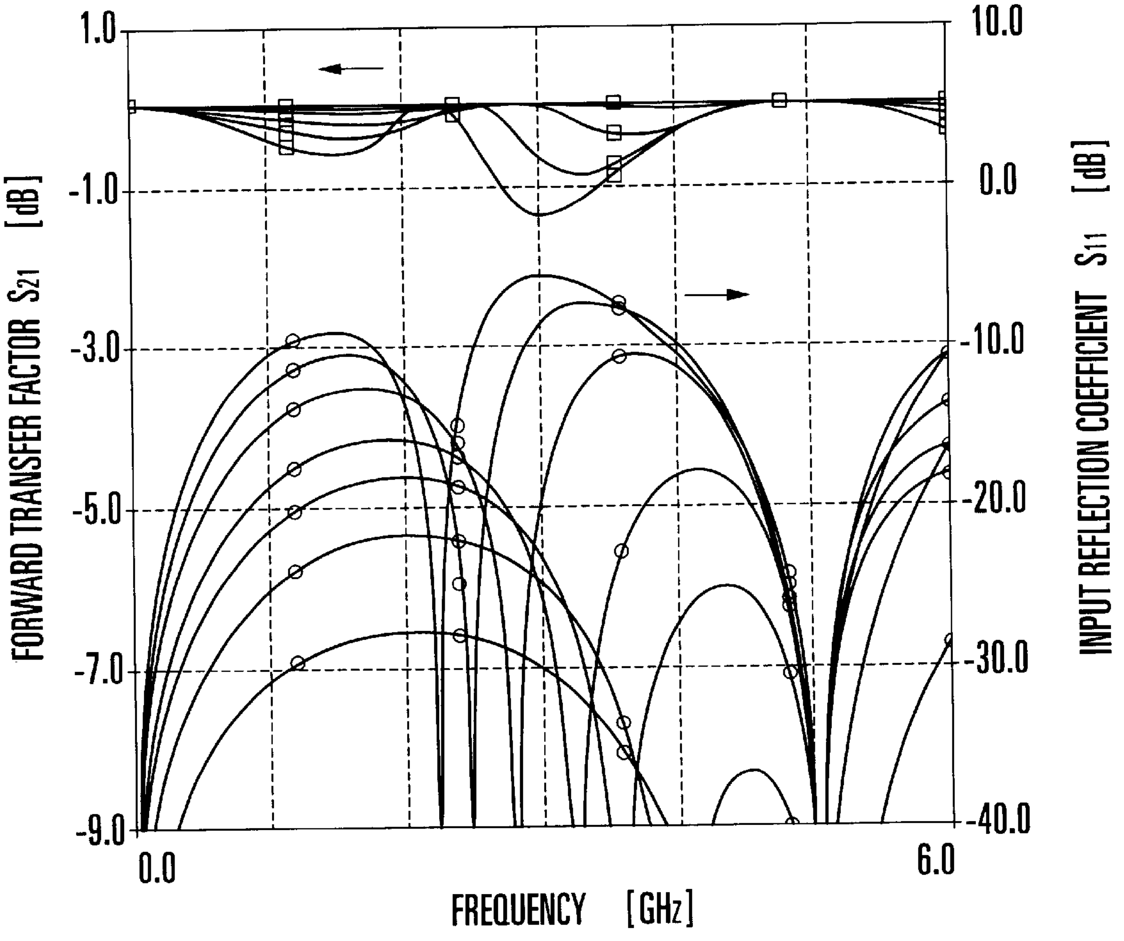
FIG. 32 is a graph showing another example of the amplitude characteristics of the phase shifter shown in FIG. 29.
Figure 33:
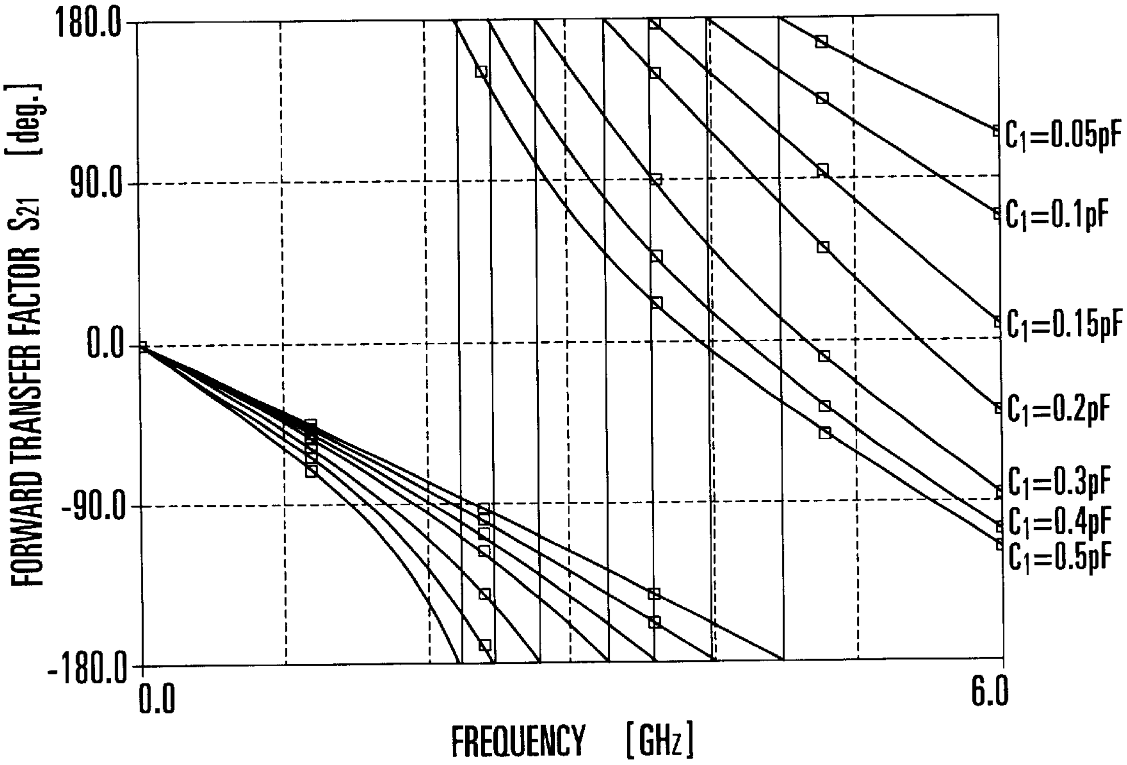
FIG. 33 is a graph showing another example of the phase characteristics of the phase shifter shown in FIG. 29.

Similarly, FIG. 32 shows the simulation results of the amplitude characteristics (forward transfer factor $S_{21}$ and input reflection coefficient $S_{11}$) when the characteristic impedance $Z_2$ of the high-frequency transmission lines 113a and 113b is $Z_2$=50Ω. FIG. 33. shows the phase characteristics (forward transfer factor $S_{21}$) when the characteristic impedance $Z_2$ of the high-frequency transmission lines 113a and 113b is $Z_2$=50Ω.

Referring to FIGS. 32 and 33, the inductance $L_1$ of the inductor 191a is $L_1$=4 nH. From equation (14), the inductance $L_1$ of the inductor 191b is set to be ¼ the inductance $L_1$ of the inductor 191a. Likewise, from equation (14), the capacitance $C_3$ of the variable capacitor 181b is set to be four times the capacitance $C_1$ of the variable capacitor 181a, and this capacitance $C_1$ of the variable capacitor 181a is changed to 0.05, 0.1, 0.15, 0.2, 0.3, 0.4, and 0.5 pF. As shown in FIGS. 32 and 33, at a frequency f=4.0 to 6.0 GHz, an amplitude fluctuation is 0.5 dB or less, an input reflection amount is −10 dB or less (FIG. 32), and a phase change amount is 200° or more (FIG. 33).

Figure 34:
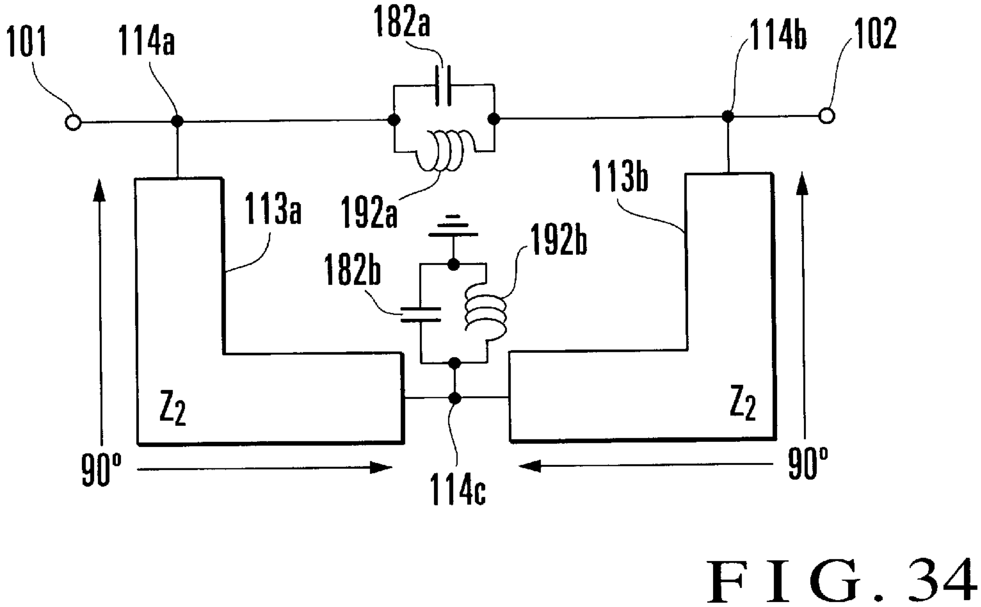
FIG. 34 is a circuit diagram showing another practical example of the phase shifter shown in FIG. 28.

FIG. 34 shows another practical example of the phase shifter shown in FIG. 28. The same reference numerals as in FIGS. 2 and 28 denote the same parts in FIG. 34, and a detailed description thereof will be omitted. In this phase shifter shown in FIG. 34, parallel resonant circuits in each of which an inductor and a capacitor are connected in parallel are used as the resonant circuits 172a and 172b shown in FIG. 28. More specifically, the resonant circuit 172*a* is constituted by a parallel resonant circuit in which an inductor 192*a* and a variable capacitor 182*a* are connected in parallel. The resonant circuit 172*b* is constituted by a parallel resonant circuit in which a inductor 192*b* and a variable capacitor 182*b* are connected in parallel.

In this phase shifter, high-frequency transmission lines 113*a* and 113*b* whose electrical length at the frequency $f_0$=5 GHz is 90° are used as the high-frequency phase shifting elements 103*a* and 103*b*, respectively, having the impedance converting function. Assuming that these high-frequency transmission lines 113*a* and 113*b* are lossless, the I/O impedance $Z_0$=50Ω.

Figure 35:
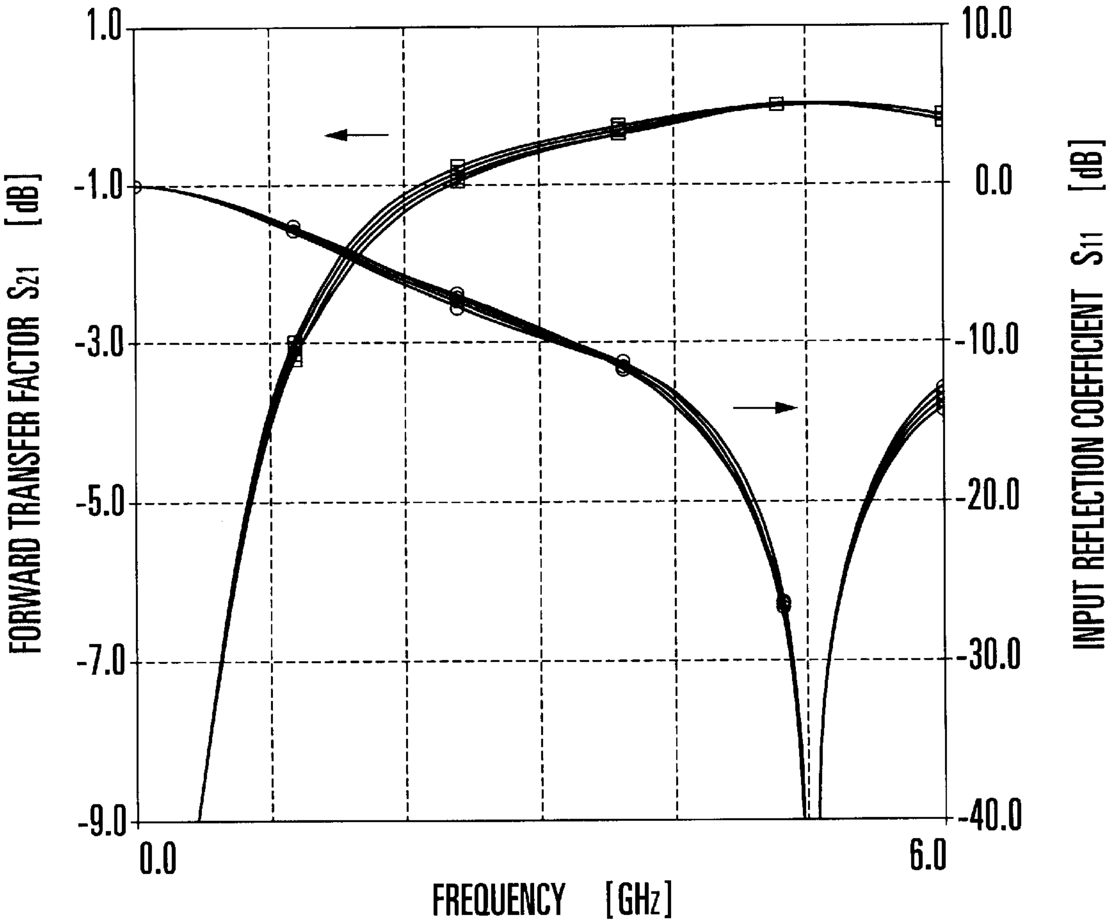
FIG. 35 is a graph showing an example of the amplitude characteristics of the phase shifter shown in FIG. 34.
Figure 36:
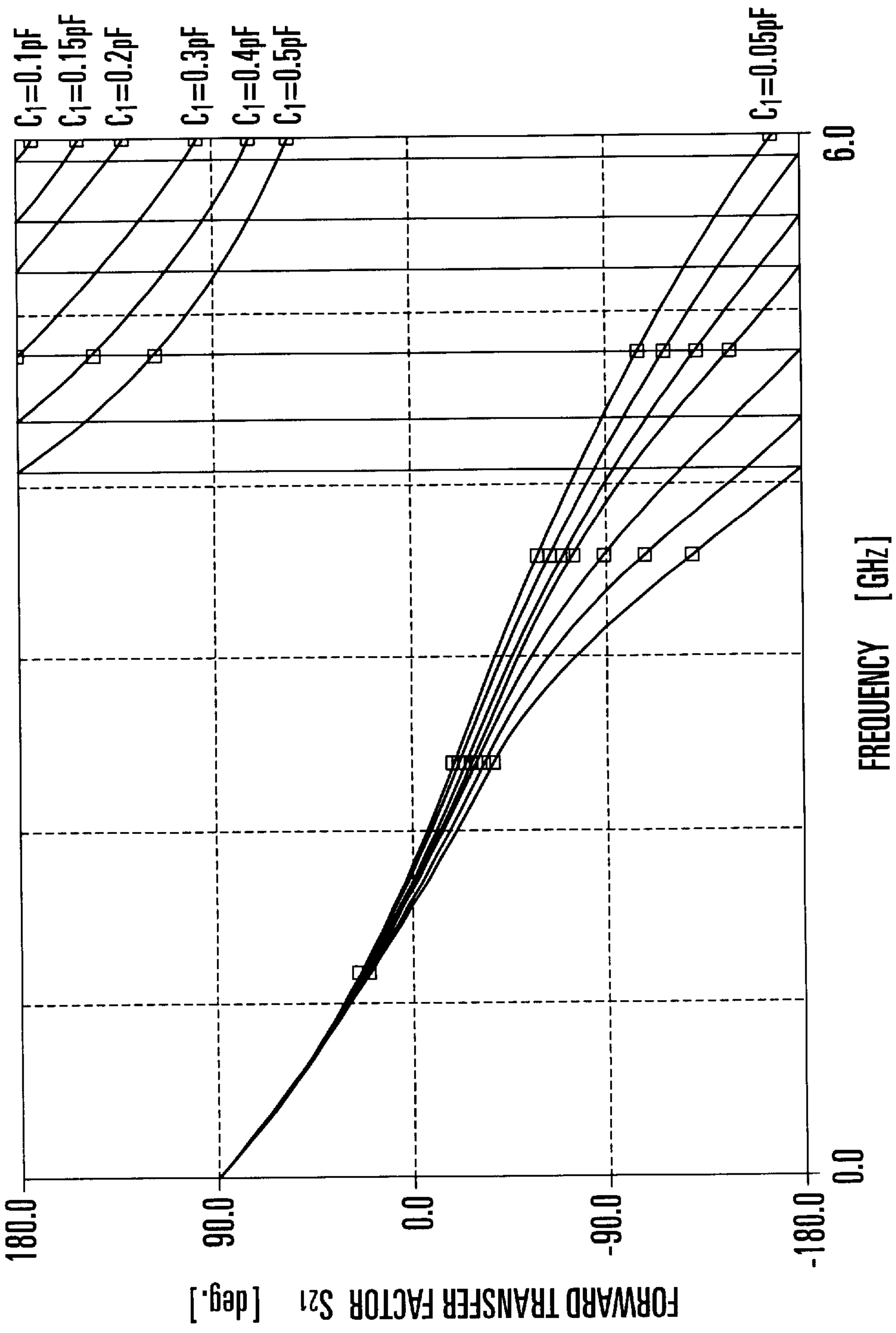
FIG. 36 is a graph showing an example of the phase characteristics of the phase shifter shown in FIG. 34.

FIG. 35 shows the simulation results of the amplitude characteristics (forward transfer factor $S_{21}$ and input reflection coefficient $S_{11}$) when the characteristic impedance $Z_2$ of the high-frequency transmission lines 113*a* and 113*b* is $Z_2$=70.7Ω. FIG. 36 shows the simulation results of the phase characteristics (forward transfer factor $S_{21}$) when the characteristic impedance $Z_2$ of the high-frequency transmission lines 113*a* and 113*b* is $Z_2$=70.7Ω.

Referring to FIGS. 35 and 36, an inductance $L_1$ of the inductor 192*a* is $L_1$=4 nH. From equation (14), an inductance $L_3$ of the inductor 192*b* is set to be ½ the inductance $L_1$ of the inductor 192*a*. Likewise, from equation (14), a capacitance $C_3$ of the variable capacitor 182*b* is set to be twice a capacitance $C_1$ of the variable capacitor 182*a*, and this capacitance $C_1$ of the variable capacitor 182*a* is changed to 0.05, 0.1, 0.15, 0.2, 0.3, 0.4, and 0.5 pF. As shown in FIGS. 30 and 31, at a frequency f=4.0 to 6.0 GHz, an amplitude fluctuation is 0.5 dB or less, an input reflection amount is −12 dB or less (FIG. 35), and a phase change amount is 90° or more (FIG. 36).

Figure 37:
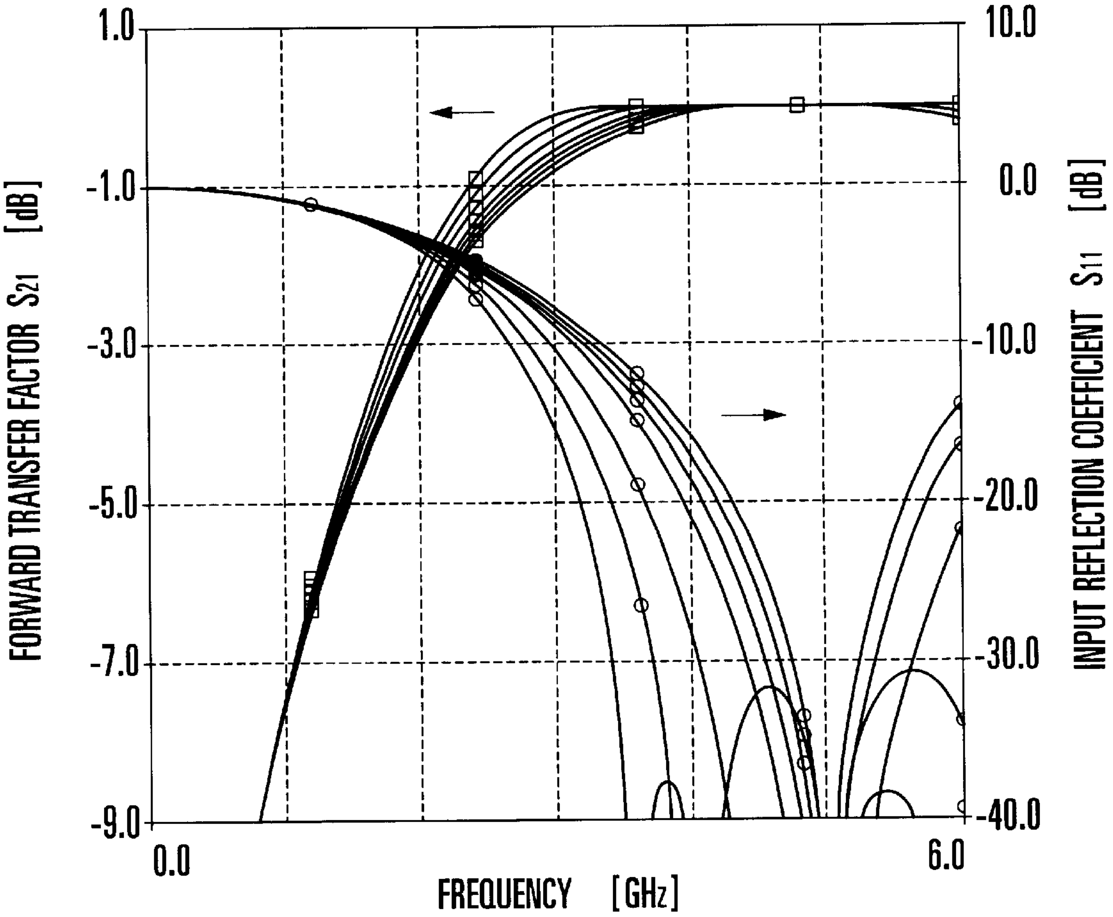
FIG. 37 is a graph showing another example of the amplitude characteristics of the phase shifter shown in FIG. 34.
Figure 38:
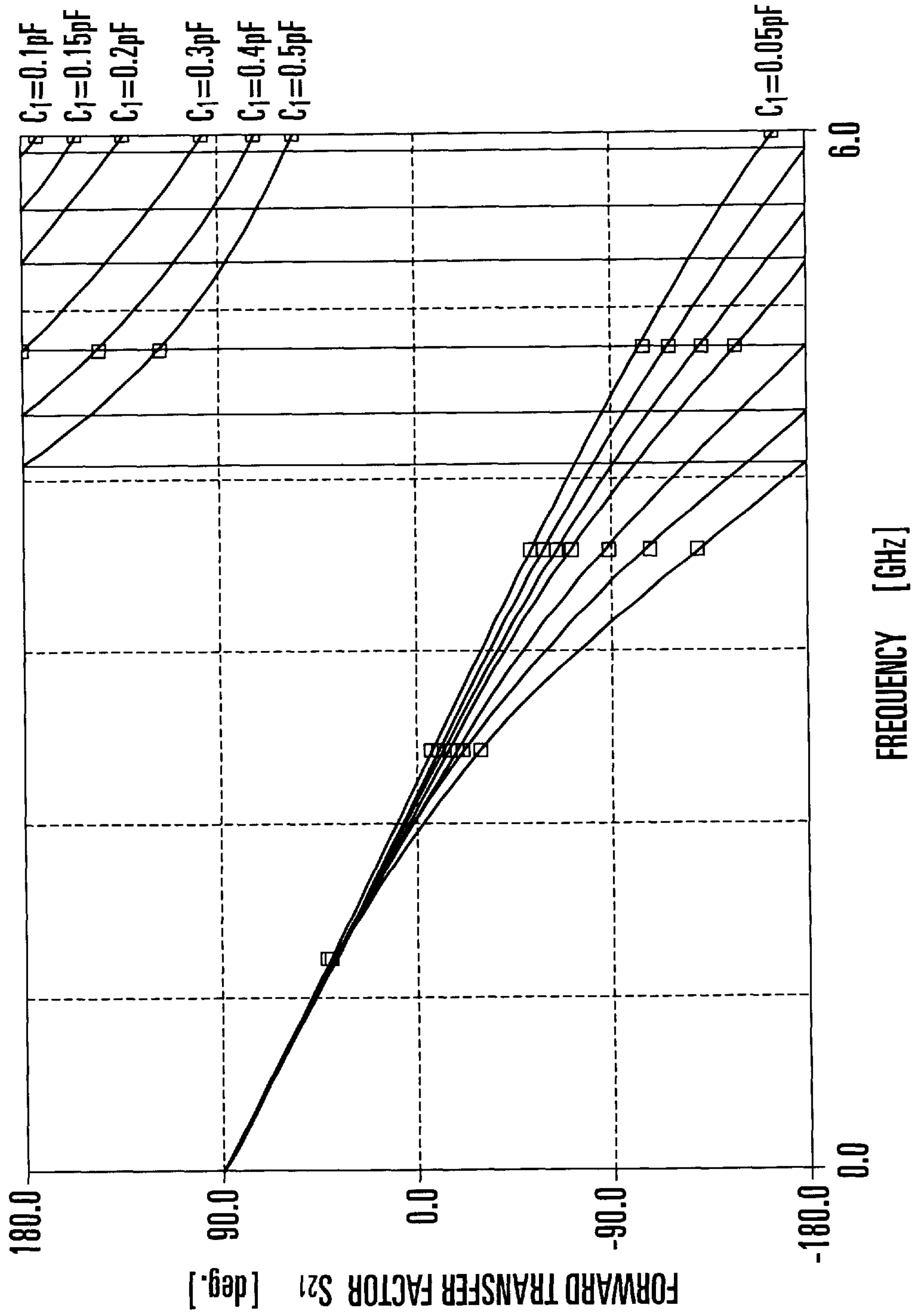
FIG. 38 is a graph showing another example of the phase characteristics of the phase shifter shown in FIG. 34.

Similarly, FIG. 37 shows the simulation results of the amplitude characteristics (forward transfer factor $S_{21}$ and input reflection coefficient $S_{11}$) when the characteristic impedance $Z_2$ of the high-frequency transmission lines 113*a* and 113*b* is $Z_2$=50Ω. FIG. 38 shows the phase characteristic (forward transfer factor $S_{21}$) when the characteristic impedance $Z_2$ of the high-frequency transmission lines 113*a* and 113*b* is $Z_2$=50Ω.

Referring to FIGS. 37 and 38, the inductance L of the inductor 192*a* is $L_1$=4 nH. From equation (14), the inductance $L_3$ of the inductor 192*b* is set to be ¼ the inductance $L_1$ of the inductor 192*a*. Likewise, from equation (14), the capacitance $C_3$ of the variable capacitor 182*b* is set to be four times the capacitance $C_1$ of the variable capacitor 182*a*, and this capacitance $C_1$ of the variable capacitor 182*a* is changed to 0.05, 0.1, 0.15, 0.2,, 0.3, 0.4, and 0.5 pF. As shown in FIGS. 37 and 38, at a frequency f=4.0 to 6.0 GHz, an amplitude fluctuation is 0.5 dB or less, an input reflection amount is −13 dB or less (FIG. 37), and a phase change amount is 100° or more (FIG. 38).

Figure 39:
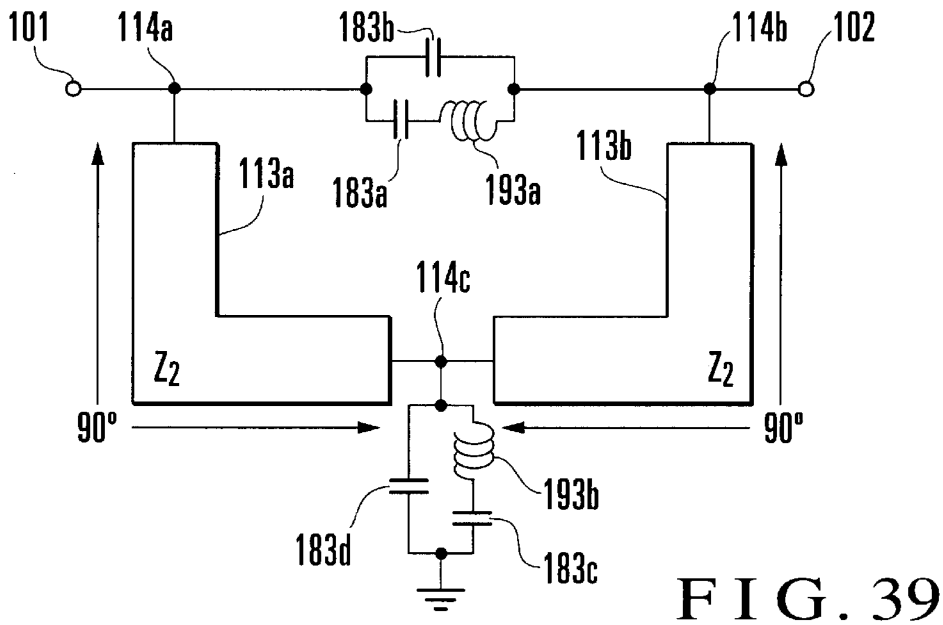
FIG. 39 is a circuit diagram showing still another practical example of the phase shifter shown in FIG. 28.

FIG. 39 shows still another practical example of the phase shifter shown in FIG. 28. The same reference numerals as in FIGS. 2 and 28 denote the same parts in FIG. 39, and a detailed description thereof will be omitted. In this phase shifter shown in FIG. 39, composite resonant circuits in each of which a series resonant circuit in which an inductor and a first capacitor are connected in series is connected in parallel with a second capacitor are used as the resonant circuits 172*a* and 172*b* shown in FIG. 28. More specifically, a series resonant circuit is formed by connecting an inductor 193*a* and a first variable capacitor 183*a* in series, and this series resonant circuit is connected in parallel with a second variable capacitor 183*b* to form a composite resonant circuit. This composite resonant circuit is used as the resonant circuit 172*a*. Also, a series resonant circuit is formed by connecting an inductor 193*b* and a first variable capacitor 183*c* in series, and this series resonant circuit is connected in parallel with a second variable capacitor 183*d* to form a composite resonant circuit. This composite resonant circuit is used as the resonant circuit 172*b*.

In this phase shifter, high-frequency transmission lines 113*a* and 113*b* whose electrical length at the frequency $f_0$=5 GHz is 90° are used as the high-frequency phase shifting elements 103*a* and 103*b*, respectively, having the impedance converting function. Assuming that these high-frequency transmission lines 113*a* and 113*b* are lossless, the I/O impedance $Z_0$=50Ω.

Figure 40:
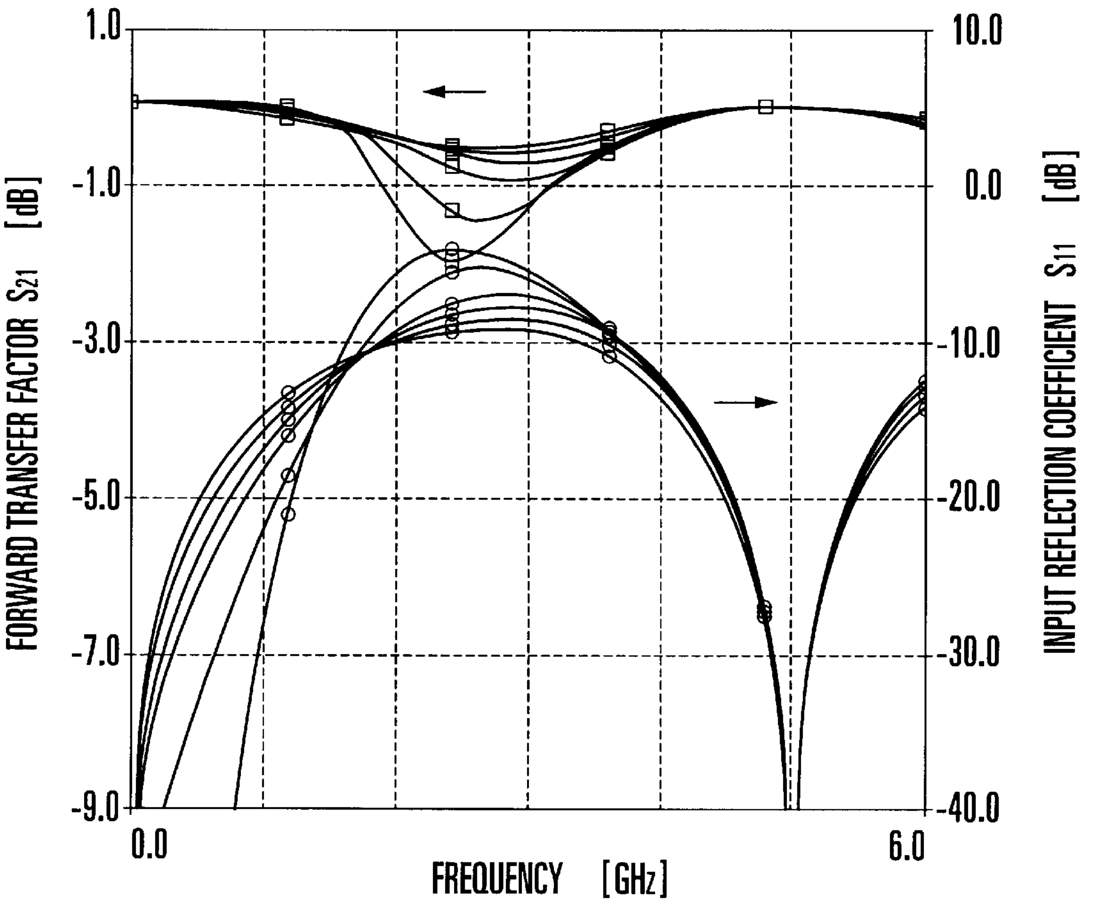
FIG. 40 is a graph showing an example of the amplitude characteristics of the phase shifter shown in FIG. 39.
Figure 41:
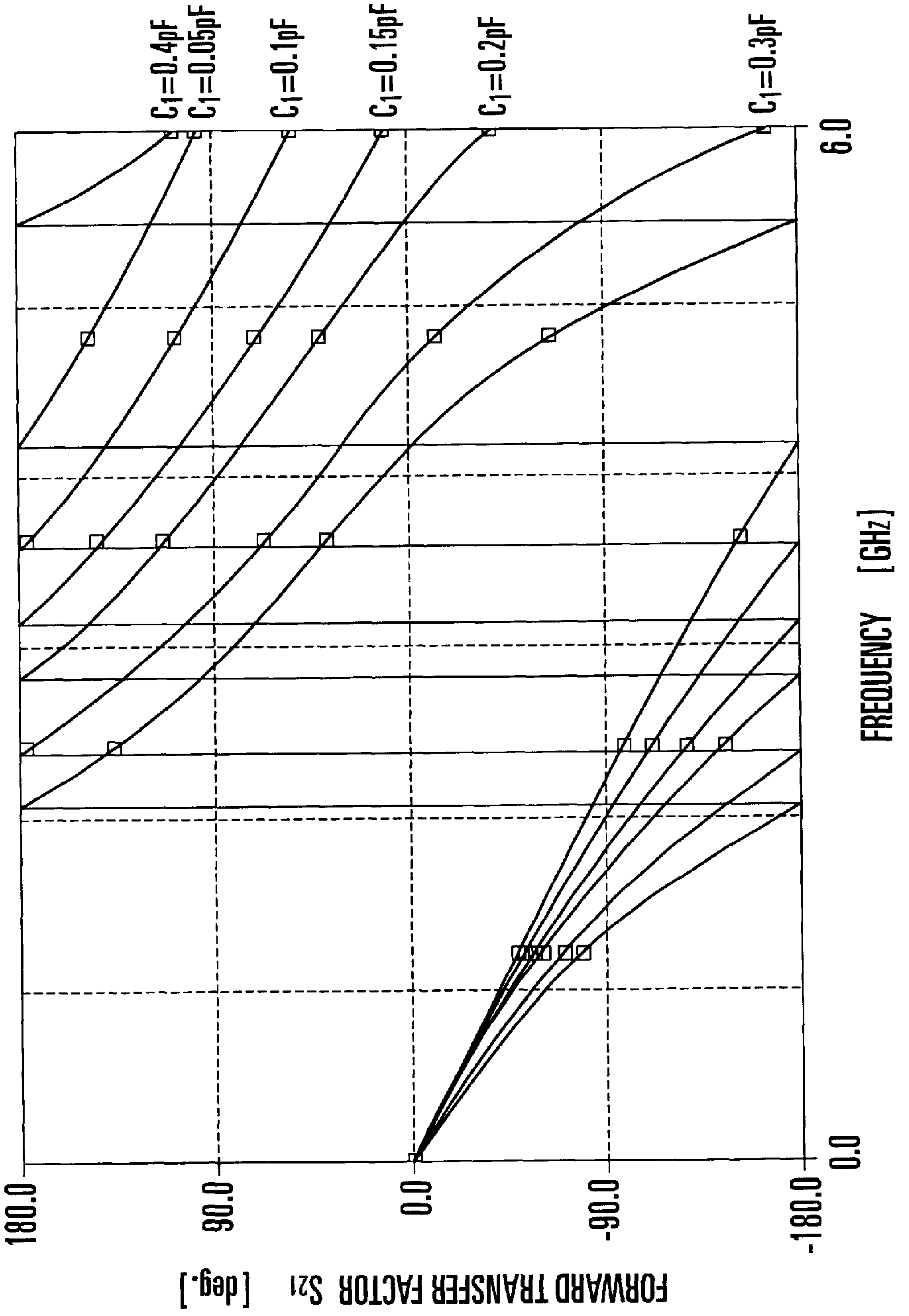
FIG. 41 is a graph showing an example of the phase characteristics of the phase shifter shown in FIG. 39.

FIG. 40 shows the simulation results of the amplitude characteristics (forward transfer factor $S_{21}$ and input reflection coefficient $S_{11}$) when the characteristic impedance $Z_2$ of the high-frequency transmission lines 113*a* and 113*b* is $Z_2$=70.7Ω. FIG. 41 shows the simulation results of the phase characteristics (forward transfer factor $S_{21}$) when the characteristic impedance $Z_2$ of the high-frequency transmission lines 113*a* and 113*b* is $Z_2$=70.7Ω.

Referring to FIGS. 40 and 41, an inductance $L_1$ of the inductor 193*a* is $L_1$=4 nH, the capacitances of the variable capacitors 183*a* and 183*b* are equally $C_1$, and the capacitances of the variable capacitors 183*c* and 183*d* are equally $C_3$. From equation (14), an inductance $L_3$ of the inductor 193*b* is set to be ½ the inductance $L_1$ of the inductor 193*a*. Likewise, from equation (14), the capacitance $C_3$ of the variable capacitors 183*c* and 183*d* is set to be twice the capacitance $C_1$ of the variable capacitors 183*a* and 183*b*, and this capacitance $C_1$ of the variable capacitors 183*a* and 183*b* is changed to 0.05, 0.1, 0.15, 0.2, 0.3, and 0.4 pF. As shown in FIGS. 40 and 41, at a frequency f=4.0 to 6.0 GHz, an amplitude fluctuation is 0.5 dB or less, an input reflection amount is −12 dB or less (FIG. 40), and a phase change amount is 170° or more (FIG. 41).

Figure 42:
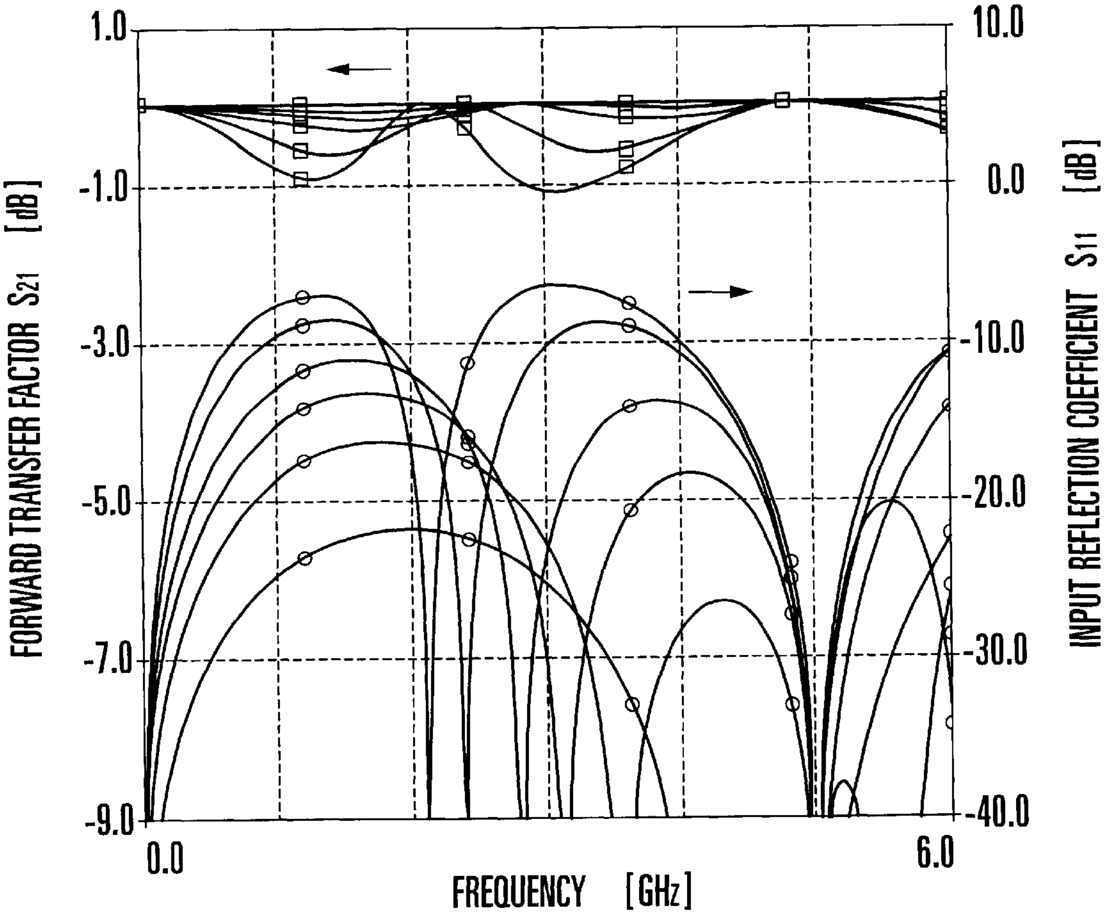
FIG. 42 is a graph showing another example of the amplitude characteristics of the phase shifter shown in FIG. 39.
Figure 43:
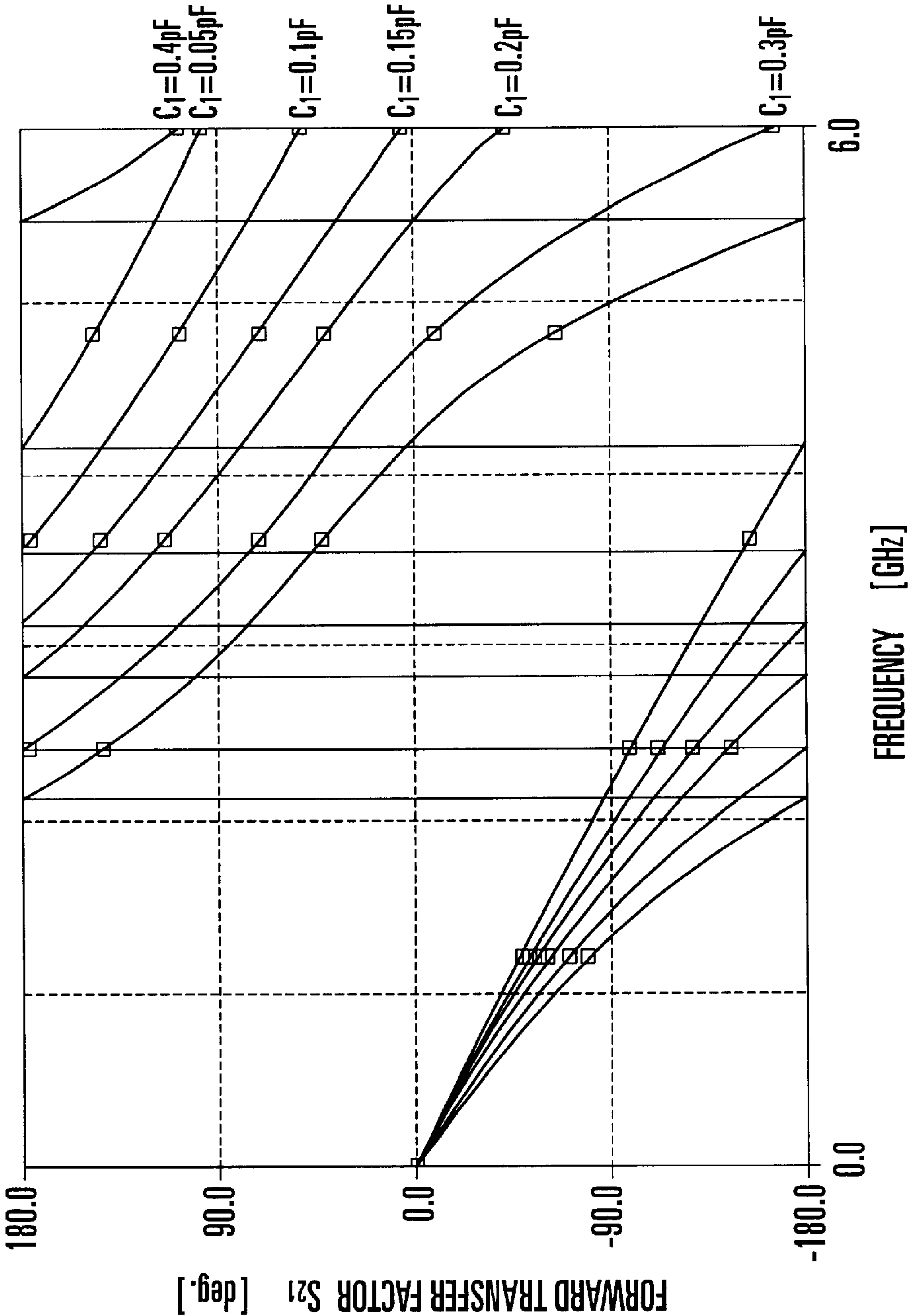
FIG. 43 is a graph showing another example of the phase characteristics of the phase shifter shown in FIG. 39.

Similarly, FIG. 42 shows the simulation results of the amplitude characteristics (forward transfer factor $S_{21}$ and input reflection coefficient $S_{11}$) when the characteristic impedance $Z_2$ of the high-frequency transmission lines 113*a* and 113*b* is $Z_2$=50Ω. FIG. 43.shows the phase characteristics (forward transfer factor $S_{21}$) when the characteristic impedance $Z_2$ of the high-frequency transmission lines 113*a* and 113*b* is $Z_2$=50Ω.

Referring to FIGS. 42 and 43, the inductance $L_1$ of the inductor 193*a* is $L_1$=4 nH, the capacitances of the variable capacitors 183*a* and 183*b* are equally $C_1$, and the capacitances of the variable capacitors 183*c* and 183*d* are equally $C_3$. From equation (14), the inductance $L_3$ of the inductor 193*b* is set to be ¼ the inductance $L_1$ of the inductor 193*a*. Likewise, from equation (14), the capacitance $C_3$ of the variable capacitors 183*c* and 183*d* is set to be four times the capacitance $C_1$ of the variable capacitors 183*a* and 183*b*, and this capacitance $C_1$ of the variable capacitors 183*a* and 183*b* is changed to 0.05, 0.1, 0.15, 0.2, 0.3, and 0.4 pF. As shown in FIGS. 42 and 43, at a frequency f=4.0 to 6.0 GHz, an amplitude fluctuation is 0.5 dB or less, an input reflection amount is −10 dB or less (FIG. 42), and a phase change amount is 160° or more (FIG. 43).

Figure 44:
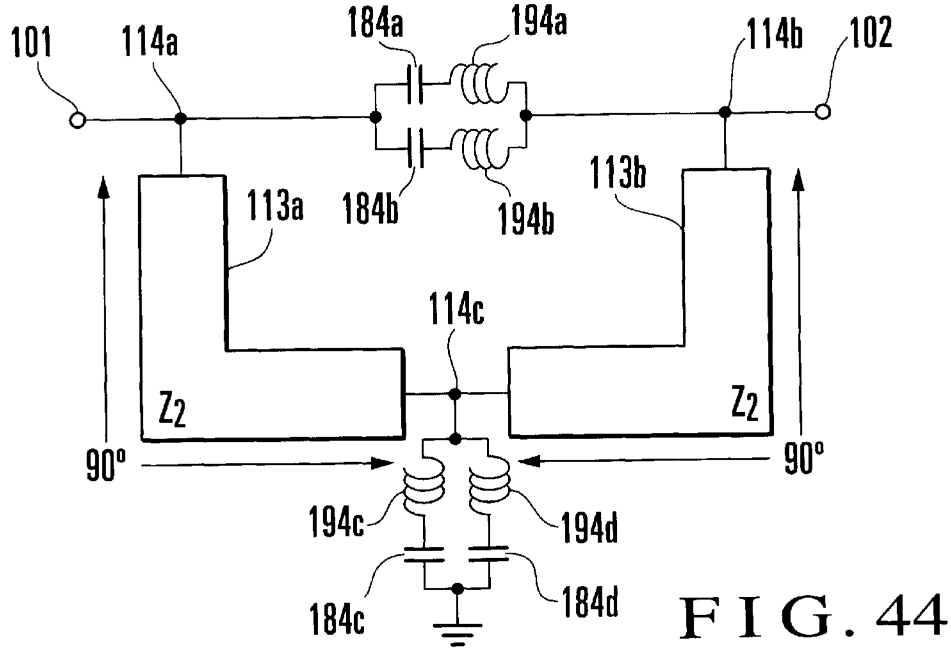
FIG. 44 is a circuit diagram showing still another practical example of the phase shifter shown in FIG. 28.

FIG. 44 shows still another practical example of the phase shifter shown in FIG. 28. The same reference numerals as in FIGS. 2 and 28 denote the same parts in FIG. 44, and a detailed description thereof will be omitted. In this phase shifter shown in FIG. 44, composite resonant circuits in each of which two series resonant circuits each formed by connecting an inductor and a capacitor in series are connected in parallel are used as the resonant circuits 172*a* and 172*b* shown in FIG. 28. More specifically, one series resonant circuit is formed by connecting an inductor 194*a* and a variable capacitor 184*a* in series, and the other series resonant circuit is formed by connecting an inductor 194*b* and a variable capacitor 184*b* in series. These two series resonant circuits are connected in parallel to form a composite resonant circuit which is used as the resonant circuit 172*a*. Also, one series resonant circuit is formed by connecting an inductor 194*c* and a variable capacitor 184*c* in series, and the other series resonant circuit is formed by connecting an inductor 194*d* and a variable capacitor 184*d* in series. These two series resonant circuits are connected in parallel to form a composite resonant circuit which is used as the resonant circuit 172*b*.

In this phase shifter, high-frequency transmission lines 113*a* and 113*b* whose electrical length at the frequency $f_0$=5 GHz is 90° are used as the high-frequency phase shifting elements 103*a* and 103*b*, respectively, having the impedance converting function. Assuming that these high-frequency transmission lines 113*a* and 113*b* are lossless, the I/O impedance $Z_0$=50Ω.

Figure 45:
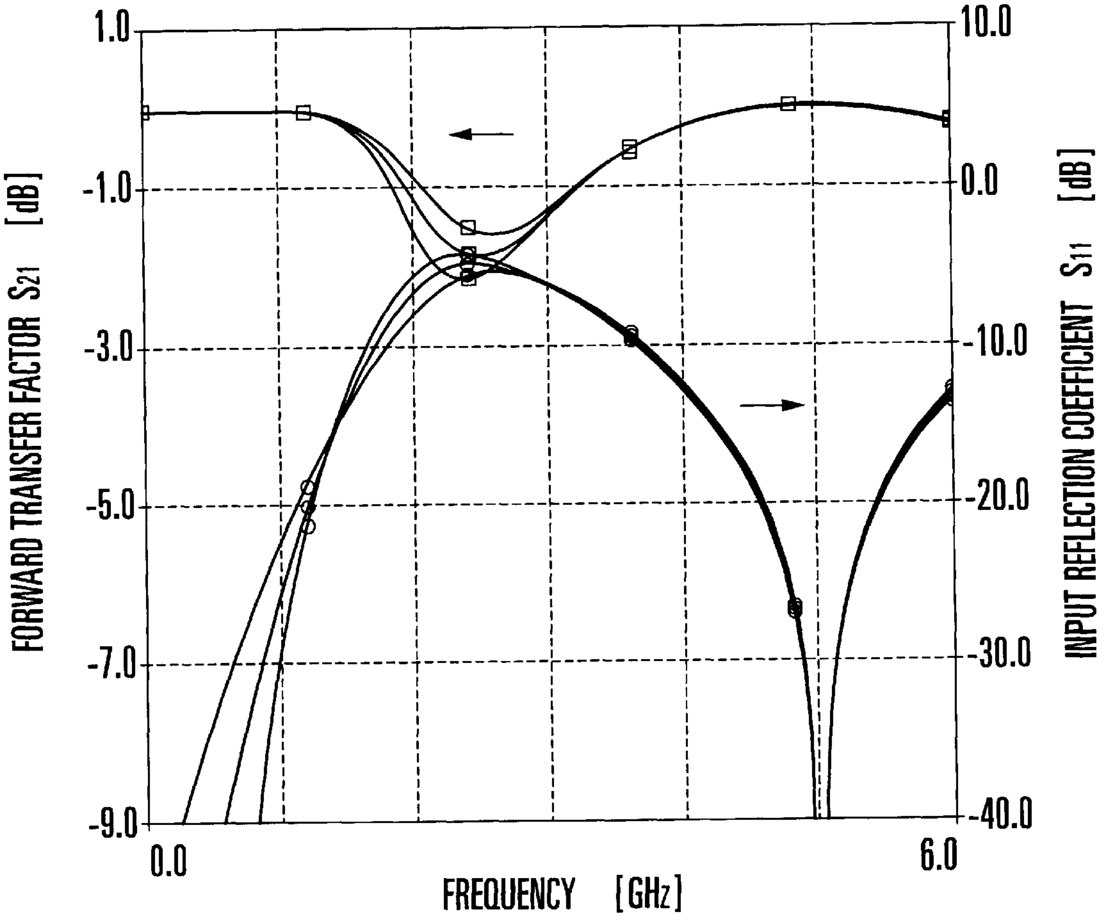
FIG. 45 is a graph showing an example of the amplitude characteristics of the phase shifter shown in FIG. 44.
Figure 46:
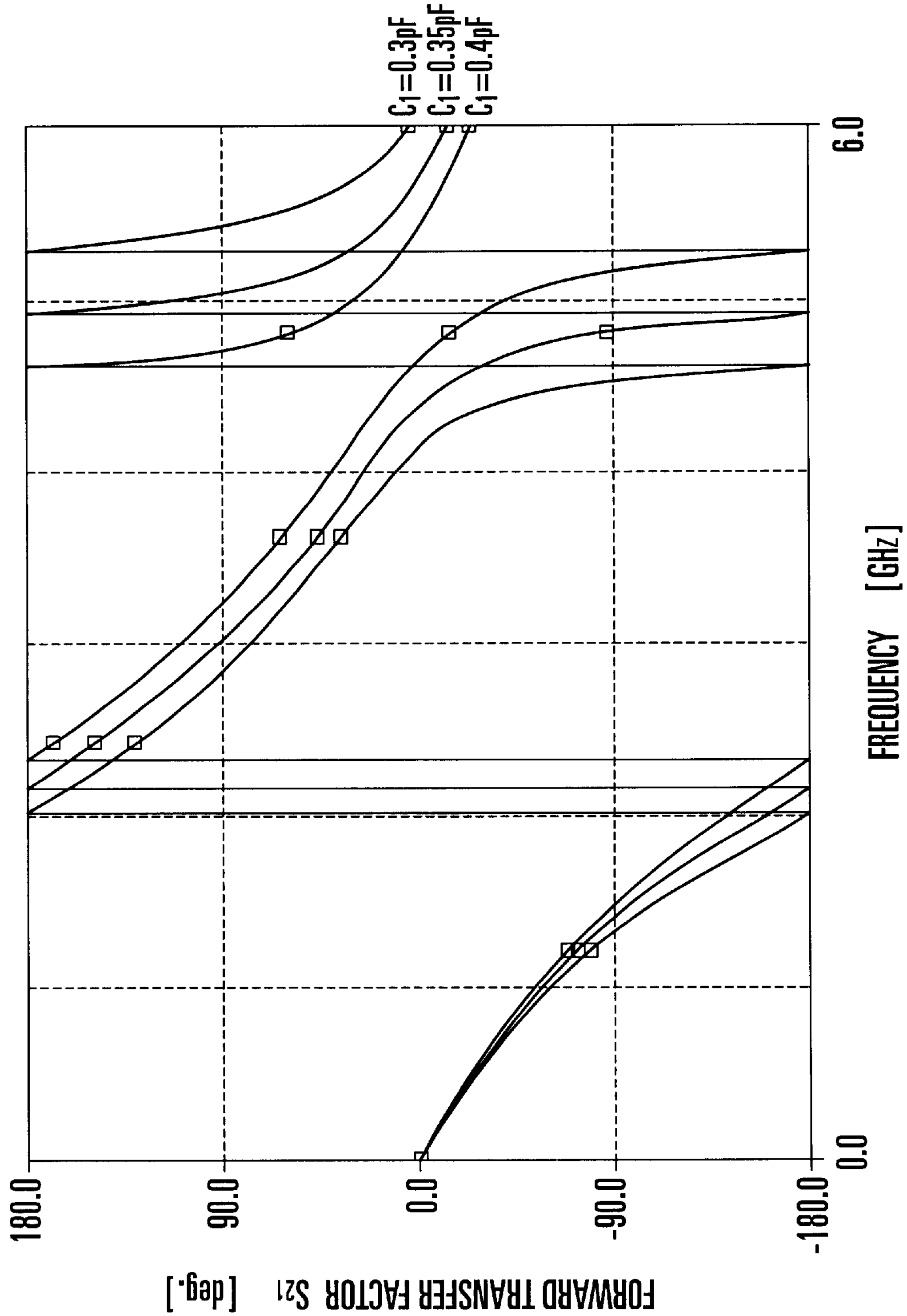
FIG. 46 is a graph showing an example of the phase characteristics of the phase shifter shown in FIG. 44.

FIG. 45 shows the simulation results of the amplitude characteristics (forward transfer factor $S_{21}$ and input reflection coefficient $S_{11}$) when the characteristic impedance $Z_2$ of the high-frequency transmission lines 113*a* and 113*b* is $Z_2$=70.7Ω. FIG. 46 shows the simulation results of the phase characteristic (forward transfer factor $S_{21}$) when the characteristic impedance $Z_2$ of the high-frequency transmission lines 113*a* and 113*b* is $Z_2$=70.7Ω.

Referring to FIGS. 45 and 46, an inductance $L_1$ of the inductor 194*a* is $L_1$=4 nH, and an inductance $L_2$ of the inductor 194*b* is set to be ½ the inductance $L_1$ of the inductor 194*a*. Also, the capacitances of the variable capacitors 184*a* and 184*b* are equally $C_1$, and the capacitances of the variable capacitors 184*c* and 184*d* are equally $C_3$. From equation (14), an inductance $L_3$ of the inductor 194*c* is set to be ½ the inductance $L_1$ of the inductor 194*a*, and an inductance $L_4$ of the inductor 194*d* is set to be ½ the inductance $L_2$ of the inductor 194*b*. Likewise, from equation (14), the capacitance $C_3$ of the variable capacitors 184*c* and 184*d* is set to be twice the capacitance $C_1$ of the variable capacitors 184*a* and 184*b*, and this capacitance $C_1$ of the variable capacitors 184*a* and 184*b* is changed to 0.05, 0.1, 0.15, 0.2, 0.3, and 0.4 pF. As shown in FIGS. 45 and 46, at a frequency f=4.6 to 5.4 GHz, an amplitude fluctuation is 0.5 dB or less, an input reflection amount is −20 dB or less (FIG. 45), and a phase change amount is 100° or more (FIG. 46).

Figure 47:
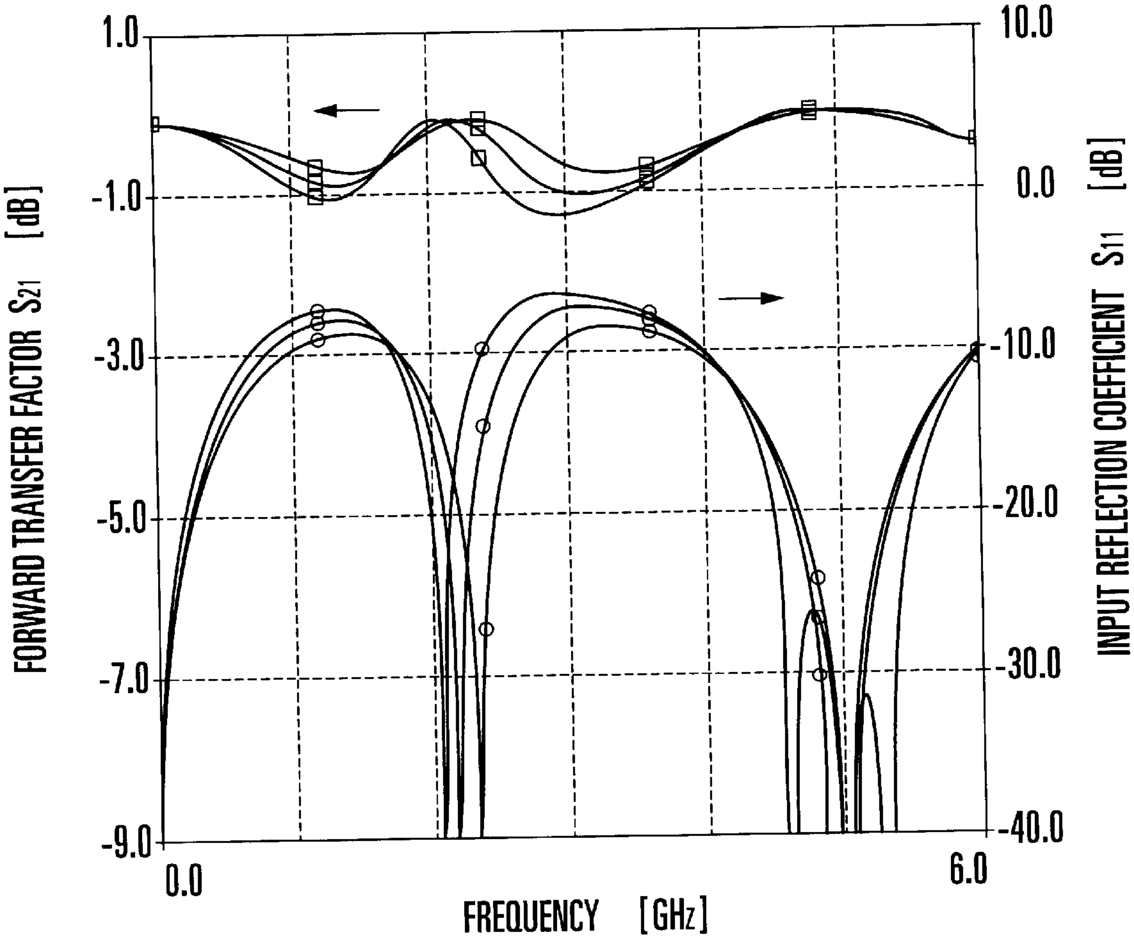
FIG. 47 is a graph showing another example of the amplitude characteristics of the phase shifter shown in FIG. 44.
Figure 48:
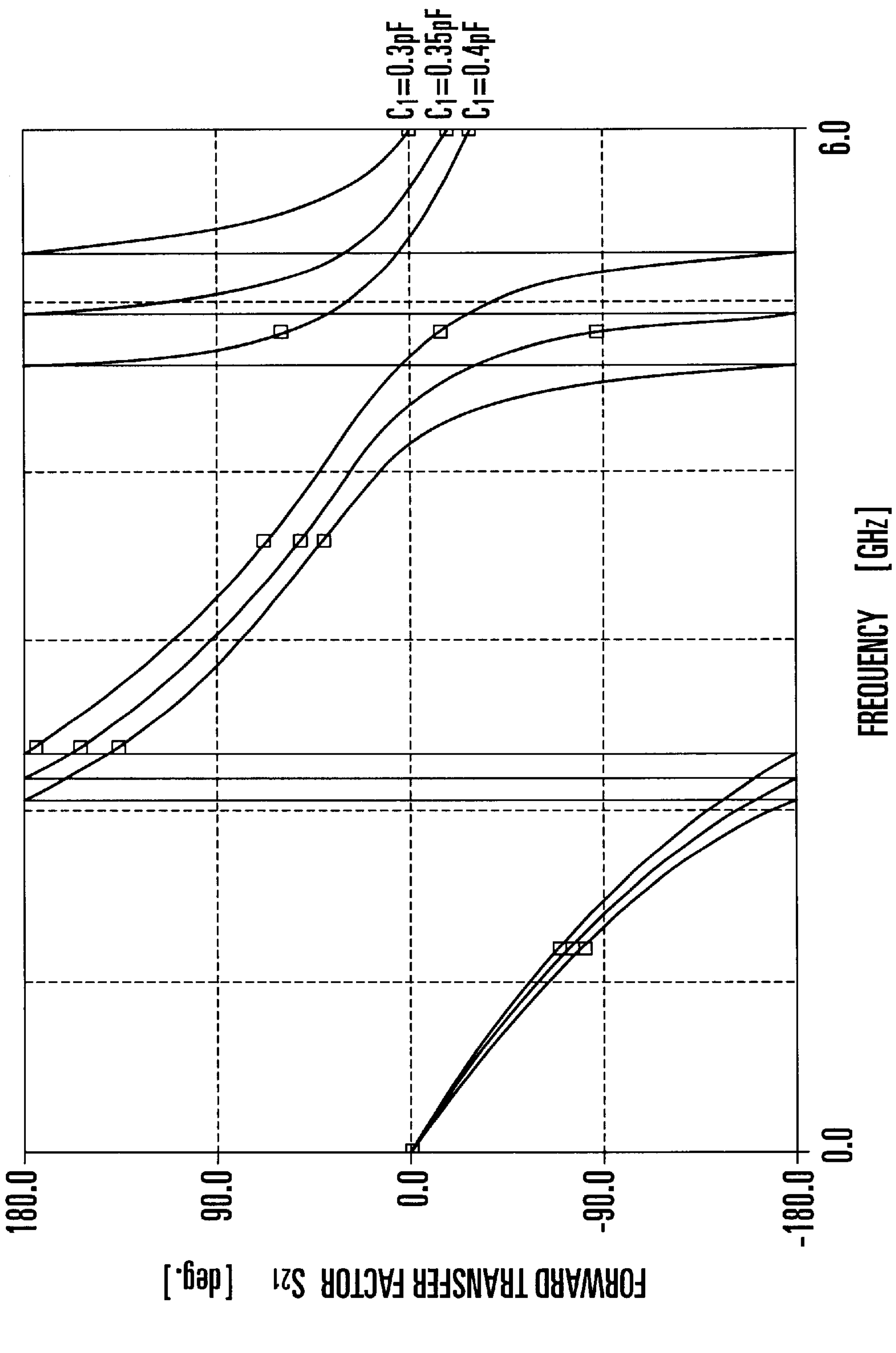
FIG. 48 is a graph showing another example of the phase characteristics of the phase shifter shown in FIG. 44.

Similarly, FIG. 47 shows the simulation results of the amplitude characteristics (forward transfer factor $S_{21}$ and input reflection coefficient $S_{11}$) when the characteristic impedance $Z_2$ of the high-frequency transmission lines 113*a* and 113*b* is $Z_2$=50Ω. FIG. 48 shows the phase characteristic (forward transfer factor $S_{21}$) when the characteristic impedance $Z_2$ of the high-frequency transmission lines 113*a* and 113*b* is $Z_2$=50Ω.

Referring to FIGS. 47 and 48, the inductance $L_1$ of the inductor 194*a* is $L_1$=4 nH, and the inductance $L_2$ of the inductor 194*b* is set to be ½ the inductance $L_1$ of the inductor 194*a*. Also, the capacitances of the variable capacitors 184*a* and 184*b* are equally $C_1$, and the capacitances of the variable capacitors 184*c* and 184*d* are equally $C_3$. From equation (14), the inductance $L_3$ of the inductor 194*c* is set to be ¼ the inductance $L_1$ of the inductor 194*a*, and the inductance $L_4$ of the inductor 194*d* is set to be ¼ the inductance $L_2$ of the inductor 194*b*. Likewise, from equation (14), the capacitance $C_3$ of the variable capacitors 184*c* and 184*d* is set to be four times the capacitance $C_1$ of the variable capacitors 184*a* and 184*b*, and this capacitance $C_1$ of the variable capacitors 184*a* and 184*b* is changed to 0.05, 0.1, 0.15, 0.2, 0.3, and 0.4 pF. As shown in FIGS. 47 and 48, at a frequency f=4.7 to 5.3 GHz, an amplitude fluctuation is 0.5 dB or less, an input reflection amount is −20 dB or less (FIG. 47), and a phase change amount is 160° or more (FIG. 48).

[Trial Manufacture of MMIC Phase Shifter and Experimental Results]

Figure 49:
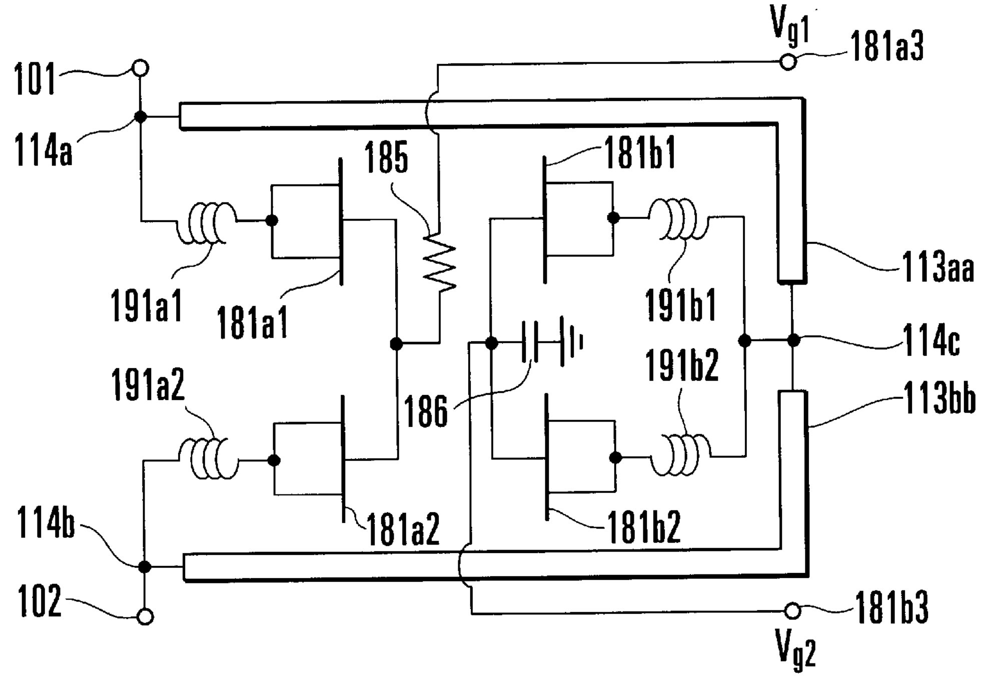
FIG. 49 is a circuit diagram showing a practical trial product of the phase shifter shown in FIG. 29.

The phase shifter according to the present invention described above is suitably formed by an MMIC. FIG. 49 shows,a practical trial product of the phase shifter shown in FIG. 29. The circuit configuration of an MMIC phase shifter using coplanar transmission lines is shown in FIG. 49. The same reference numerals as in FIG. 29 denote the same parts in FIG. 49, and a detailed description thereof will be omitted.

In this MMIC process, a 2-μm thick Au conductor coplanar transmission lines (characteristic impedance $Z_2$=50Ω) 113*aa* and 113*bb*, inductors 191*a*1, 191*a*2, 191*b*1, and 191*b*2, a resistor 185, a capacitor 186, and GaAs MESFETs 181*a*1, 181*a*2, 181*b*1, and 181*b*2 are formed on a 600-μm thick GaAs substrate. The GaAS MESFETs 181*a*1, 181*a*2, 181*b*1, and 181*b*2 have a gate length of 0.3 μm, a transconductance $g_m$=200 mS/mm or more, and a cutoff frequency $f_T$=20 GHz or more.

In this phase shifter, the drain terminals and source terminals of the GaAs MESFETs 181*a*1, 181*a*2, 181*b*1, and 181*b*2 are connected to use the Schottky gate capacitances of these GaAs MESFETs 181*a*1, 181*a*2, 181*b*1, and 181*b*2 as the capacitances of varactor diodes FETC. The gate width of the GaAs MESFETs 181*a*1, 181*a*2, 181*b*1, and 181*b*2 (i.e., the varactor diodes $FET_C$) is 80 μm.

To ensure the symmetry of the pattern layout to suppress electrical characteristic variations, series circuits including identical inductors and identical GaAs MESFETs (i.e., varactor diodes $FET_C$) are connected in series and, in parallel. More specifically, the inductors 191*a*1 and 191*a*2 have the same inductance, and the GaAs MESFETs 181*a*1 and 181*a*2 have the same capacitance. A series circuit of the inductor 191*a*1 ad the GaAs MESFET 181*a*1 and a series circuit of the inductor 191*a*2 and the GaAs MESFET 181*a*2 are connected in series. Also, the inductors 191*b*1 and 191*b*2 have the same inductance, and the GaAs MESFETs 181*b*1 and 181*b*2 have the same capacitance. A series circuit of the inductor 191*b*1 and the GaAS MESFET 181*b*1 and a series circuit of the inductor 191*b*2 and the GaAs MESFET 181*b*2 are connected in parallel.

The gate terminals of the GaAs MESFETs 181*a*1 and 181*a*2 are connected together to a voltage terminal 181*a*3 via the resistor 185. The capacitance of these GaAs MESFETs (i.e., the varactor diodes $FET_C$) 181*a*1 and 181*a*2 changes in accordance with a voltage $V_{g1}$ applied from this voltage terminal 181*a*3. Likewise, the gate terminals of the GaAs MESFETs 181*b*1 and 181*b*2 are connected together to a voltage terminal 181*b*3, and the capacitance of these GaAs MESFETs (i.e., the varactor diodes $FET_C$) 181*b*1 and 181*b*2 changes in accordance with a voltage $V_{g2}$ applied from this voltage terminal 181*b*3. Also, the gate terminals of the GaAs MESFETs 181*b*1 and 181*b*2 are grounded in a high-frequency manner via the capacitor 186.

Figure 50:
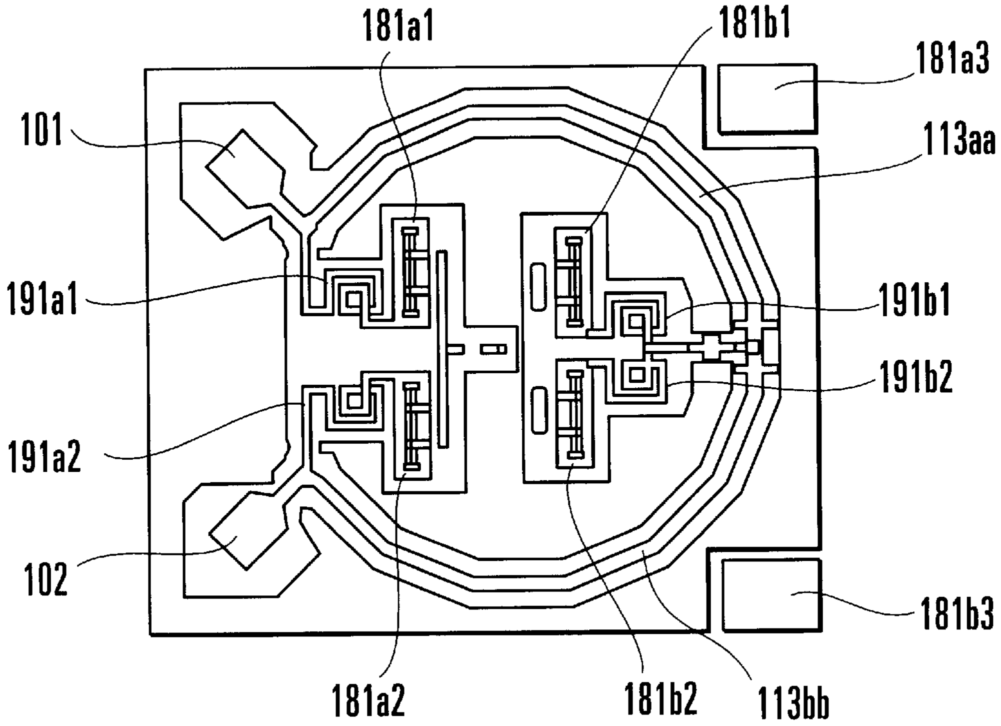
FIG. 50 is a plan view showing the trial product shown in FIG. 49.

FIG. 50 shows the trial product shown in FIG. 49. The chip size of this trial product is small, 0.91 mm×0.78 mm (=0.71 $mm^2$).

Figure 51:
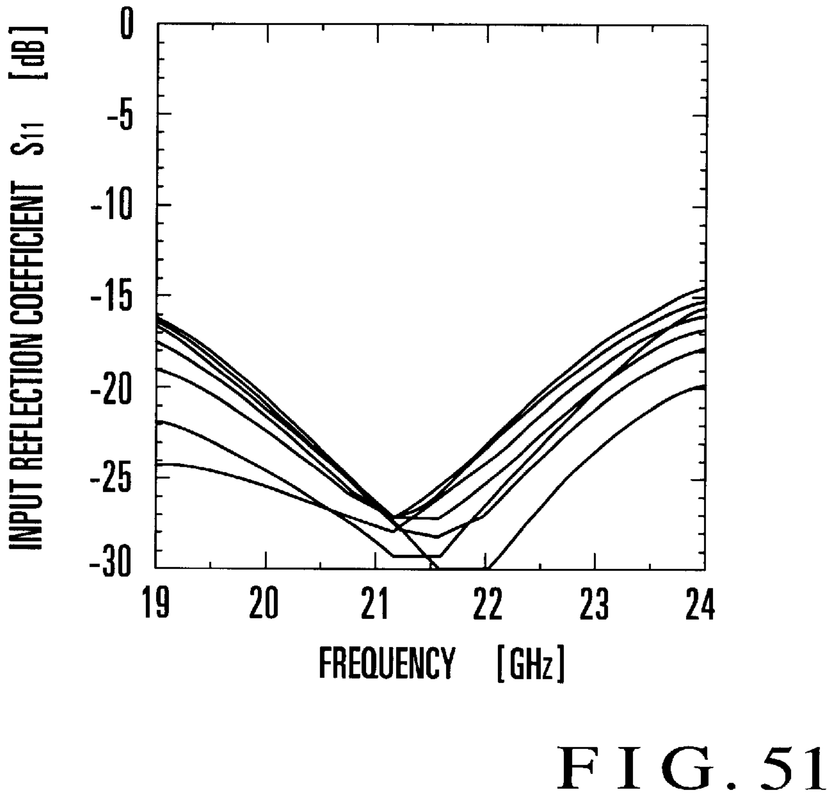
FIG. 51 is a graph showing the input reflection characteristics of the trial product shown in FIG. 49.
Figure 52:
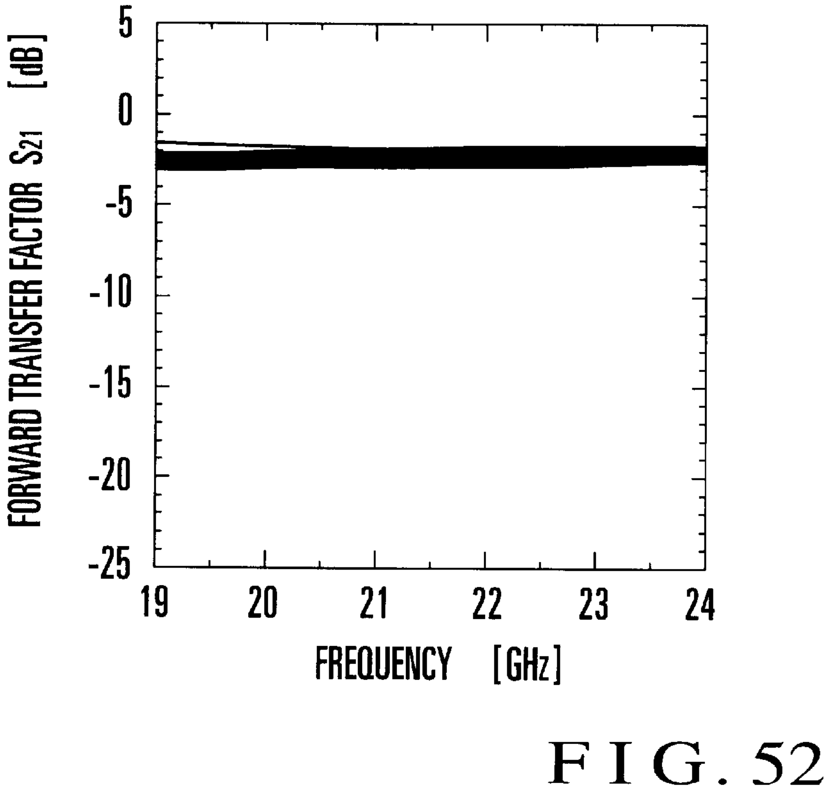
FIG. 52 is a graph showing the forward transfer characteristics of the trial product shown in FIG. 49.
Figure 53:
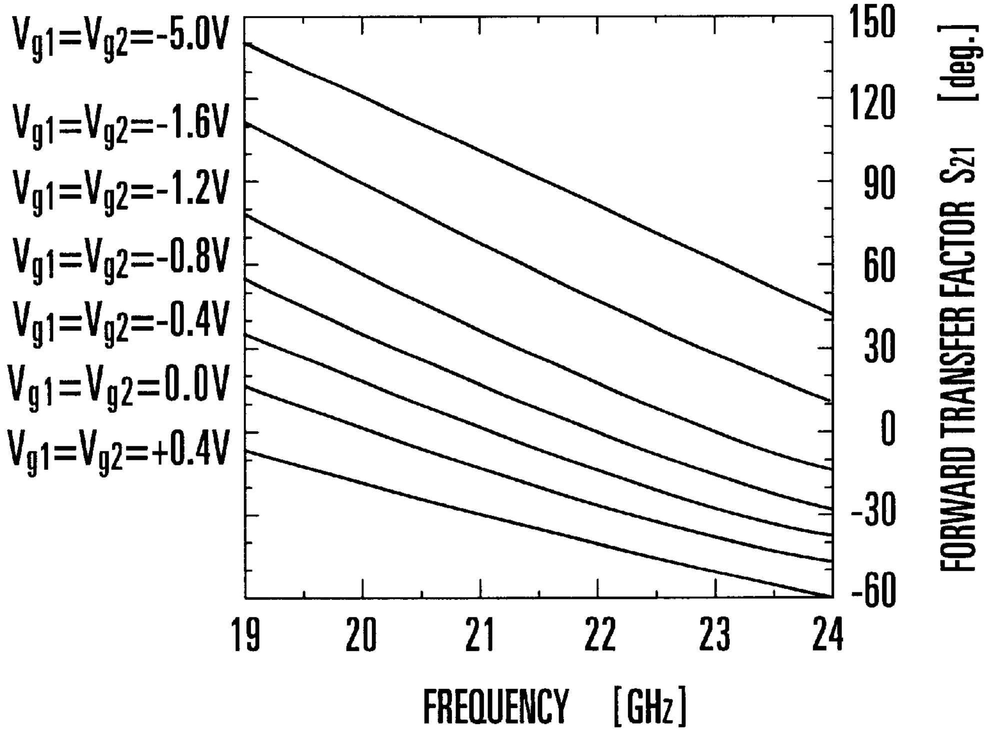
FIG. 53 is a graph showing the phase characteristics of the trial product shown in FIG. 49.

FIG. 51 shows the measurement results of the amplitude characteristics (input reflection coefficient $S_{11}$) when the characteristic impedance $Z_2$ of the coplanar transmission lines 113*aa* and 113*bb* is $Z_2$=50Ω. The abscissa indicates the frequency [GHz], and the ordinate indicates the input reflection coefficient $S_{11}$ [dB]. FIG. 52 shows the measurement results of the amplitude characteristic (forward transfer factor $S_{21}$) when the characteristic impedance $Z_2$ of the coplanar transmission lines 113*aa* and 113*bb* is $Z_2$=50Ω. The abscissa indicates the frequency [GHz], and the ordinate indicates the forward transfer factor $S_{21}$ [dB]. FIG. 53 shows the measurement results of the phase characteristics (forward transfer factor $S_{21}$) when the characteristic impedance $Z_2$ of the coplanar transmission lines 113*aa* and 113*bb* is $Z_2$=50Ω. The abscissa indicates the frequency [GHz], and the ordinate indicates the forward transfer factor $S_{21}$ [deg.]

Referring to FIGS. 51 to 53, the voltages $V_{g1}$ and $V_{g2}$ are changed from −5.0 V to +0.4 V while 0 V is kept applied from a bias terminal of a network analyzer to an input port 101 and an output port 102. As shown in FIGS. 51 to 53, at a frequency f=19 to 24 GHz, an input reflection amount is −10 dB or less (FIG. 51), an amplitude fluctuation is 0.8 dB or less (FIG. 52), and a phase change amount is 100° or more (FIG. 53).

Although a GaAs substrate is used in this trial product, it is of course possible to obtain superior characteristics even in an MMIC process using a semiconductor substrate such as $S_i$ or InP. Furthermore, coplanar transmission lines are used as transmission lines, but good characteristics can also be obtained when, e.g., microstrip lines are used.

As described above, the phase shifter according to the present invention is suitably formed by an MMIC. A small phase shifter can be formed using an MMIC. Also, since highly uniform chips can be fabricated with no adjustment by a semiconductor process, the productivity can be improved. Additionally, the packaging cost can be reduced and the reliability can be improved by high-degree integration and high-accuracy reproduction.

[Comparison of Prior Art and Present Invention]

The phase shifter according to the present invention will be compared with a conventional phase shifter. A conventional phase shifter shown in FIG. 62 and the first configuration of the present invention shown in FIG. 2 are identical in that they are constituted by using high-frequency transmission lines whose electrical length at the frequency $f_0$ is 90°. Hence, the phase shifter shown in FIG. 62 and the phase shifter shown in FIG. 2 will be compared below.

Figure 62:
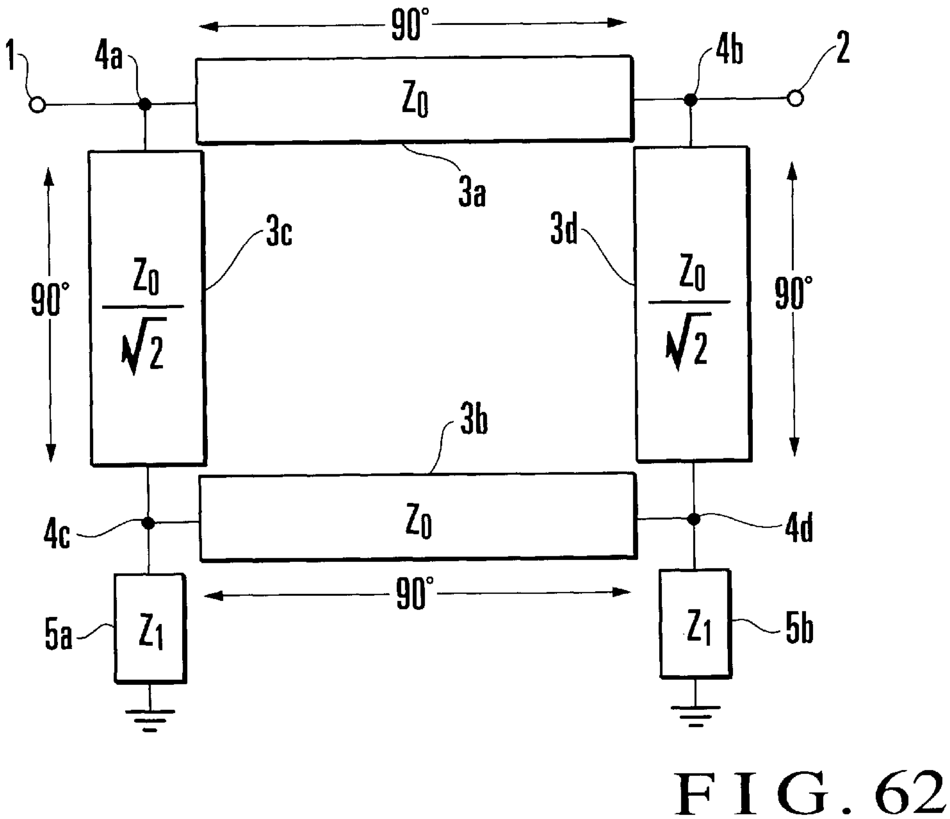
FIG. 62 is a circuit diagram showing a conventional phase shifter and attenuator.
Figure 63:
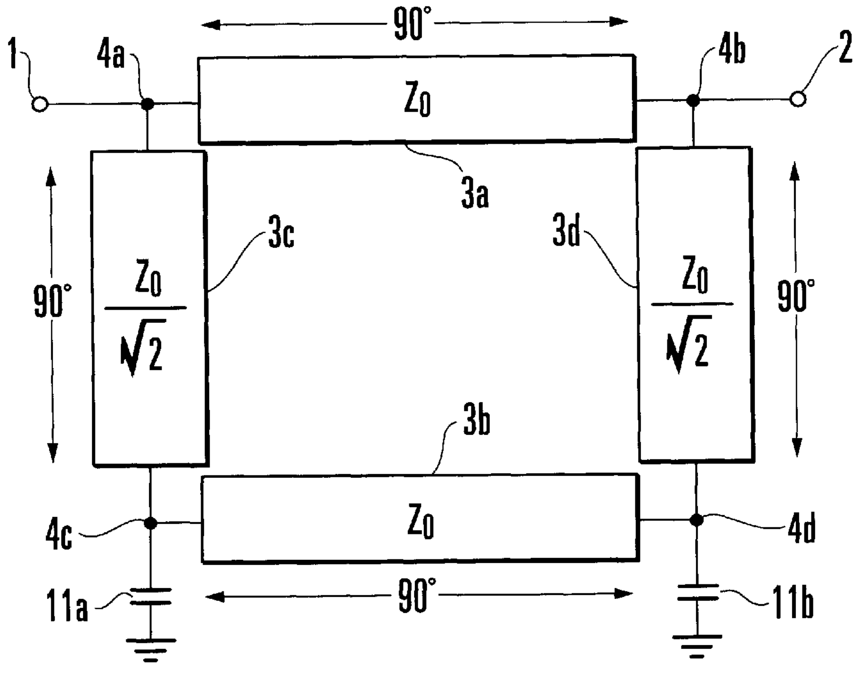
FIG. 63 is a circuit diagram showing a practical example of the conventional phase shifter shown in FIG. 62.

The conventional phase shifter shown in FIG. 62 requires four high-frequency transmission lines 3*a* to 3*d* in order to form a 90° branch line hybrid. In contrast, the phase shifter according to the present invention shown in FIG. 2 can be formed by the two similar high-frequency transmission lines 113*a* and 113*b*. Since the number of necessary high-frequency transmission lines is half that of the conventional phase shifter, a small phase shifter of a size ¼ the conventional size is implemented. This phase shifter can be further miniaturized by the use of the various configurations shown in FIGS. 3 to 7 as the high-frequency phase shifting elements 103*a* and 103*b*.

Figure 64:
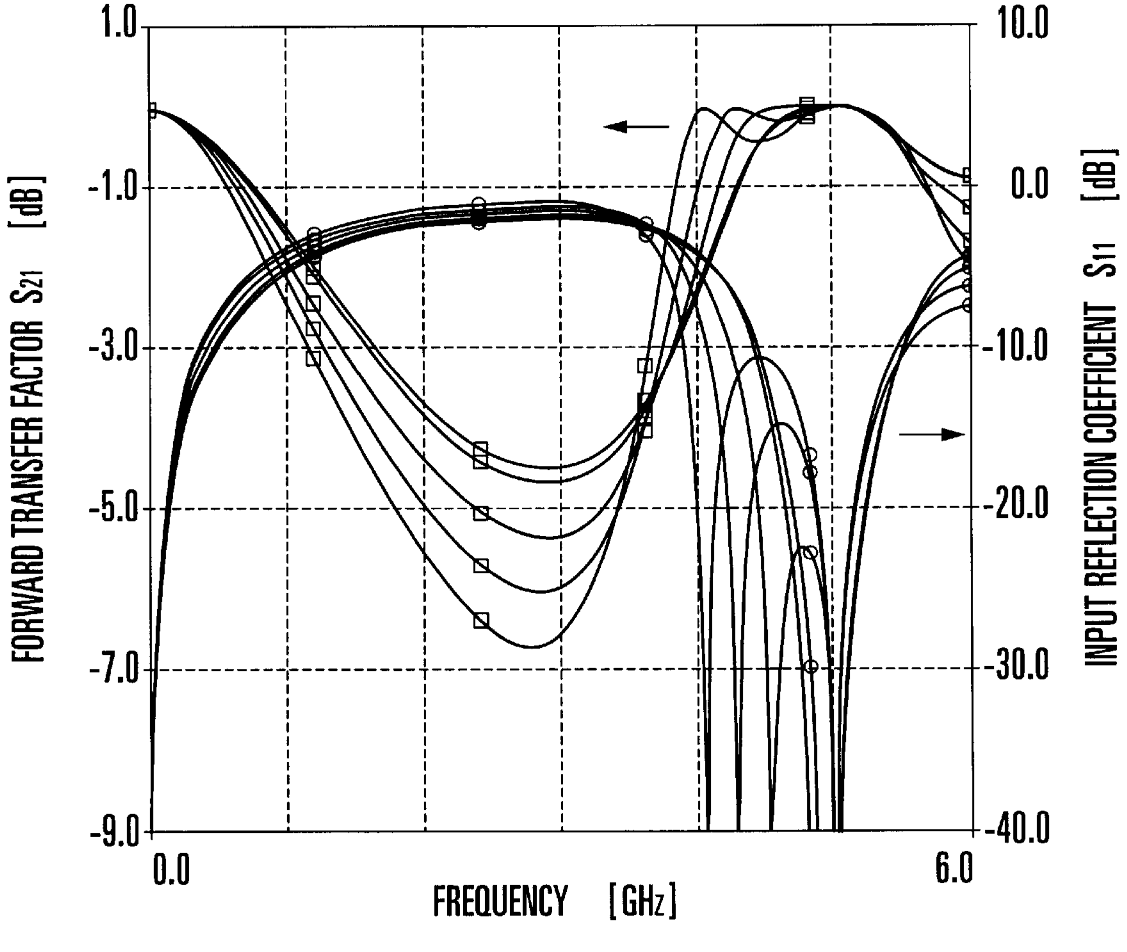
FIG. 64 is a graph showing the amplitude characteristics of the conventional phase shifter shown in FIG. 63.
Figure 65:
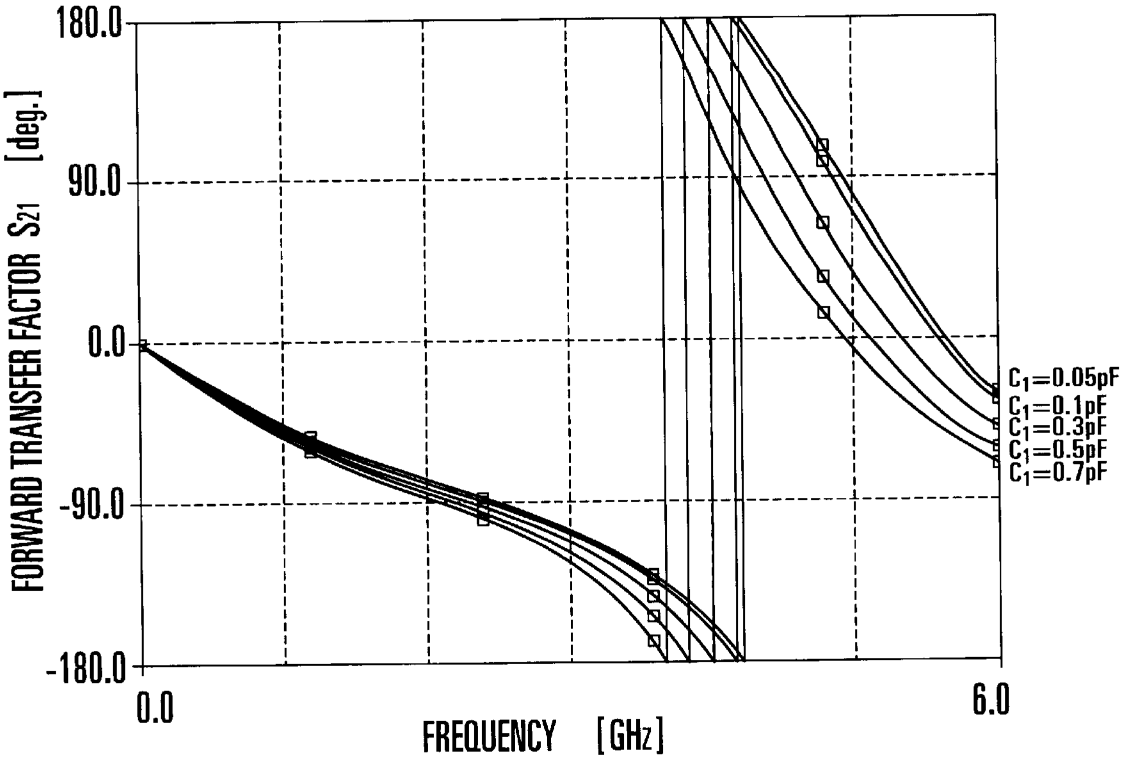
FIG. 65 is a graph showing the phase characteristics of the conventional phase shifter shown in FIG. 63.
Figure 66:
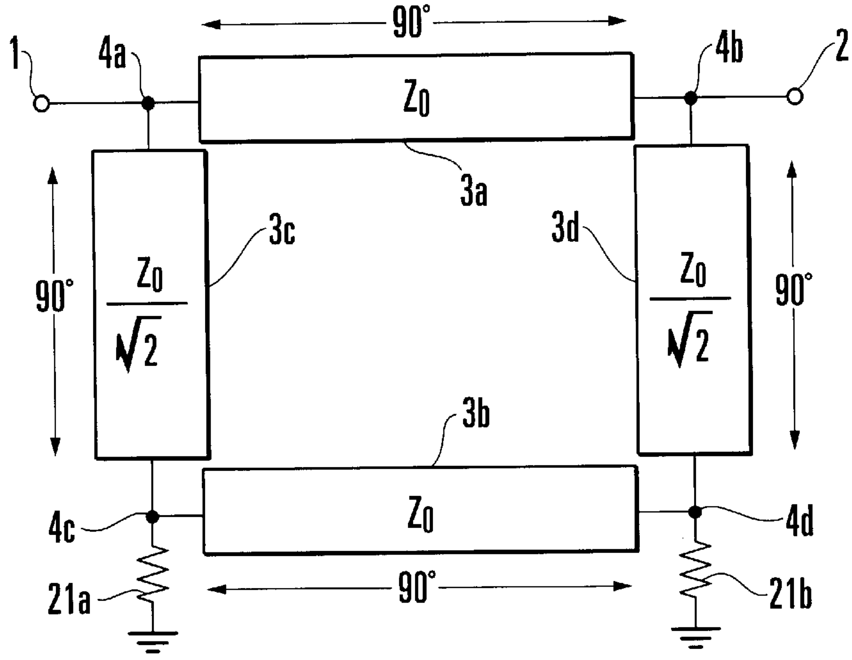
FIG. 66 is a circuit diagram showing a practical example of the conventional attenuator shown in FIG. 62.
Figure 67:
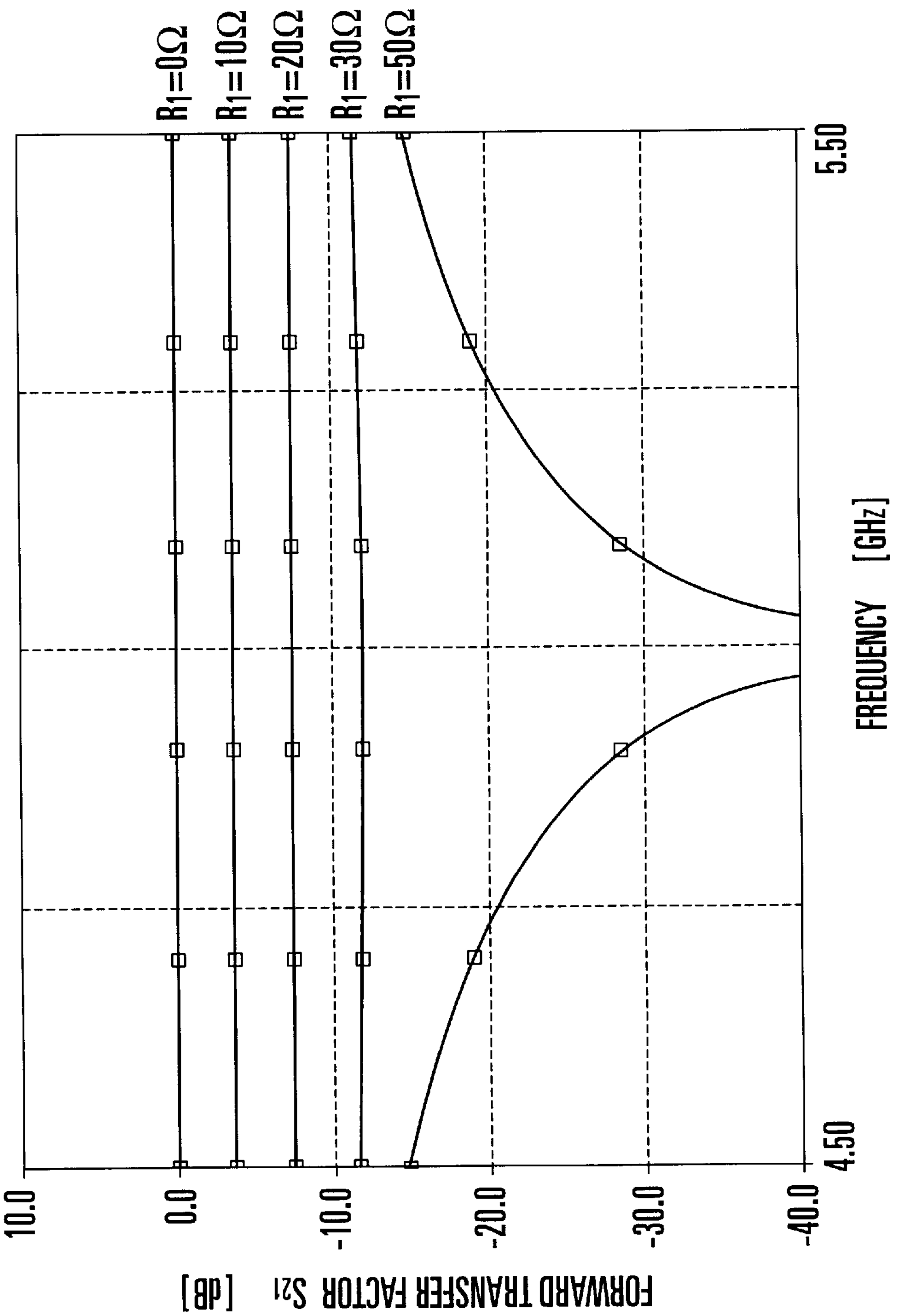
FIG. 67 is a graph showing an example of the forward transfer characteristics of the conventional attenuator shown in FIG. 66.
Figure 68:
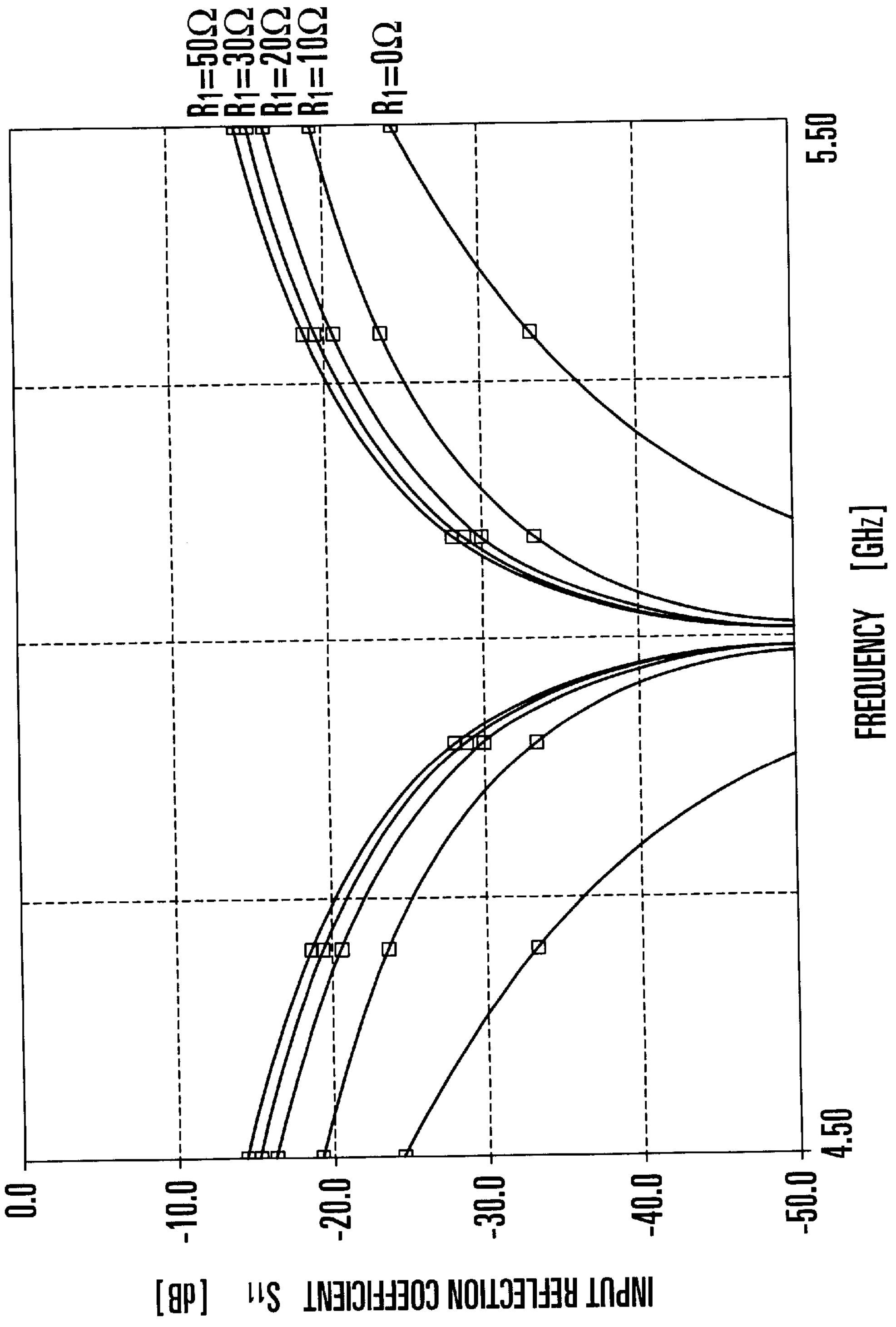
FIG. 68 is a graph showing an example of the input reflection characteristics of the conventional attenuator shown in FIG. 66.
Figure 69:
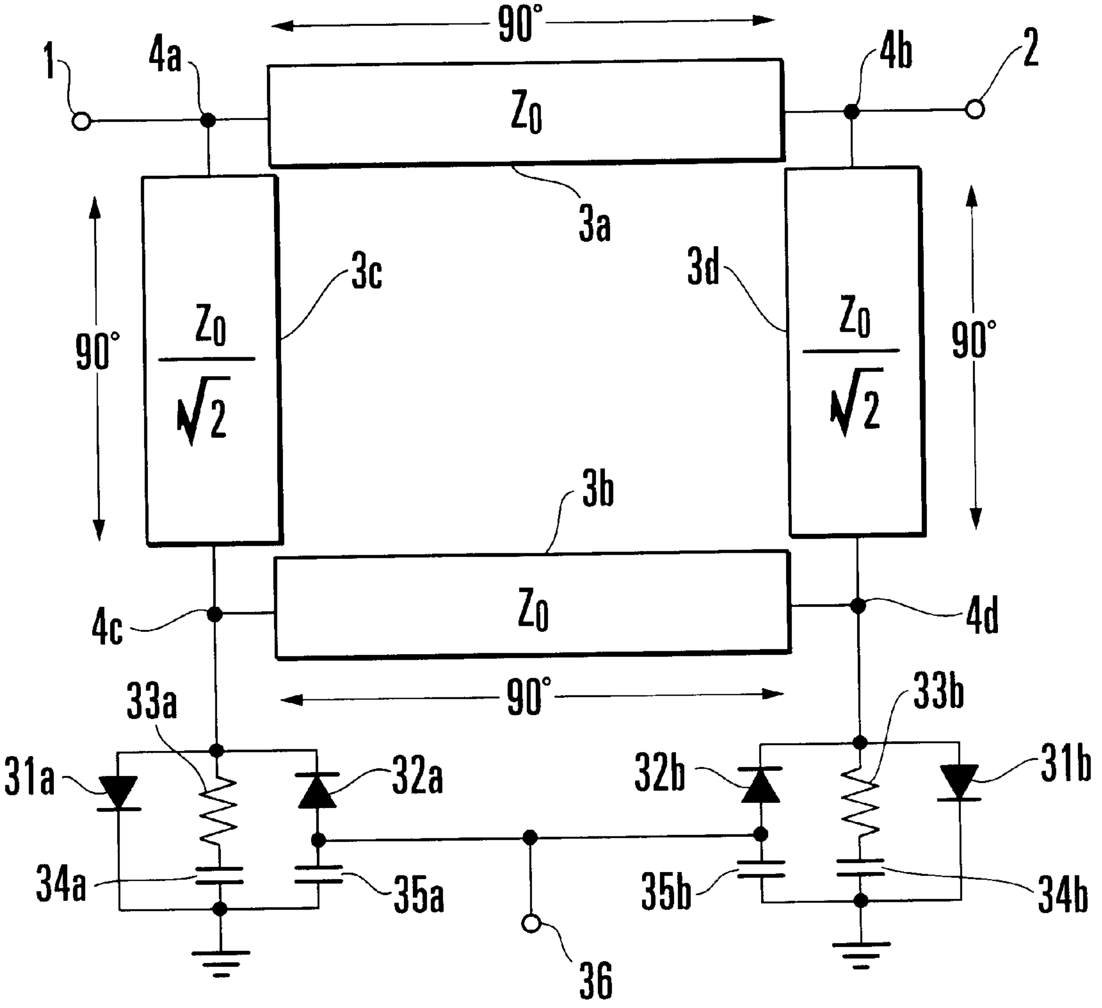
FIG. 69 is a circuit diagram showing a conventional nonlinear signal generator.

Also, the present invention can achieve a wide band. The tolerance of an input reflection amount of a phase shifter is −10 dB or less. In applications requiring high gain, this input reflection amount is desirably −20 dB or less. As shown in FIG. 64, in the case of the conventional phase shifter shown in FIG. 62, a band in which the input reflection amount is −10 dB or less is a frequency f=4.5 to 5.4 GHz, and a band in which the input reflection amount is −20 dB or less is a frequency f=4.9 to 5.1 GHz. By contrast, as shown in FIG. 11, in the case of the phase shifter according to the present invention shown in FIG. 2, a band in which the input reflection amount is −10 dB or less is a frequency f=1.6 to 6.0 GHz, and a band in which the input reflection amount is −20 dB or less is a frequency f=4.6 to 5.4 GHz. That is, the phase shifter shown in FIG. 2 have broader bands. Wide bands can also be achieved even when the various configurations shown in FIGS. 3 to 7 are used as the high-frequency phase shifting elements 103*a* and 103*b*.

Second Embodiment: Attenuator

Figure 54:
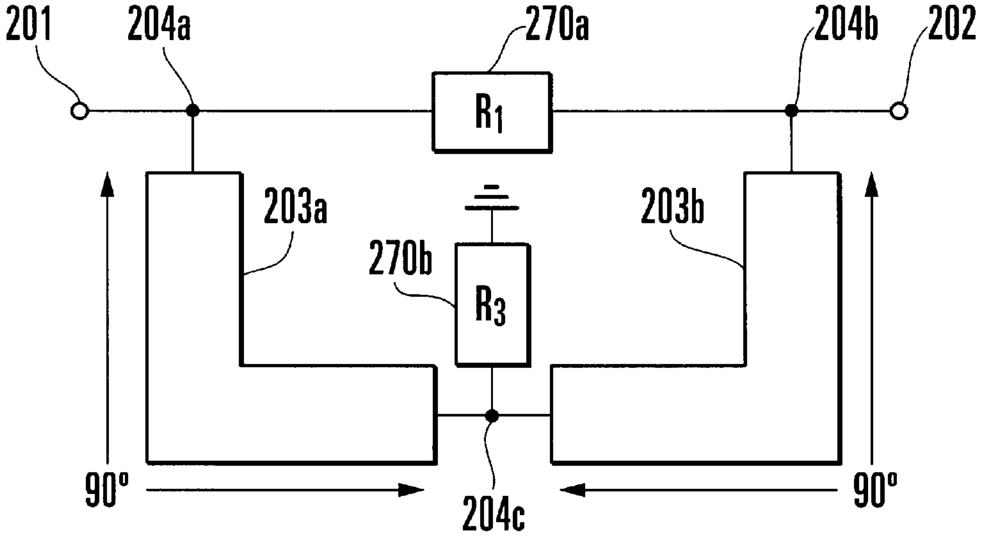
FIG. 54 is a circuit diagram showing the arrangement of an attenuator according to the present invention.

FIG. 54 shows the arrangement of an attenuator according to the present invention.

A variable resistance element (first high-frequency impedance element) 270*a* is connected between an input port 201 and an output port 202. The impedance of this variable resistance element 270*a* is substantially constituted by a resistance. Let $R_1$ be this resistance. This resistance $R_1$ is variable. Also, let $Z_0$ be the input impedance of the input port 201 and the output impedance of the output port 202.

The input port 201 is connected to one terminal (I/O terminal 204*a*) of a first high-frequency phase shifting element 203*a*. The output port 202 is connected to one terminal (I/o terminal 204*b*) of a second high-frequency phase shifting element 203*b*. The other terminal of the high-frequency phase shifting element 203*a* is connected to that of the high-frequency phase shifting element 203*b* (I/O terminal 204*c*). Both the high-frequency phase shifting elements 203*a* and 203*b* have a phase change amount of 90° at a frequency $f_0$ and have an impedance converting function. Let $Z_2$ be an equivalent characteristic impedance when the high-frequency phase shifting elements 203*a* and 203*b* are replaced by high-frequency transmission lines.

The I/O terminal 204*c* of the high-frequency phase shifting elements is connected to one terminal of a variable resistance element (second high-frequency impedance element) 270*b*. The other terminal of this variable resistance element 270*b* is grounded. The impedance of this resistance element 270*b* is substantially constituted by a resistance. Let $R_3$ be this resistance. This resistance $R_3$ is variable.

The impedance converting function of the high-frequency phase shifting elements 203*a* and 203*b* is to convert the impedance of the variable resistance element 270*b* and combine this converted impedance of the variable resistance element 270*b* with the impedance of the variable resistance element 270*a* such that the input and output reflection coefficients viewed from the I/O terminals 204*a* and 204*b* of the high-frequency phase shifting elements are approximately zero, i.e., such that the input and output impedances are matched.

The operation of the attenuator shown in FIG. 54 will be described below.

An input signal from the input port 201 is distributed to a first path passing through the variable resistance element 270*a* and a second path passing through the high-frequency phase shifting element 203*a*, the variable resistance element 270*b*, and the high-frequency phase shifting element 203*b*. If the frequency of the input signal is $f_0$, a signal passing through the second path is given 90° phase changes by the high-frequency phase shifting elements 203*a* and 203*b*.

In these paths, the signal power is partially absorbed by the resistances $R_1$ and $R_3$ of the variable resistance elements 270*a* and 270*b*. Signals not absorbed in these paths are synthesized by the I/O terminal 204*b* of the high-frequency phase shifting element and output from the output port 202.

By simultaneously and continuously changing the resistances $R_1$ and $R_3$ of the variable resistance elements 270*a* and 270*b*, an attenuation amount of the attenuator shown in FIG. 54 can be continuously changed.

An input reflection coefficient $S_{11}$ and an output reflection coefficient $S_{22}$ of the attenuator shown in FIG. 54 can be expressed by $$S_{11}=S_{22}=\frac{\frac{Z_2^2}{4Z_0^2}R_1-R_3}{\frac{Z_2^2}{4Z_0^2}R_1+R_3+\frac{R_1R_3+Z_2^2}{2Z_0}} \tag{17}$$

Therefore, when the resistance $R_3$ is set by a relation $$R_3=\frac{Z_2^2}{4Z_0^2}R_1 \tag{18}$$

the input and output reflection coefficients $S_{11}$ and $S_{22}$ at the frequency $f_0$ become zero, so the input and output impedances at the frequency $f_0$ can be matched. Note that when an attenuator is actually formed, the input and output reflection coefficients $S_{11}$ and $S_{22}$ at the frequency $f_0$ need not be strictly zero; a satisfactory effect can be obtained if these reflection coefficients are approximately zero.

In this case, a forward transfer factor $S_{21}$ and a reverse transfer factor $S_{12}$ of the attenuator shown in FIG. 54 can be expressed by $$S_{21}=S_{12}=\frac{2Z_0-R_1}{2Z_0+R_1} \tag{19}$$

When the resistances $R_1$ and $R_3$ of the variable resistance elements 270*a* and 270*b* are changed while the relation of equation (18) is held, an attenuation amount L of this attenuator is given by $$L=20\log_{10}\left|\frac{2Z_0+R_1}{2Z_0-R_1}\right|[\text{dB}] \tag{20}$$

The high-frequency phase shifting elements 203*a* and 203*b* whose phase change amount at the frequency $f_0$ is 90° and having an impedance converting function are constructed by using, e.g., ① high-frequency transmission lines whose electrical length at the frequency $f_0$ is 90°, ② π circuits each composed of a high-frequency transmission line whose electrical length at the frequency $f_0$ is smaller than 90° and two capacitors each having one terminal connected to a corresponding one of the two terminals of the high-frequency transmission line and the other terminal grounded, and ③ a lumped constant circuit constituted by inductors and capacitors. When these configurations are employed, the attenuator can be miniaturized in the order of ①>②>③.

The matching conditions and the like of the attenuator using high-frequency phase shifting elements having these configurations can be easily derived by replacing the reactances $X_1$ and $X_3$, in the matching conditions and the like of the phase shifters shown in FIGS. 2 to 7, with the resistances $R_1$ and $R_3$, respectively.

① When high-frequency transmission lines 213*a* and 213*b* whose electrical length at the frequency $f_0$ is 90° are used as the high-frequency phase shifting elements 203*a* and 203*b*, respectively, having the impedance converting function (FIG. 55):

Letting $Z_2$ be the characteristic impedance of these high-frequency transmission lines 213*a* and 213*b*, the input and output impedances at the frequency $f_0$ can be matched by setting the resistances $R_1$ and $R_3$ of the variable resistance elements 271*a* and 271*b* to have the relationship as indicated by equation (18).

② When π circuits including high-frequency transmission lines 123*a* and 123*b* whose electrical length θ at the frequency $f_0$ is smaller than 90°, two capacitors 126*a* and 126*b* connected between the two terminals of the high-frequency transmission line 123*a* and ground, and two capacitors 126*c* and 126*d* connected between the two terminals of the high-frequency transmission line 123*b* and ground, are used as the high-frequency phase shifting elements 203*a* and 203*b* having the impedance converting function (FIGS. 3 and 54):

Let Z be the characteristic impedance of the high-frequency transmission lines 123*a* and 123*b*, and C be the capacitance of the capacitors 126*a* to 126*d*. This capacitance C is set to $$C=\frac{1}{2\pi f_0 Z\tan\theta} \tag{21}$$

In this case, the input and output impedances at the frequency $f_0$ can be matched by setting the resistance $R_3$ of the variable resistance element 270*b* by a relation $$R_3=\frac{(Z\sin\theta)^2}{4Z_0^2}R_1 \tag{22}$$

③-1 When T circuits including capacitors 136*a* and 136*b* each having one terminal grounded, two inductors 133*a* and 133*b* each having one terminal connected to the other terminal of the capacitor 136*a*, and two inductors 133*c* and 133*d* each having one terminal connected to the other terminal of the capacitor 136*b*, are used as the high-frequency phase shifting elements 203*a* and 203*b* having the impedance converting function (FIGS. 4 and 54):

Let L be the inductance of the inductors 133*a* to 133*d*, and C be the capacitance of the capacitors 136*a* and 136*b*. This capacitance C is set to $$C=\frac{1}{(2\pi f_0)^2 L} \tag{23}$$

In this case, the input and output impedances at the frequency $f_0$ can be matched by setting the resistance $R_3$ of the variable resistance element 270*b* by a relation $$R_3=\frac{(2\pi f_0 L)^2}{4Z_0^2}R_1 \tag{24}$$

③-2 When circuits including inductors 143*a* and 143*b*, two capacitors 146*a* and 146*b* connected between the two terminals of the inductor 143*a* and ground, and two capacitors 146*c* and 146*d* connected between the two terminals of the inductor 143*b* and ground, are used as the high-frequency phase shifting elements 203*a* and 203*b* having the impedance converting function (FIGS. 5 and 54):

Let L be the inductance of the inductors 143*a* and 143*b*, and C be the capacitance of the capacitors 146*a* to 146*d*. This capacitance C is set as equation (23). In this case, the input and output impedances at the frequency $f_0$ can be matched by setting the resistances $R_1$ and $R_3$ of the variable resistance elements 270*a* and 270*b* to have the relationship as indicated by equation (24).

③-3 When T circuits including inductors 153*a* and 153*b* each having one terminal grounded, two capacitors 156*a* and 156*b* each having one terminal connected to the other terminal of the inductor 153*a,* and two capacitors 156*c* and 156*d* each having one terminal connected to the other terminal of the inductor 153*b,* are used as the high-frequency phase shifting elements 203*a* and 203*b* having the impedance converting function (FIGS. 6 and 54):

Let L be the inductance of the inductors 153a and 153*b,* and C be the capacitance of the capacitors 156*a* to 156*d.* This capacitance C is set as equation (23). In this case, the input and output impedances at the frequency $f_0$ can be matched by setting the resistances $R_1$ and $R_3$ of the variable resistance elements 270*a* and 270*b* to have the relationship as indicated by equation (24).

③-4 When π circuits including capacitors 166*a* and 166*b,* two inductors 163*a* and 163*b* connected between the two terminals of the capacitor 166*a* and ground, and two inductors 163*c* and 163*d* connected between the two terminals of the capacitor 166*b* and ground, are used as the high-frequency phase shifting elements 203*a* and 203*b* having the impedance converting function (FIGS. 7 and 54):

Let L be the inductance of the inductors 163*a* to 163*d,* and C be the capacitance of the capacitors 166*a* and 166*b.* This capacitance C is set as equation (23). In this case, the input and output impedances at the frequency $f_0$ can be matched by setting the resistances $R_1$ and $R_3$ of the variable resistance elements 270*a* and 270*b* to have the relationship as indicated by equation (24).

[Practical Example of Attenuator and its Characteristics]

A practical example of the attenuator shown in FIG. 54 and the simulation results of the amplitude characteristics and phase characteristics of the practical example will be described below.

Figure 55:
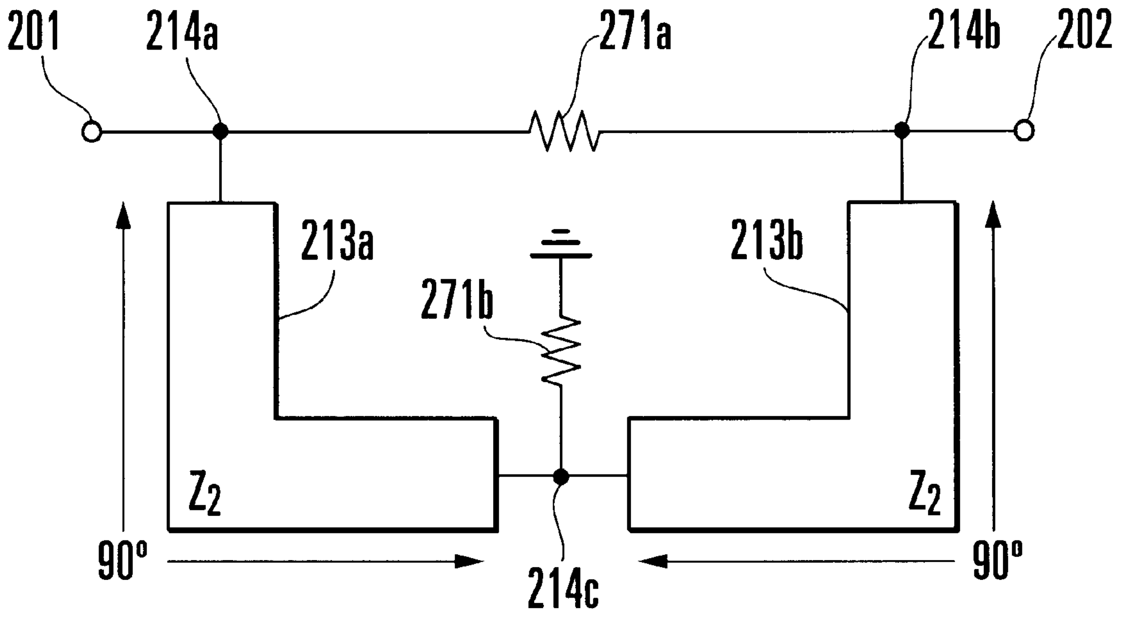
FIG. 55 is a circuit diagram showing a practical example of the attenuator shown in FIG. 54.

FIG. 55 shows this practical example of the attenuator shown in FIG. 54. The same reference numerals as in FIG. 54 denote the same parts in FIG. 55, and a detailed description thereof will be omitted.

In this attenuator shown in FIG. 55, variable resistance elements 271*a* and 271*b* are used as the variable resistance elements 270*a* and 270*b,* respectively. Also, high-frequency transmission lines 213*a* and 213*b* whose electrical length at the frequency $f_0$=5 GHz is 90° are used as the high-frequency phase shifting elements 203*a* and 203*b,* respectively, having the impedance converting function. Assuming that these high-frequency transmission lines 213*a* and 213*b* are lossless, the I/O impedance $Z_0$=50Ω. Note that I/O terminals 214*a,* 214*b,* and 214*c* of the high-frequency transmission lines correspond to the I/O terminals 204*a,* 204*b,* and 204*c,* respectively, of the high-frequency phase shifting elements.

Figure 56:
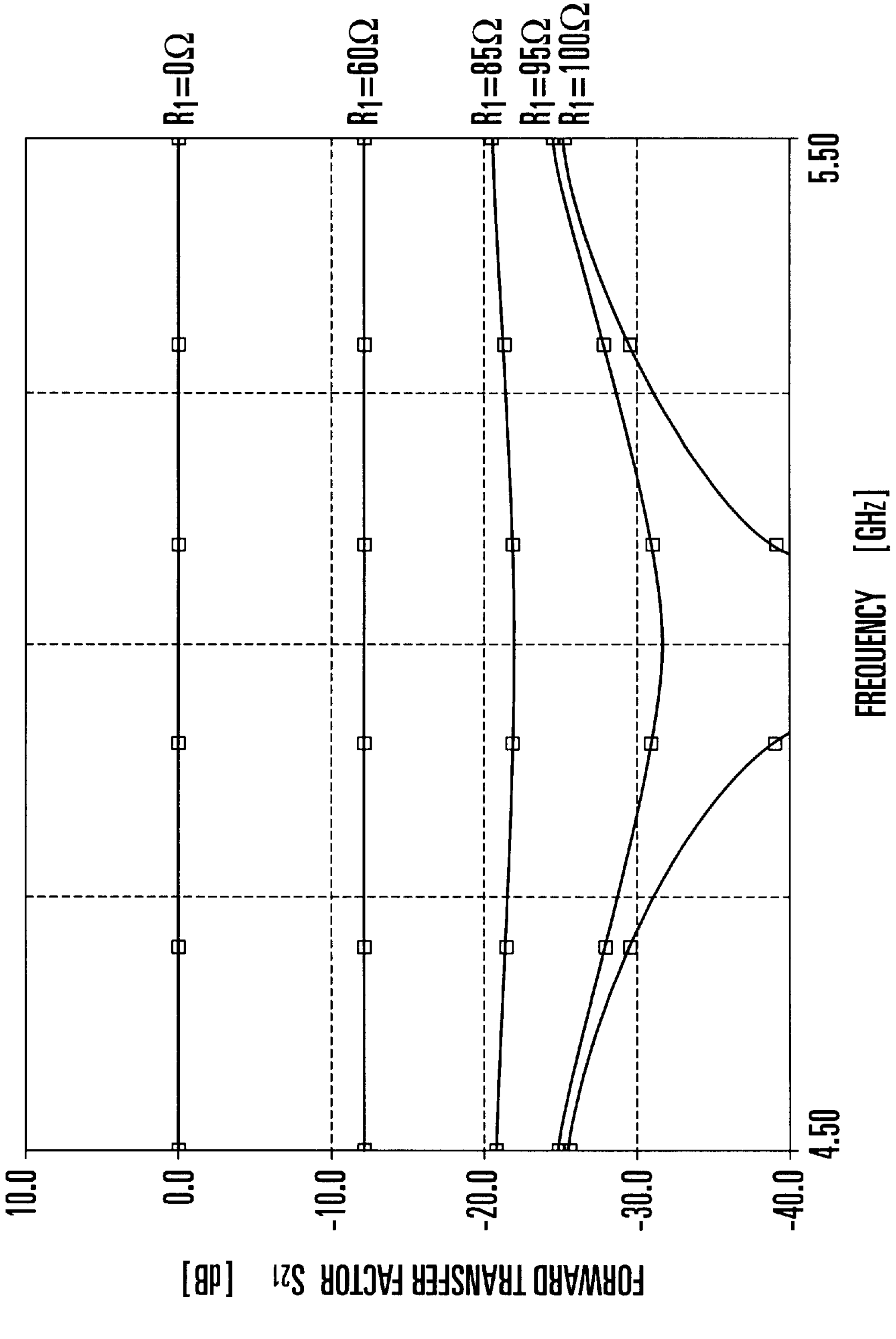
FIG. 56 is a graph showing an example of the forward transfer. characteristics of the attenuator shown in FIG. 55.
Figure 57:
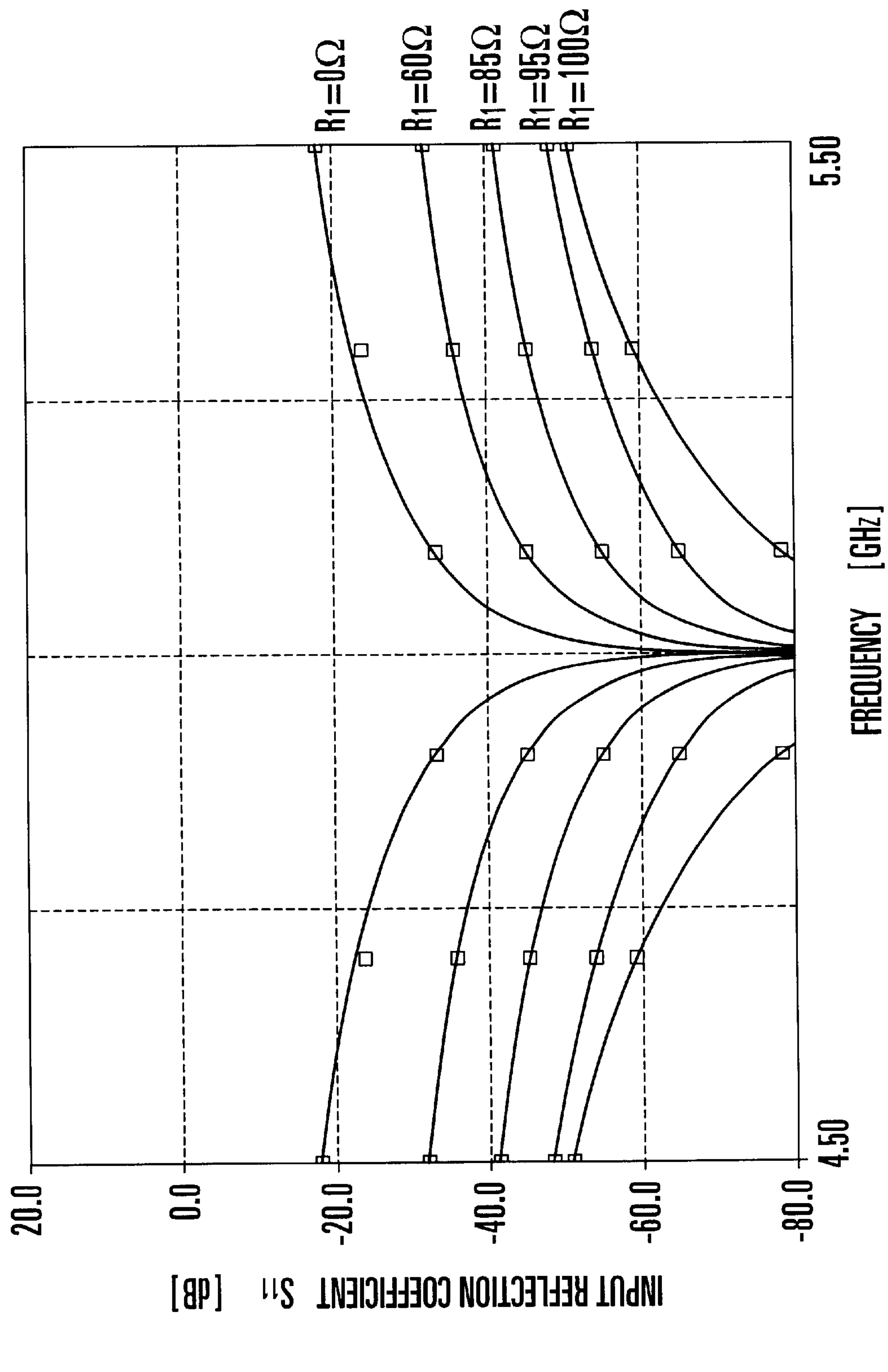
FIG. 57 is a graph showing an example of the input reflection characteristics of the attenuator shown in FIG. 55.

FIG. 56 shows the simulation results of the forward transfer factor $S_{21}$ when the characteristic impedance $Z_2$ of the high-frequency transmission lines 213*a* and 213*b* is $Z_2$=70.7Ω. The abscissa indicates the frequency [GHz], and the ordinate indicates the forward transfer factor $S_{21}$ [dB]. FIG. 57 shows the simulation results of the input reflection coefficient $S_{11}$ when the characteristic impedance $Z_2$ of the high-frequency transmission lines 213*a* and 213*b* is $Z_2$=70.7Ω. The abscissa indicates the frequency [GHz], and the ordinate indicates the input reflection coefficient $S_{21}$ [dB].

Referring to FIGS. 56 and 57, from equation (18), the resistance $R_3$ of the variable resistor 271*b* is set to be ½ the resistance $R_1$ of the variable resistor 271*a,* and this resistance $R_1$ of the variable resistor 271*a* is changed 0, 60, 85, 95, and 100Ω. As shown in FIGS. 56 and 57, at a frequency f=4.5 to 5.5 GHz, an attenuation amount is 24 dB or more (FIG. 56), and an input reflection amount is −18 dB or less (FIG. 57).

Figure 58:
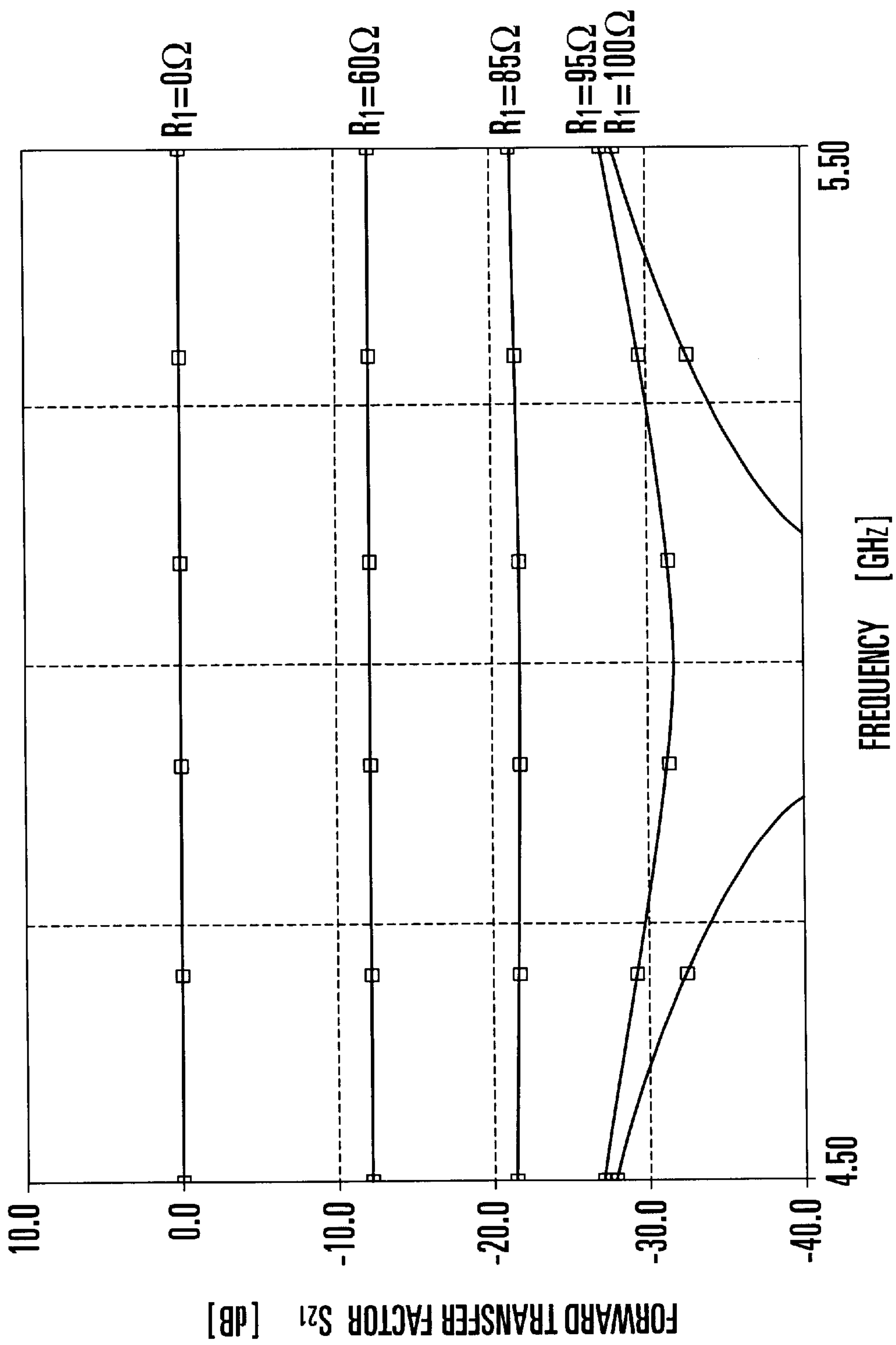
FIG. 58 is a graph showing another example of the forward transfer characteristics of the attenuator shown in FIG. 55.
Figure 59:
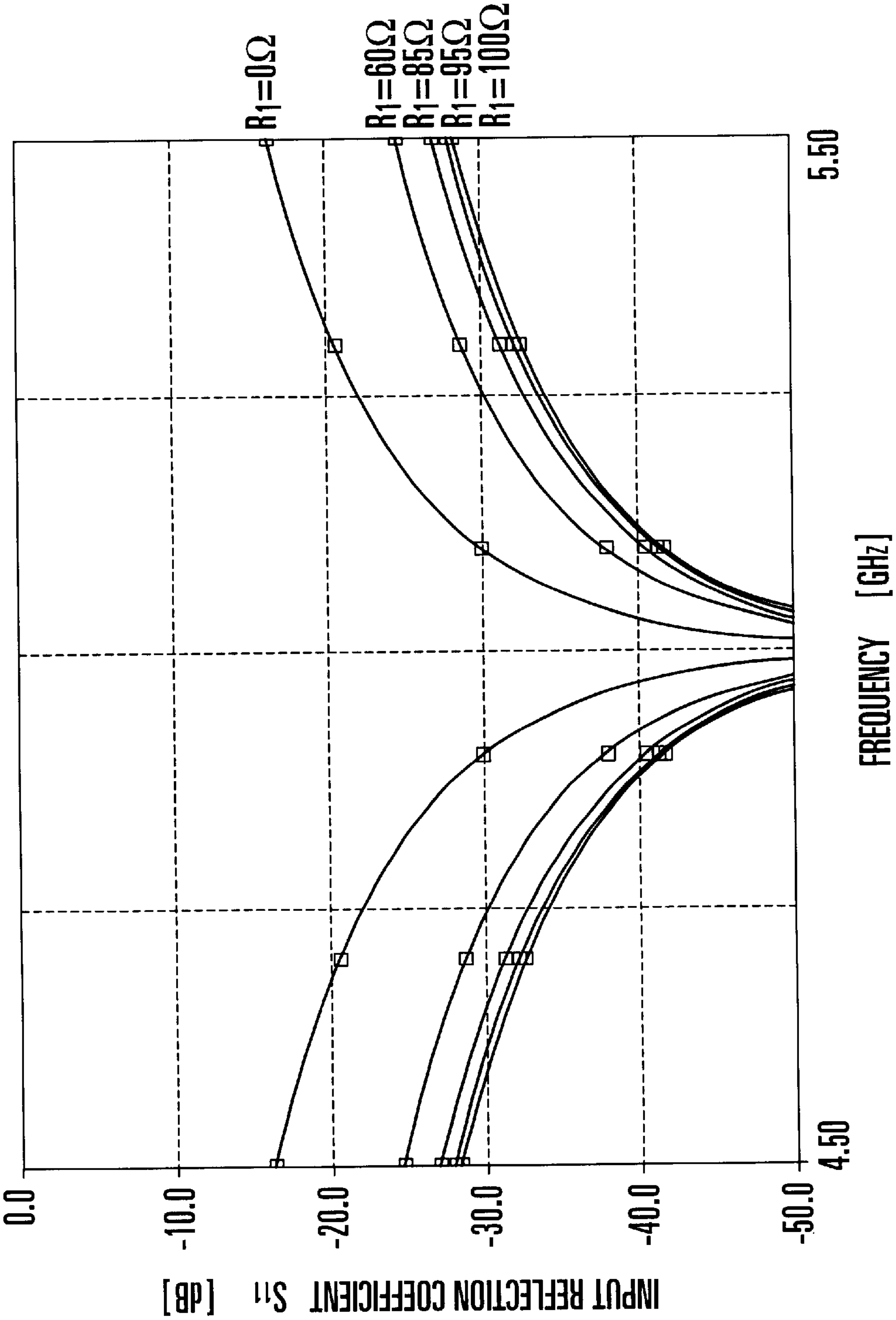
FIG. 59 is a graph showing another example of the input reflection characteristics of the attenuator shown in FIG. 55.

Analogously, FIG. 58 shows the simulation results of the forward. transfer factor $S_{21}$ when the characteristic impedance $Z_2$ of the high-frequency transmission lines 213*a* and 213*b* is $Z_2$=50Ω. The abscissa indicates the frequency [GHz], and the ordinate indicates the forward transfer factor $S_{21}$ [dB]. FIG. 59 shows the simulation results of the input reflection coefficient $S_{11}$ when the characteristic impedance $Z_2$ of the high-frequency transmission lines 213*a* and 213*b* is $Z_2$=50Ω. The abscissa indicates the frequency [GHz], and the ordinate indicates the input reflection coefficient $S_{21}$ [dB].

Referring to FIGS. 58 and 59, from equation (18), the resistance $R_3$ of the variable resistor 271*b* is set to be ¼ the resistance $R_1$ of the variable resistor 271*a,* and this resistance $R_1$ of the variable resistor 271*a* is changed 0, 60, 85, 95, and 100Ω. As shown in FIGS. 58 and 59, at a frequency f=4.5 to 5.5 GHz, an attenuation amount is 28 dB or more (FIG. 58), and an input reflection amount is −16 dB or less (FIG. 59).

Similar to the phase shifter, the attenuator according to the present invention described above is suitably formed by an MMIC.

Third Embodiment: Nonlinear Signal Generator

Figure 60:
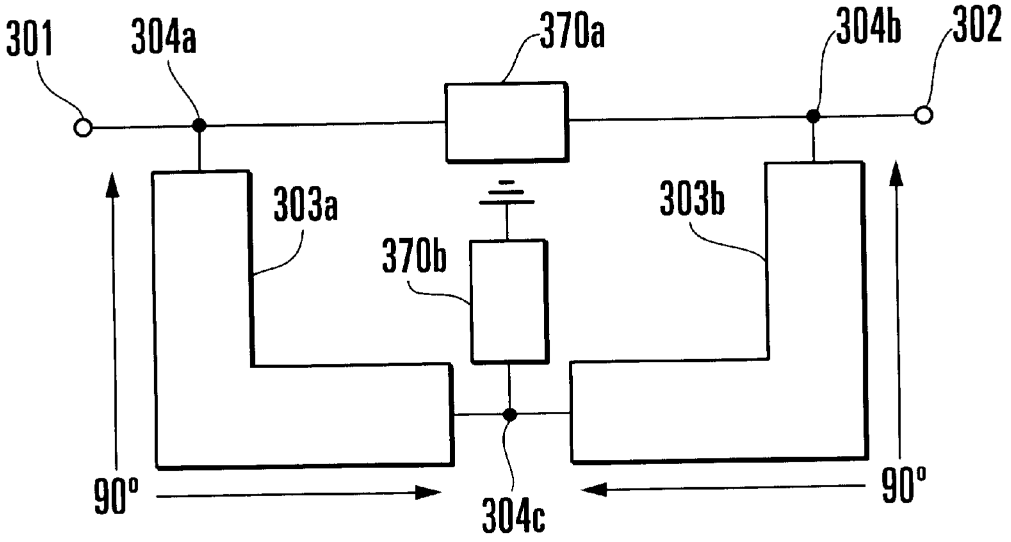
FIG. 60 is a circuit diagram showing the arrangement of a nonlinear signal generator according to the present invention.

FIG. 60 shows the arrangement of a nonlinear signal generator according to the present invention.

A first nonlinear element 370*a* is connected between an input port 301 and an output port 302. This nonlinear element 370*a* generates a nonlinear signal in accordance with input signal power. Let $Z_1$ be the impedance of this nonlinear element 370*a* during small-signal operation, and $R_1$ be the resistance component of this impedance $Z_1$. Also, let $Z_0$ be the input impedance of the input port 301 and the output impedance of the output port 302.

The input port 301 is connected to one terminal (I/O terminal 304*a*) of a first high-frequency phase shifting element 303*a.* The output port 302 is connected to one terminal (I/O terminal 304*b*) of a second high-frequency phase shifting element 303*b.* The other terminal of the high-frequency phase shifting element 303*a* is connected to that of the high-frequency phase shifting element 303*b* (I/O terminal 304*c*). Both the high-frequency phase shifting elements 303*a* and 303*b* have a phase change amount of 90° at a frequency $f_0$ and have an impedance converting function. Let $Z_2$ be an equivalent characteristic impedance when the high-frequency phase shifting elements 303*a* and 303*b* are replaced by high-frequency transmission lines.

The I/O terminal 304*c* of the high-frequency phase shifting elements is connected to one terminal of a second high-frequency impedance element 370*b.* The other terminal of this nonlinear element 370*b* is grounded. The nonlinear element 370*b* generates a nonlinear signal, similar to that generated by the nonlinear element 370*a,* in accordance with input signal power. Let $Z_3$ be the impedance of this nonlinear element 370*b* during small-signal operation, and $R_3$ be the resistance of this impedance $Z_3$.

The impedance converting function of the high-frequency phase shifting elements 303*a* and 303*b* is to convert the impedance of the nonlinear element 370*b* and combine this converted impedance of the nonlinear element 370*b* with the impedance of the nonlinear element 370*a* such that the input and output reflection coefficients viewed from the I/O terminals 304*a* and 304*b* of the high-frequency phase shifting elements are approximately zero, i.e., such that the input and output impedances are matched.

An input reflection coefficient $S_{11}$ and an output reflection coefficient $S_{22}$ of the nonlinear signal generator shown in FIG. 60 can be expressed by $$S_{11} = S_{22} = \frac{\frac{Z_2^2}{4Z_0^2}R_1 - R_3}{\frac{Z_2^2}{4Z_0^2}R_1 + R_3 + \frac{R_1R_3 + Z_2^2}{2Z_0}} \tag{25}$$

Therefore, when the resistance $R_3$ is set by a relation $$R_3 = \frac{Z_2^2}{4Z_0^2}R_1 \tag{26}$$

the input and output reflection coefficients $S_{11}$ and $S_{22}$ at the frequency $f_0$ become zero, so the input and output impedances at the frequency $f_0$ can be matched.

In this case, a forward transfer factor $S_{21}$ and a reverse transfer factor $S_{12}$ of the nonlinear signal generator shown in FIG. 60 can be expressed by $$S_{21} = S_{12} = \frac{2Z_0 - R_1}{2Z_0 + R_1} \tag{27}$$

Hence, when the resistance $R_1$ is set by a relation $$R_1 = 2Z_0 \tag{28}$$

the forward transfer factor $S_{21}$ and the reverse transfer factor $S_{12}$ at the frequency $f_0$ become zero. The input and output reflection coefficients $S_{11}$ and $S_{22}=0$ and the forward and reverse transfer factors $S_{21}$ and $S_{12}=0$ mean that a linear signal component of the input signal is completely absorbed. Accordingly, the nonlinear signal generator does hot output any linear signal component. Note that when a nonlinear signal generator is actually formed, the input and output reflection coefficients $S_{11}$ and $S_{22}$ and the forward and reverse transfer factors $S_{21}$ and $S_{12}$ at the frequency $f_0$ need not be strictly zero; a satisfactory effect can be obtained if they are approximately zero.

The operation of the nonlinear signal generator shown in FIG. 60 will be described below.

An input signal from the input port 301 is distributed to a first path passing through the nonlinear element 370*a* and a second path passing through the high-frequency phase shifting element 303*a*, the nonlinear element 370*b*, and the high-frequency phase shifting element 303*b*. In these paths, a linear signal component of the input signal is absorbed by the resistance components $R_1$ and $R_3$ of the impedances $Z_1$ and $Z_3$ of the nonlinear elements 370*a* and 370*b*. The nonlinear elements 370*a* and 370*b* generate identical nonlinear signals in accordance with the power of the input signal.

When the resistances $R_1$ and $R_3$ are set to have the relationships indicated by equations (26) and (28), the linear signal component of the input signal is completely absorbed. Consequently, only the nonlinear signals generated by the nonlinear elements 370*a* and 370*b* are synthesized by the I/O terminal 304*b* and output from the output port 302.

The high-frequency phase shifting elements 303*a* and 303*b* whose phase change amount at the frequency $f_0$ is 90° and having an impedance converting function are constructed by using, e.g., ① high-frequency transmission lines whose electrical length at the frequency $f_0$ is 90°, ② π circuits each composed of a high-frequency transmission line whose electrical length at the frequency $f_0$ is smaller than 90° and two capacitors each having one terminal connected to a corresponding one of the two terminals of the high-frequency transmission line and the other terminal grounded, and ③ a lumped constant circuit constituted by inductors and capacitors. When these configurations are employed, the nonlinear signal generator can be miniaturized in the order of ①>②>③.

The matching conditions and the like of the nonlinear signal generator using high-frequency phase shifting elements having these configurations can be easily derived by replacing the reactances $X_1$ and $X_3$, in the matching conditions and the like of the phase shifters shown in FIGS. 2 to 7, with the resistances $R_1$ and $R_3$, respectively. The nonlinear signal generator matching conditions and the like thus derived are exactly the same as the matching conditions and the like of the attenuator described previously.

Figure 61:
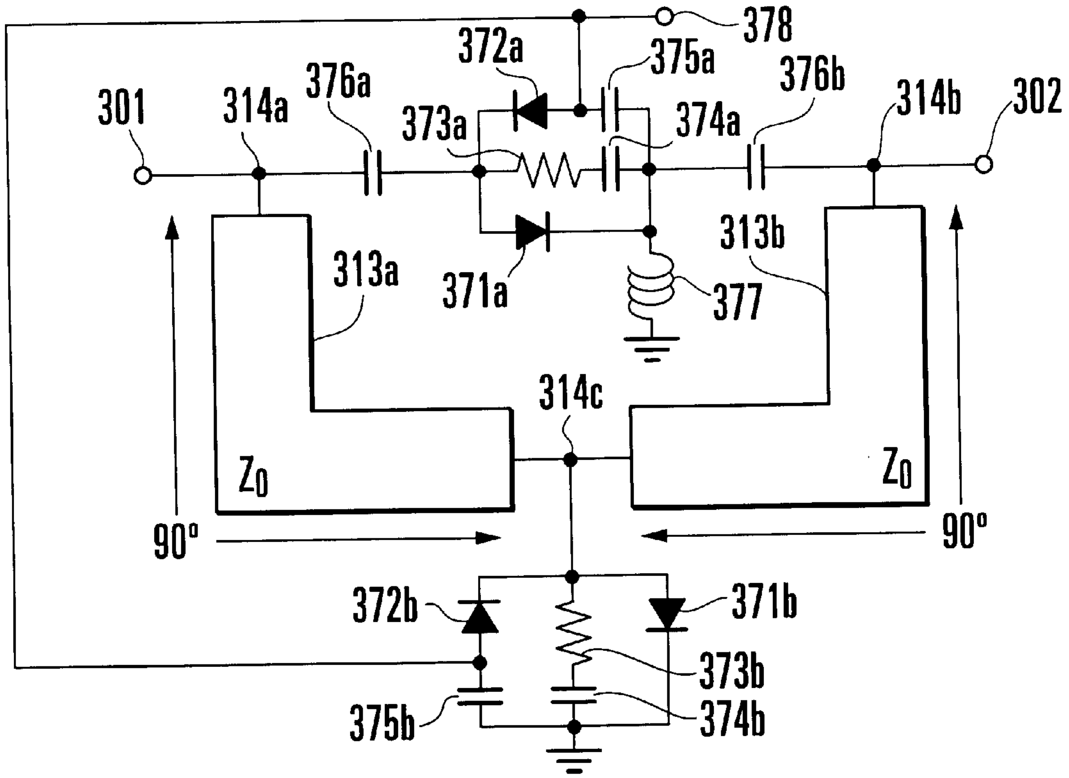
FIG. 61 is a circuit diagram showing one practical configuration of the nonlinear signal generator shown in FIG. 60.

FIG. 61 shows one practical arrangement of the nonlinear signal generator shown in FIG. 60. The same reference numerals as in FIG. 60 denote the same parts in FIG. 61, and a detailed description thereof will be omitted.

In this nonlinear signal generator shown in FIG. 61, high-frequency transmission lines 313*a* and 313*b* are used as the high-frequency phase shifting elements 303*a* and 303*b*, respectively, having the impedance converting function. I/O terminals 314*a*, 314*b*, and 314*c* of these high-frequency transmission lines correspond to the I/O terminals 304*a*, 304*b*, and 304*c*, respectively, of the high-frequency phase shifting elements.

A nonlinear element composed of diodes 371*a* and 372*a*, a terminating resistor 373*a*, DC blocking capacitors 374*a*, 375*a*, 376*a*, and 376*b*, a high-frequency blocking inductor 377, and a bias terminal 378 is connected, as the first nonlinear element 370*a*, between the I/O terminals 314*a* and 314*b* of the high-frequency transmission lines. More specifically, the two diodes 371*a* and 372*a* are connected in parallel to have opposite polarities, and the terminating resistor 373*a* is connected in parallel with these diodes 371*a* and 372*a*. The bias terminal 378 for supplying a bias current is connected to the anode of the diode 372*a*, and the high-frequency blocking inductor 377 is connected between the cathode of the diode 371*a* and ground. The DC blocking capacitors 374*a*, 375*a*, 376*a*, and 376*b* are connected such that the bias current flows through the diodes 371*a* and 372*a* and the high-frequency blocking inductor 377. In this configuration, the diodes 371*a* and 372*a* and the terminating resistor 373*a* are connected in a high-frequency manner to the I/O terminals 314*a* and 314*b* of the high-frequency transmission lines by the DC blocking capacitors 374*a*, 375*a*, 376*a*, and 376*b*.

Also, a nonlinear element composed of diodes 371*b* and 372*b*, a terminating resistor 373*b*, and DC blocking capacitors 374*b* and 375*b* is connected, as the second nonlinear element 370*b*, to the I/O terminal 314*c* of the high-frequency transmission lines. More specifically, the two diodes 371*b* and 372*b* are connected in parallel to have opposite polarities, and the terminating resistor 373*b* is connected in parallel with these diodes 371*b* and 372*b*. The anode of the diode 371*b*, the cathode of the diode 372*b*, and one terminal of the terminating resistor 373*b* are connected to the I/O terminal 314*c*. The anode of the diode 372*b* and the other terminal of the terminating resistor 373*b* are grounded in a high-frequency manner by the DC blocking capacitors 375*b* and 374*b*, respectively. The cathode of the diode 371*b* is directly grounded. The bias terminal 378 is connected to the connecting portion between the diode 372*b* and the capacitor 375*b*. In this way, this nonlinear element is so constructed that the bias current from the bias terminal 378 flows through the diodes 371*b* and 372*b*.

Let $Z_0$ be the input impedance of the input port 301 and the output impedance of the output port 302, 90° be the electrical length at the frequency $f_0$ of the high-frequency transmission lines 313*a* and 313*b*, and $Z_0$ be the characteristic impedance $Z_2$ of the high-frequency transmission lines 313*a* and 313*b*. Also let $Z_1$ be the synthetic impedance of the diodes 371*a* and 372*a* and the terminating resistor 373*a*, $R_1$ be the resistance component of this synthetic impedance $Z_1$, $Z_3$ be the synthetic impedance of the diodes 371*b* and 372*b* and the terminating resistor 373*b*, and $R_3$ be the resistance component of this synthetic impedance $Z_3$.

The operation of the nonlinear signal generator shown in FIG. 61 will be described below.

An input signal from the input port 301 is distributed to the nonlinear element having the diodes 371*a* and 372*a* and the terminating resistor 373*a* and the nonlinear element having the diodes 371*b* and 372*b* and the terminating resistor 373*b*.

The bias current from the bias terminal 378 is appropriately set such that $R_1=2Z_0$ and $R_3=Z/2$. Accordingly, the relationships indicated by equations (26) and (28) are met, so the linear signal component (i.e., the fundamental wave) of the input signal is completely absorbed.

Meanwhile, the diodes 371*a*, 371*b*, 372*a*, and 372*b* generate nonlinear signals as harmonics of the input signal. The nonlinear signal generated by the diodes 371*a* and 372*a* and the nonlinear signal generated by the diodes 371*b* and 372*b* are synthesized by the I/O terminal 314*b* of the high-frequency transmission line and output from the output port 302. Accordingly, the linear signal component of the input signal is suppressed, and only the nonlinear signal is output from the output port 302.

Similar to the phase shifter, the nonlinear signal generator according to the present invention described above is suitably formed by an MMIC.

4. Others

All embodiments described above are merely examples of the present invention and do not limit the present invention, so the present invention can be practiced in the form of various modifications and changes. Accordingly, the scope of the present invention is defined only by the scope of claims and its equivalent scope.

Also, the phase shifter, attenuator, and nonlinear signal generator according to the present invention are extensively applicable to a directivity control circuit of a radio communication antenna and a distortion compensation circuit of a power amplifier. Furthermore, the phase shifter can also be used as a variable clock delay circuit used in an optical communication CDR (Clock and Data Recovery Circuit).

As has been described above, the phase shifter and attenuator according to the present invention include two high-frequency phase shifting elements having a phase change amount of 90° and two high-frequency impedance elements. The impedances of these high-frequency impedance elements are so set that input and output. reflection coefficients are approximately zero. Also, the nonlinear signal generator according to the present invention includes two high-frequency phase shifting elements and two nonlinear elements. The resistance components of the impedances of these nonlinear elements are so set that input and output reflection coefficients are approximately zero. With these configurations, when high-frequency transmission lines whose electrical length at the frequency $f_0$ is 90° are used as the high-frequency phase shifting elements, for example, a phase shifter, attenuator, or nonlinear signal generator can be constituted by the number of high-frequency transmission lines half that required when a conventional 90° branch line hybrid using four high-frequency transmission lines whose electrical length at the frequency $f_0$ is 90° is used. Consequently, the present invention can implement a phase shifter, attenuator, and nonlinear signal generator whose sizes are ¼ those of a conventional phase shifter, attenuator, and nonlinear signal generator.

Additionally, in the phase shifter, attenuator, and nonlinear signal generator according to the present invention, the high-frequency phase shifting elements are ① high-frequency transmission lines whose electrical length at the frequency $f_0$ is 90°, ② $\pi$ circuits each composed of a high-frequency transmission line whose electrical length at the frequency $f_0$ is smaller than 90° and two capacitors each having one terminal connected to the two terminals of the high-frequency transmission line and the other terminal grounded, or ③ a lumped constant circuit constituted by inductors and capacitors. When these configurations are employed, the phase shifter, attenuator, and nonlinear signal generator can be miniaturized in the order of ①>②>③.

Furthermore, the phase shifter according to the present invention uses resonant circuits as the high-frequency impedance elements. This can increase the phase change amount.

What is claimed is:

1. A phase shifter comprising:

a first high-frequency impedance element connected between an input port and an output port and having an impedance substantially constituted by a reactance;

a first high-frequency phase shifting element having one terminal connected to said input port and a phase change amount of 90° at a frequency $f_0$, said first high-frequency phase shifting element having an impedance converting function;

a second high-frequency phase shifting element connected between said output port and the other terminal of said first high-frequency phase shifting element and having a phase change amount of 90° at the frequency $f_0$, said second high-frequency phase shifting element having an impedance converting function; and a second high-frequency impedance element having one terminal connected to a common connection point between said first and second high-frequency phase shifting elements, the other terminal grounded, and an impedance substantially constituted by a reactance, wherein the impedance of said first high-frequency impedance element and the impedance of said second high-frequency impedance element are set such that input and output reflection coefficients at the frequency $f_0$ are approximately zero;

wherein each of said first and second high-frequency phase shifting elements is a high-frequency transmission line whose electrical length at the frequency $f_0$ is 90°.

2. A phase shifter according to claim 1, wherein letting $Z_0$ be the input impedance of said input port and the output impedance of said output port, $X_1$ be the reactance of said first high-frequency impedance element, $Z_2$ be the characteristic impedance of said high-frequency transmission lines used as said first and second high-frequency phase shifting elements, and $X_3$ be the reactance of said second high-frequency phase shifting element, the reactance $X_3$ is set by a relation $$X_3 = \frac{Z_2^2}{4Z_0^2} X_1.$$

3. A phase shifter comprising:

a first high-frequency impedance element connected between an input port and an output port and having an impedance substantially constituted by a reactance;

a first high-frequency phase shifting element having one terminal connected to said input port and a phase change amount of 90° at a frequency $f_0$, said first high-frequency phase shifting element having an impedance converting function;

a second high-frequency phase shifting element connected between said output port and the other terminal of said first high-frequency phase shifting element and having a phase change amount of 90° at the frequency $f_0$, said second high-frequency phase shifting element having an impedance converting function; and a second high-frequency impedance element having one terminal connected to a common connection point between said first and second high-frequency phase shifting elements, the other terminal grounded, and an impedance substantially constituted by a reactance, wherein the impedance of said first high-frequency impedance element and the impedance of said second high-frequency impedance element are set such that input and output reflection coefficients at the frequency $f_0$ are approximately zero;

wherein each of said first and second high-frequency phase shifting elements is a π circuit comprising a high-frequency transmission line whose electrical length at the frequency $f_0$ is smaller than 90° and two capacitors each having one terminal connected to a corresponding one of two terminals of said high-frequency transmission line and the other terminal grounded.

4. A phase shifter according to claim 3, wherein letting $Z_0$ be the input impedance of said input port and the output impedance of said output port, $X_1$ be the reactance of said first high-frequency impedance element, θ and Z be the electrical length and the characteristic impedance, respectively, of said high-frequency transmission lines included in said first and second high-frequency phase shifting elements, C be the capacitance of said capacitors included in said first and second high-frequency phase shifting elements, and $X_3$ be the reactance of said second high-frequency phase shifting element, the capacitance C and the reactance $X_3$ are set by relations $$C = \frac{1}{2\pi f_0 Z \tan\theta}$$

$$X_3 = \frac{(Z\sin\theta)^2}{4Z_0^2} X_1.$$

5. A phase shifter comprising:

a first high-frequency impedance element connected between an input port and an output port and having an impedance substantially constituted by a reactance;

a first high-frequency phase shifting element having one terminal connected to said input port and a phase change amount of 90° at a frequency $f_0$, said first high-frequency phase shifting element having an impedance converting function;

a second high-frequency phase shifting element connected between said output port and the other terminal of said first high-frequency phase shifting element and having a phase change amount of 90° at the frequency $f_0$, said second high-frequency phase shifting element having an impedance converting function; and a second high-frequency impedance element having one terminal connected to a common connection point between said first and second high-frequency phase shifting elements, the other terminal grounded, and an impedance substantially constituted by a reactance, wherein the impedance of said first high-frequency impedance element and the impedance of said second high-frequency impedance element are set such that input and output reflection coefficients at the frequency $f_0$ are approximately zero;

wherein each of said first and second high-frequency phase shifting elements is a lumped constant circuit comprising an inductor and a capacitor.

6. A phase shifter according to claim 5, wherein each of said first and second high-frequency phase shifting elements is a T circuit comprising a capacitor whose one terminal is grounded and two inductors each having one terminal connected to the other terminal of said capacitor, and letting $Z_0$ be the input impedance of said input port and the output impedance of said output port, $X_1$ be the reactance of said first high-frequency impedance element, C be the capacitance of said capacitor, L be the inductance of said inductors, and $X_3$ be the reactance of said second high-frequency phase shifting element, the capacitance C and the reactance $X_3$ are set by relations $$C = \frac{1}{(2\pi f_0)^2 L}$$

$$X_3 = \frac{(2\pi f_0 L)^2}{4Z_0^2} X_1.$$

7. A phase shifter according to claim 5, wherein each of said first and second high-frequency phase shifting elements is a π circuit comprising an inductor and two capacitors each having one terminal connected to a corresponding one of two terminals of said inductor and the other terminal grounded, and letting $Z_0$ be the input impedance of said input port and the output impedance of said output port, $X_1$ be the reactance of said first high-frequency impedance element, C be the capacitance of said capacitors, L be the inductance of said inductor, and $X_3$ be the reactance of said second high-frequency phase shifting element, the capacitance C and the reactance $X_3$ are set by relations $$C = \frac{1}{(2\pi f_0)^2 L}$$

$$X_3 = \frac{(2\pi f_0 L)^2}{4Z_0^2} X_1.$$

8. A phase shifter according to claim 5, wherein each of said first and second high-frequency phase shifting elements is a T circuit comprising an inductor whose one terminal is grounded and two capacitors each having one terminal connected to the other terminal of said inductor, and letting $Z_0$ be the input impedance of said input port and the output impedance of said output port, $X_1$ be the reactance of said first high-frequency impedance element, C be the capacitance of said capacitors, L be the inductance of said inductor, and $X_3$ be the reactance of said second high-frequency phase shifting element, the capacitance C and the reactance $X_3$ are set by relations $$C = \frac{1}{(2\pi f_0)^2 L}$$

$$X_3 = \frac{(2\pi f_0 L)^2}{4Z_0^2} X_1.$$

9. A phase shifter according to claim 5, wherein each of said first and second high-frequency phase shifting elements is a π circuit comprising a capacitor and two inductors each having one terminal connected to a corresponding one of two terminals of said capacitor and the other terminal grounded, and letting $Z_0$ be the input impedance of said input port and the output impedance of said output port, $X_1$ be the reactance of said first high-frequency impedance element, C be the capacitance of said capacitor, L be the inductance of said inductors, and $X_3$ be the reactance of said second high-frequency phase shifting element, the capacitance C and the reactance $X_3$ are set by relations $$C = \frac{1}{(2\pi f_0)^2 L}$$

$$X_3 = \frac{(2\pi f_0 L)^2}{4Z_0^2} X_1.$$

10. A phase shifter comprising:

a first high-frequency impedance element connected between an input port and an output port and having an impedance substantially constituted by a reactance;

a first high-frequency phase shifting element having one terminal connected to said input port and a phase change amount of 90° at a frequency $f_0$, said first high-frequency phase shifting element having an impedance converting function;

a second high-frequency phase shifting element connected between said output port and the other terminal of said first high-frequency phase shifting element and having a phase change amount of 90° at the frequency $f_0$, said second high-frequency phase shifting element having an impedance converting function; and a second high-frequency impedance element having one terminal connected to a common connection point between said first and second high-frequency phase shifting elements, the other terminal grounded, and an impedance substantially constituted by a reactance, wherein the impedance of said first high-frequency impedance element and the impedance of said second high-frequency impedance element are set such that input and output reflection coefficients at the frequency $f_0$ are approximately zero;

wherein each of said first and second high-frequency impedance elements is a variable capacitor.

11. A phase shifter comprising:

a first high-frequency impedance element connected between an input port and an output port and having an impedance substantially constituted by a reactance;

a first high-frequency phase shifting element having one terminal connected to said input port and a phase change amount of 90° at a frequency $f_0$, said first high-frequency phase shifting element having an impedance converting function;

a second high-frequency phase shifting element connected between said output port and the other terminal of said first high-frequency phase shifting element and having a phase change amount of 90° at the frequency $f_0$, said second high-frequency phase shifting element having an impedance converting function; and a second high-frequency impedance element having one terminal connected to a common connection point between said first and second high-frequency phase shifting elements, the other terminal grounded, and an impedance substantially constituted by a reactance, wherein the impedance of said first high-frequency impedance element and the impedance of said second high-frequency impedance element are set such that input and output reflection coefficients at the frequency $f_0$ are approximately zero;

wherein each of said first and second high-frequency impedance elements is a resonant circuit.

12. A phase shifter according to claim 11, wherein said resonant circuit is a series resonant circuit in which an inductor and a capacitor are connected in series.

13. A phase shifter according to claim 11, wherein said resonant circuit is a parallel resonant circuit in which an inductor and a capacitor are connected in parallel.

14. A phase shifter according to claim 11, wherein said resonant circuit is a composite resonant circuit in which a series resonant circuit, in which an inductor and a first capacitor are connected in series, is connected in parallel with a second capacitor.

15. A phase shifter according to claim 11, wherein said resonant circuit is a composite resonant circuit in which two series resonant circuits, in each of which an inductor and a capacitor are connected in series, are connected in parallel.

16. An attenuator comprising:

a first high-frequency impedance element connected between an input port and an output port and having an impedance substantially constituted by a resistance;

a first high-frequency phase shifting element having one terminal connected to,said input port and a phase change amount of 90° at a frequency $f_0$, said first high-frequency phase shifting element having an impedance converting function;

a second high-frequency phase shifting element connected between said output port and the other terminal of said first high-frequency phase shifting element and having a phase change amount of 90° at the frequency $f_0$, said second high-frequency phase shifting element having an impedance converting function; and a second high-frequency impedance element having one terminal connected to a common connection point between said first and second high-frequency phase shifting elements, the other terminal grounded, and an impedance substantially constituted by a resistance, wherein the impedance of said first high-frequency impedance element and the impedance of said second high-frequency impedance element are set such that input and output reflection coefficients at the frequency $f_0$ are approximately zero;

wherein each of said first and second high-frequency phase shifting elements is a high-frequency transmission line whose electrical length at the frequency $f_0$ is 90°.

17. An attenuator according to claim 16, wherein letting $Z_0$ be the input impedance of said input port and the output impedance of said output port, $R_1$ be the resistance of said first high-frequency impedance element, $Z_2$ be the characteristic impedance of said high-frequency transmission lines used as said first and second high-frequency phase shifting elements, and $R_3$ be the resistance of said second high-frequency phase shifting element, the resistance $R_3$ is set by a relation $$R_3 = \frac{Z_2^2}{4Z_0^2} R_1.$$

18. An attenuator comprising:

a first high-frequency impedance element connected between an input port and an output port and having an impedance substantially constituted by a resistance;

a first high-frequency phase shifting element having one terminal connected to said input port and a phase change amount of 90° at a frequency $f_0$, said first high-frequency phase shifting element having an impedance converting function;

a second high-frequency phase shifting element connected between said output port and the other terminal of said first high-frequency phase shifting element and having a phase change amount of 90° at the frequency $f_0$, said second high-frequency phase shifting element having an impedance converting function; and a second high-frequency impedance element having one terminal connected to a common connection point between said first and second high-frequency phase shifting elements, the other terminal grounded, and an impedance substantially constituted by a resistance, wherein the impedance of said first high-frequency impedance element and the impedance of said second high-frequency impedance element are set such that input and output reflection coefficients at the frequency $f_0$ are approximately zero;

wherein each of said first and second high-frequency phase shifting elements is a π circuit comprising a high-frequency transmission line whose electrical length at the frequency $f_0$ is smaller than 90° and two capacitors each having one terminal connected to a corresponding one of two terminals of said high-frequency transmission line and the other terminal grounded.

19. An attenuator according to claim 18, wherein letting $Z_0$ be the input impedance of said input port and the output impedance of said output port, $R_1$ be the resistance of said first high-frequency impedance element, θ and Z be the electrical length and the characteristic impedance, respectively, of said high-frequency transmission lines included in said first and second high-frequency phase shifting elements, C be the capacitance of said capacitors included in said first and second high-frequency phase shifting elements, and $R_3$ be the resistance of said second high-frequency phase shifting element, the capacitance C and the resistance $R_3$ are set by relations $$C = \frac{1}{2\pi f_0 Z \tan\theta}$$

-continued $$R_3 = \frac{(Z \sin\theta)^2}{4Z_0^2} R_1.$$

20. An attenuator comprising:

a first high-frequency impedance element connected between an input port and an output port and having an impedance substantially constituted by a resistance;

a first high-frequency phase shifting element having one terminal connected to said input port and a phase change amount of 90° at a frequency $f_0$, said first high-frequency phase shifting element having an impedance converting function;

a second high-frequency phase shifting element connected between said output port and the other terminal of said first high-frequency phase shifting element and having a phase change amount of 90° at the frequency $f_0$, said second high-frequency phase shifting element having an impedance converting function; and a second high-frequency impedance element having one terminal connected to a common connection point between said first and second high-frequency phase shifting elements, the other terminal grounded, and an impedance substantially constituted by a resistance, wherein the impedance of said first high-frequency impedance element and the impedance of said second high-frequency impedance element are set such that input and output reflection coefficients at the frequency $f_0$ are approximately zero;

wherein each of said first and second high-frequency phase shifting elements is a lumped constant circuit comprising an inductor and a capacitor.

21. An attenuator according to claim 20, wherein each of said first and second high-frequency phase shifting elements is a T circuit comprising a capacitor whose one terminal is grounded and two inductors each having one terminal connected to the other terminal of said capacitor, and letting $Z_0$ be the input impedance of said input port and the output impedance of said output port, $R_1$ be the resistance of said first high-frequency impedance element, C be the capacitance of said capacitor, L be the inductance of said inductors, and $R_3$ be the resistance of said second high-frequency phase shifting element, the capacitance C and the resistance $R_3$ are set by relations $$C = \frac{1}{(2\pi f_0)^2 L}$$

$$R_3 = \frac{(2\pi f_0 L)^2}{4Z_0^2} R_1.$$

22. An attenuator according to claim 20, wherein each of said first and second high-frequency phase shifting elements is a π circuit comprising an inductor and two capacitors each having one terminal connected to a corresponding one of two terminals of said inductor and the other terminal grounded, and letting $Z_0$ be the input impedance of said input port and the output impedance of said output port, $R_1$ be the resistance of said first high-frequency impedance element, C be the capacitance of said capacitors, L be the inductance of said inductor, and $R_3$ be the resistance of said second high-frequency phase shifting element, the capacitance C and the resistance $R_3$ are set by relations $$C = \frac{1}{(2\pi f_0)^2 L}$$

$$R_3 = \frac{(2\pi f_0 L)^2}{4Z_0^2} R_1.$$

23. An attenuator according to claim 20, wherein each of said first and second high-frequency phase shifting elements is a T circuit comprising an inductor whose one terminal is grounded and two capacitors each having terminal connected to the other terminal of said inductor, and letting $Z_0$ be the input impedance of said input port and the output impedance of said output port, $R_1$ be the resistance of said first high-frequency impedance element, C be the capacitance of said capacitors, L be the inductance of said inductor, and $R_3$ be the resistance of said second high-frequency phase shifting element, the capacitance C and the resistance $R_3$ are set by relations $$C = \frac{1}{(2\pi f_0)^2 L}$$

$$R_3 = \frac{(2\pi f_0 L)^2}{4Z_0^2} R_1.$$

24. An attenuator according to claim 20, wherein each of said first and second high-frequency phase shifting elements is a π circuit comprising a capacitor and two inductors each having one terminal connected to a corresponding one of two terminals of said capacitor and the other terminal grounded, and letting $Z_0$ be the input impedance of said input port and the output impedance of said output port, $R_1$ be the resistance of said first high-frequency impedance element, C be the capacitance of said capacitor, L be the inductance of said inductors, and $R_3$ be the resistance of said second high-frequency phase shifting element, the capacitance C and the resistance $R_3$ are set by relations $$C = \frac{1}{(2\pi f_0)^2 L}$$

$$R_3 = \frac{(2\pi f_0 L)^2}{4Z_0^2} R_1.$$

25. A non-linear signal generator comprising:

a first nonlinear element connected between an input port and an output port to generate a nonlinear signal in accordance with input signal power, said first nonlinear element having an impedance containing a resistance component;

a first high-frequency phase shifting element having one terminal connected to said input port and a phase change amount of 90° at a frequency $f_0$, said first high-frequency phase shifting element having an impedance converting function;

a second high-frequency phase shifting element connected between said output port and the other terminal of said first high-frequency phase shifting element and having a phase change amount of 90° at the frequency $f_0$, said second high-frequency phase shifting element having an impedance converting function; and a second nonlinear element having one terminal connected to a common connection point between said first and second high-frequency phase shifting elements and the other terminal grounded to generate a nonlinear signal similar to the nonlinear signal generated by said first nonlinear element, said second nonlinear element having an impedance containing a resistance component, wherein the resistance component of the impedance of said first nonlinear element and the resistance component of the impedance of said second nonlinear element are set such that input and output reflection coefficients at the frequency $f_0$ are approximately zero;

wherein each of said first and second high-frequency phase shifting elements is a high-frequency transmission line whose electrical length at the frequency $f_0$ is 90°.

26. A generator according to claim 25, wherein letting $Z_0$ be the input impedance of said input port and the output impedance of said output port, $R_1$ be the resistance component of said first nonlinear element, $Z_2$ be the characteristic impedance of said high-frequency transmission lines used as said first and second high-frequency phase shifting elements, and $R_3$ be the resistance component of said second nonlinear element, the resistance components $R_1$ and $R_3$ are set by relations $$R_3 = \frac{Z_2^2}{4Z_0^2} R_1,\ R_1 = 2Z_0.$$

27. A non-linear signal generator comprising:

a first nonlinear element connected between an input port and an output port to generate a nonlinear signal in accordance with input signal power, said first nonlinear element having an impedance containing a resistance component;

a first high-frequency phase shifting element having one terminal connected to said input port and a phase change amount of 90° at a frequency $f_0$, said first high-frequency phase shifting element having an impedance converting function;

a second high-frequency phase shifting element connected between said output port and the other terminal of said first high-frequency phase shifting element and having a phase change amount of 90° at the frequency $f_0$, said second high-frequency phase shifting element having an impedance converting function; and a second nonlinear element having one terminal connected to a common connection point between said first and second high-frequency phase shifting elements and the other terminal grounded to generate a nonlinear signal similar to the nonlinear signal generated by said first nonlinear element, said second nonlinear element having an impedance containing a resistance component, wherein the resistance component of the impedance of said first nonlinear element and the resistance component of the impedance of said second nonlinear element are set such that input and output reflection coefficients at the frequency $f_0$ are approximately zero;

wherein each of said first and second high-frequency phase shifting elements is a π circuit comprising a high-frequency transmission line whose electrical length at the frequency $f_0$ is smaller than 90° and two capacitors each having one terminal connected to a corresponding one of two terminals of said high-frequency transmission line and the other terminal grounded.

28. A generator according to claim 27, wherein letting $Z_0$ be the input impedance of said input port and the output impedance of said output port, $R_1$ be the resistance component of said first nonlinear element, θ and Z be the electrical length and the characteristic impedance, respectively, of said high-frequency transmission lines included in said first and second high-frequency phase shifting elements, C be the capacitance of said capacitors included in said first and second high-frequency phase shifting elements, and $R_3$ be the resistance component of said second nonlinear element, the capacitance C and the resistance components $R_1$ and $R_3$ are set by relations $$C = \frac{1}{2\pi f_0 Z \tan\theta}$$

$$R_3 = \frac{(Z \sin\theta)^2}{4Z_0^2} R_1,\ R_1 = 2Z_0.$$

29. A non-linear signal generator comprising:

a first nonlinear element connected between an input port and an output port to generate a nonlinear signal in accordance with input signal power, said first nonlinear element having an impedance containing a resistance component;

a first high-frequency phase shifting element having one terminal connected to said input port and a phase change amount of 90° at a frequency $f_0$, said first high-frequency phase shifting element having an impedance converting function;

a second high-frequency phase shifting element connected between said output port and the other terminal of said first high-frequency phase shifting element and having a phase change amount of 90° at the frequency $f_0$, said second high-frequency phase shifting element having an impedance converting function; and a second nonlinear element having one terminal connected to a common connection point between said first and second high-frequency phase shifting elements and the other terminal grounded to generate a nonlinear signal similar to the nonlinear signal generated by said first nonlinear element, said second nonlinear element having an impedance containing a resistance component, wherein the resistance component of the impedance of said first nonlinear element and the resistance component of the impedance of said second nonlinear element are set such that input and output reflection coefficients at the frequency $f_0$ are approximately zero;

wherein each of said first and second high-frequency phase shifting elements is a lumped constant circuit comprising an inductor and a capacitor.

30. A generator according to claim 29, wherein each of said first and second high-frequency phase shifting elements is a T circuit comprising a capacitor whose one terminal is grounded and two inductors each having one terminal connected to the other terminal of said capacitor, and letting $Z_0$ be the input impedance of said input port and the output impedance of said output port, $R_1$ be the resistance component of said first nonlinear element, C be the capacitance of said capacitor, L be the inductance of said inductors, and $R_3$ be the resistance component of said second nonlinear element, the capacitance C and the resistances $R_1$ and $R_3$ are set by relations $$C = \frac{1}{(2\pi f_0)^2 L}$$

$$R_3 = \frac{(2\pi f_0 L)^2}{4Z_0^2} R_1,\ R_1 = 2Z_0.$$

31. A generator according to claim 29, wherein each of said first and second high-frequency phase shifting elements is a π circuit comprising an inductor and two capacitors each having one terminal connected to a corresponding one of two terminals of said inductor and the other terminal grounded, and letting $Z_0$ be the input impedance of said input port and the output impedance of said output port, $R_1$ be the resistance component of said first nonlinear element, C be the capacitance of said capacitors, L be the inductance of said inductor, and $R_3$ be the resistance of said second nonlinear element, the capacitance C and the resistance components $R_1$ and $R_3$ are set by relations $$C = \frac{1}{(2\pi f_0)^2 L}$$

$$R_3 = \frac{(2\pi f_0 L)^2}{4Z_0^2} R_1,\ R_1 = 2Z_0.$$

32. A generator according to claim 29, wherein each of said first and second high-frequency phase shifting elements is a T circuit comprising an inductor whose one terminal is grounded and two capacitors each having one terminal connected to the other terminal of said inductor, and letting $Z_0$ be the input impedance of said input port and the output impedance of said output port, $R_1$ be the resistance component of said first nonlinear element, C be the capacitance of said capacitors, L be the inductance of said inductor, and $R_3$ be the resistance component of said second nonlinear element, the capacitance C and the resistance components $R_1$ and $R_3$ are set by relations $$C = \frac{1}{(2\pi f_0)^2 L}$$

$$R_3 = \frac{(2\pi f_0 L)^2}{4Z_0^2} R_1,\ R_1 = 2Z_0.$$

33. A generator according to claim 29, wherein each of said first and second high-frequency phase shifting elements is a π circuit comprising a capacitor and two inductors each having one terminal connected to a corresponding one of two terminals of said capacitor and the other terminal grounded, and letting $Z_0$ be the input impedance of said input port and the output impedance of said output port, $R_1$ be the resistance component of said first nonlinear element, C be the capacitance of said capacitor, L be the inductance of said inductors, and $R_3$ be the resistance component of said second nonlinear element, the capacitance C and the resistance components $R_1$ and $R_3$ are set by relations $$C = \frac{1}{(2\pi f_0)^2 L}$$

$$R_3 = \frac{(2\pi f_0 L)^2}{4Z_0^2} R_1,\ R_1 = 2Z_0.$$

34. A non-linear signal generator comprising:

a first nonlinear element connected between an input port and an output port to generate a nonlinear signal in accordance with input signal power, said first nonlinear element having an impedance containing a resistance component;

a first high-frequency phase shifting element having one terminal connected to said input port and a phase change amount of 90° at a frequency $f_0$, said first high-frequency phase shifting element having an impedance converting function;

a second high-frequency phase shifting element connected between said output port and the other terminal of said first high-frequency phase shifting element and having a phase change amount of 90° at the frequency $f_0$, said second high-frequency phase shifting element having an impedance converting function; and a second nonlinear element having one terminal connected to a common connection point between said first and second high-frequency phase shifting elements and the other terminal grounded to generate a nonlinear signal similar to the nonlinear signal generated by said first nonlinear element, said second nonlinear element having an impedance containing a resistance component, wherein the resistance component of the impedance of said first nonlinear element and the resistance component of the impedance of said second nonlinear element are set such that input and output reflection coefficients at the frequency $f_0$ are approximately zero;

wherein each of said first and second non-linear elements comprises two parallel-connected diodes having opposite polarities and a resistor connected in parallel with said diodes, and a bias current flows through each of said diodes.

* * * * *